US012745319B2

(12) United States Patent
Yang et al.

(10) Patent No.: US 12,745,319 B2
(45) Date of Patent: Sep. 22, 2026

(54) RADIO RESOURCE CONTROL (RRC) CONNECTION RELEASE CONTROL METHOD AND APPARATUS

(71) Applicant: Huawei Technologies Co., Ltd., Shenzhen (CN)

(72) Inventors: Rui Yang, Beijing (CN); Hui Jin, Shenzhen (CN); Fenghui Dou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 608 days.

(21) Appl. No.: 18/309,155

(22) Filed: Apr. 28, 2023

(65) Prior Publication Data

US 2023/0276532 A1 Aug. 31, 2023

Related U.S. Application Data

(63) Continuation of application No. PCT/CN2021/121401, filed on Sep. 28, 2021.

(30) Foreign Application Priority Data

Oct. 30, 2020 (CN) ......................... 202011194036.X
Nov. 20, 2020 (CN) ......................... 202011315017.8

(51) Int. Cl.
*H04W 76/38* (2018.01)
*H04W 76/27* (2018.01)

(52) U.S. Cl.
CPC ........... *H04W 76/38* (2018.02); *H04W 76/27* (2018.02)

(58) Field of Classification Search
CPC . H04W 76/38; H04W 76/27; H04W 52/0251; Y02D 30/70
USPC ........................................ 370/310, 328, 329
See application file for complete search history.

(56) References Cited

U.S. PATENT DOCUMENTS

2011/0306352 A1 12/2011 Young et al.
2014/0064134 A1 3/2014 Huang et al.
2014/0233459 A1* 8/2014 Dahod ............... H04N 21/6131 370/328
2014/0293857 A1 10/2014 Dalsgaard et al.
2014/0321371 A1* 10/2014 Anderson ............ H04W 72/23 370/329
2021/0337481 A1* 10/2021 Goel ................ H04W 52/0229
2022/0338302 A1* 10/2022 Zacharias ............ H04W 76/27

FOREIGN PATENT DOCUMENTS

CN 103118421 A 5/2013
CN 106572544 A 4/2017
CN 107484260 A 12/2017

* cited by examiner

*Primary Examiner* — Obaidul Huq
(74) *Attorney, Agent, or Firm* — Conley Rose, P.C.

(57) ABSTRACT

An RRC connection release control method and an apparatus are applied to the field of mobile communication technologies and relate to the field of artificial intelligence (AI) and machine learning algorithms. When a first application of a terminal runs in a foreground, a timing duration of a first timer is set based on a timing duration corresponding to the first application, where the first timer starts when the terminal is in an RRC connected state, and when the terminal exchanges information with a network device, the first timer is reset, so as to control release of an RRC connection of the terminal based on the first timer.

20 Claims, 13 Drawing Sheets

RADIO RESOURCE CONTROL (RRC) CONNECTION RELEASE CONTROL METHOD AND APPARATUS

CROSS-REFERENCE TO RELATED APPLICATIONS

This is a U.S. continuation of International Patent Application No. PCT/CN2021/121401 filed on Sep. 28, 2021, which claims priority to Chinese Patent Application No. 202011194036.X filed on Oct. 30, 2020 and Chinese Patent Application No. 202011315017.8 filed on Nov. 20, 2020. All of the aforementioned applications are hereby incorporated by reference in their entireties.

TECHNICAL FIELD

This disclosure relates to the field of mobile communication technologies, and in particular, to a Radio Resource Control (RRC) connection release control method and an apparatus.

BACKGROUND

With rapid development of the Internet, more and more terminals need to communicate with a network device. Before the terminal communicates with the network device, the terminal first needs to establish an RRC connection to the network device. When the terminal does not need to communicate with the network device, the RRC connection may be released.

When the terminal needs to transmit data, the terminal establishes an RRC connection to the network device. After data sending is completed, the network device may release the RRC connection to the terminal. When an inactive timer configured by the network device for the terminal expires, the network device may release the RRC connection to the terminal. A timing duration of the inactive timer is a fixed value, for example, the fixed value is 10 seconds.

Because the timing duration of the inactive timer is a fixed value, power consumption of the terminal may be relatively high.

SUMMARY

Embodiments of this disclosure provide an RRC connection release control method and an apparatus, to reduce power consumption of a terminal.

According to a first aspect, an RRC connection release control method is provided, applied to a terminal, where the terminal stores a timing duration of a first timer that is corresponding to a first application type, the timing duration of the first timer that is corresponding to the first application type includes at least two duration values, the first timer is a timer used when the terminal is in an RRC connected state, the first timer starts timing when the terminal is in the RRC connected state, and the first timer is reset when the terminal receives data sent by a network device, and the method further includes, when a first application of the terminal runs in a foreground, the terminal determines an application type of the first application, determining whether the application type of the first application is the first application type, when the application type of the first application is the first application type, the terminal determines a first duration value from the at least two duration values as the timing duration of the first timer, when a preset operation for the first application is detected, the terminal establishes an RRC connection to the network device, when the terminal establishes the RRC connection to the network device, the first timer starts timing, and when a timing value of the first timer exceeds the first duration value, the terminal requests the network device to release the RRC connection.

For a video application, the preset operation may be an operation of playing a video. For a game application, the preset operation may be an operation of tapping to start. The preset operation is used to request to obtain data, and any operation for requesting to obtain data is the preset operation.

In the foregoing design solution, the first timer is provided in the terminal, where the first timer is a timer used when the terminal is in the RRC connected state, when the terminal is in the RRC connected state, the first timer starts timing, and when the terminal receives data sent by the network device, the first timer is reset, and RRC connection release is controlled by using the first timer. When the first application (the first application is of the first application type) of the terminal runs in the foreground, the first duration value is determined from at least two duration values corresponding to the first application type of the first application as a timing duration of the first timer. When the first timer expires (that is, when the timing value of the first timer exceeds the first duration value), the terminal requests the network device to release the RRC connection of the terminal. Because the timing duration of the first timer is set based on the duration value corresponding to the application type of the first application, the timing duration that is of the first timer and that is used to control RRC connection release is adapted to the application running in the foreground, so that RRC connection release can be controlled based on a data transmission status of the first application, thereby reducing power consumption of the terminal.

According to a second aspect, an RRC connection release control method is provided, including determining a timing duration of a first timer that is corresponding to a first application when the first application of a terminal runs in a foreground, where the first timer is a timer used when the terminal is in an RRC connected state, the first timer starts timing when the terminal is in the RRC connected state, and the first timer is reset when information exchange is performed between the terminal and a network device, when a preset operation for the first application is detected, the terminal determines an RRC connection to the network device, when the terminal establishes the RRC connection to the network device, the first timer starts timing, and when a timing value of the first timer exceeds the timing duration, the terminal requests the network device to release the RRC connection.

In the foregoing design solution, the first timer is provided in the terminal, where the first timer is a timer used when the terminal is in the RRC connected state, when the terminal is in the RRC connected state, the first timer starts timing, and when the terminal receives data sent by the network device, the first timer is reset, and RRC connection release is controlled by using the first timer. When the first application of the terminal runs in the foreground, the timing duration of the first timer is set based on the timing duration corresponding to the first application. When the first timer expires (that is, when the timing value of the first timer exceeds the timing duration), the terminal requests the network device to release the RRC connection of the terminal. Because the timing duration of the first timer is set based on the timing duration corresponding to the first application, the timing duration that is of the first timer and that is used to control RRC connection release is adapted to the application running in the foreground, so that RRC connection release can be controlled based on a data transmission status of the first application, thereby reducing power consumption of the terminal.

In a possible design, the information exchange includes at least one of the following cases: the terminal receives downlink data sent by the network device, the terminal receives downlink signaling sent by the network device, the terminal sends uplink data to the network device, and the terminal sends uplink signaling to the network device.

In the foregoing design solution, during running of the first timer, if information exchange is performed (for example, downlink data or signaling is received, or uplink data or signaling is sent) between the terminal and the network device, the first timer is reset, so that RRC connection release can be controlled based on the first timer.

In a possible design, determining a timing duration of a first timer that is corresponding to the first application includes determining the timing duration of the first timer that is corresponding to an application type of the first application.

In the foregoing design solution, because applications of a same application type generally have similar data transmission features, a timing duration of the first timer may be set for the application type, so that timing durations of the first timer that are corresponding to the applications of the same application type are the same. In this way, for the applications of the same application type, RRC connection release may be controlled based on the same timing duration.

In a possible design, determining the timing duration of the first timer that is corresponding to an application type of the first application includes, if the application type of the first application is a first application type, the timing duration of the first timer is a timing duration corresponding to the first application type, or if the application type of the first application is a second application type different from the first application type, the timing duration of the first timer is a timing duration corresponding to the second application type, where the timing duration corresponding to the second application type is the same as or different from the timing duration corresponding to the first type.

In the foregoing design solution, because applications of different application types generally have different data transmission features, different timing durations are set for different application types. The timing duration of the first timer may be set based on the data transmission features of the applications of different application types and different timing durations, so that RRC connection release is controlled based on the first timer, and RRC connection release control is adapted to the transmission features of the application running in the foreground, thereby reducing power consumption of the terminal.

In a possible design, after determining a timing duration of a first timer that is corresponding to the first application, the method further includes collecting statistics about a data transmission volume of the terminal in the RRC connected state, and adjusting the timing duration of the first timer based on the statistical result.

In the foregoing design solution, the timing duration of the first timer is adjusted based on the statistical result of the data transmission volume, so that the timing duration of the first timer can be dynamically adjusted. In this way, the timing duration of the first timer can be adaptively adjusted based on a data transmission status, so that the timing duration of the first timer can match the data transmission status, thereby reducing power consumption of the terminal.

In a possible design, the first application corresponds to at least two duration values, and determining a timing duration of a first timer that is corresponding to the first application includes determining that the timing duration of the first timer is a first duration value in the at least two duration values, and adjusting the timing duration of the first timer based on the statistical result includes, if the statistical result is greater than a first threshold, increasing the timing duration of the first timer from the first duration value to a second duration value, or when information exchange is not performed between the terminal and the network device within the timing duration of the first timer, if the statistical result is less than a second threshold, reducing the timing duration of the first timer from the first duration value to a third duration value, or if the statistical result is greater than a first threshold, increasing the timing duration of the first timer from the first duration value to a second duration value, and when information exchange is not performed between the terminal and the network device within the timing duration of the first timing, if the statistical result is less than a second threshold, reducing the timing duration of the first timer from the first duration value to a third duration value, where the second threshold is less than or equal to the first threshold.

In the foregoing design solution, if the data transmission statistical result is greater than the first threshold, it indicates that data transmission and reception are relatively dense. In this case, increasing the timing duration of the first timer can reduce a probability that the RRC connection is released too early, thereby reducing power consumption of the terminal. If the data transmission statistical result is less than the second threshold, it indicates that data transmission and reception are relatively sparse. In this case, reducing the timing duration of the first timer can reduce a probability that the RRC is released too late, thereby reducing power consumption of the terminal.

In a possible design, the second duration value is a times the first duration value, and the first duration value is a times the third duration value, where a is a fixed value greater than 1. Based on a multiple relationship between the second duration value, the first duration value, and the third duration value, to adjust the value of the timing duration, the value of the timing duration may be gradually increased or gradually reduced, so as to avoid an excessively large adjustment amplitude.

In a possible design, if the statistical result is less than the second threshold, after reducing the timing duration of the first timer from the first duration value to the third duration value, the method further includes the terminal that re-enters the RRC connected state, where the first timer starts timing, and a timing duration of the first timer is the third duration value, when information exchange is performed between the terminal and the network device, the first timer is reset, and when a timing value of the first timer exceeds the timing duration, the terminal requests the network device to release the RRC connection.

In a possible design, after determining a timing duration of a first timer that is corresponding to the first application, the method further includes a first module of the terminal that sends a first instruction to a second module of the terminal, where the first instruction carries indication information used to indicate the timing duration of the first timer, and the second module sets the timing duration of the first timer of the terminal based on the indication information.

In a possible design, the first module includes an application processor (AP) of the terminal, and the second module includes a modem of the terminal.

In a possible design, the first application keeps running in the foreground.

In a possible design, determining a timing duration of a first timer that is corresponding to a first application when the first application of a terminal runs in a foreground includes, when the first application runs in the foreground, determining the timing duration of the first timer that is corresponding to the first application, where when the first application runs in a first time period, a value of the timing duration is the first duration value, or when the first application runs in a second time period, a value of the timing duration is a fourth duration value, where the first duration value is different from the fourth duration value.

In the foregoing design solution, the timing duration of the first timer that is corresponding to the first application may be updated, so that when the first application runs in the foreground at different times, different timing durations corresponding to the first application are determined. In a possible design, the timing duration of the first timer that is corresponding to the first application may be updated based on a data transmission statistical result during running of the first application in the foreground, so that the timing duration of the first timer is adapted to the data transmission features of the first application.

In a possible design, the application type of the first application corresponds to at least two duration values, and determining a timing duration of a first timer that is corresponding to the first application includes determining a maximum value in the at least two duration values as the timing duration of the first timer, and/or determining that the first duration value is less than or equal to a timing duration of an inactive timer that is configured on the network device.

In the foregoing design solution, when the first application runs in the foreground, the timing duration of the first timer is set to the maximum value in at least two duration values corresponding to the first application, so that a probability that the RRC connection is released too early can be reduced. In this way, if data transmission and reception of the first application are relatively dense, data transmission and reception of the first application can be ensured, thereby ensuring data transmission of the first application and reducing power consumption of the terminal. In addition, the first duration value is less than or equal to the timing duration of the inactive timer that is configured on the network device. In this way, an adjustment range of the timing duration of the first timer can reach a maximum of the timing duration of the inactive timer that is configured on the network device by default, so that performance (for example, power consumption and/or a delay) of the terminal can be at least close to performance of the network side.

According to a third aspect, an RRC connection release control method is provided, including determining a timing duration of a first timer that is corresponding to a first application when the first application of a terminal runs in a foreground, determining whether information exchange is performed between the terminal and a network device within the timing duration, and if information exchange is not performed, the terminal requests the network device to release the RRC connection of the terminal.

In the foregoing design solution, the terminal determines whether information exchange is performed with the network device within the timing duration. If information exchange is not performed, the terminal requests the network device to release the RRC connection of the terminal. It can be learned that the timing duration is used to control RRC connection release. When the first application runs in the foreground, the timing duration corresponding to the first application is set, so that the timing duration used to control RRC connection release is adapted to the application running in the foreground. Therefore, RRC connection release can be controlled based on a data transmission status of the first application, thereby reducing power consumption of the terminal.

In a possible design, the information exchange includes at least one of the following cases: the terminal receives downlink data sent by the network device, the terminal receives downlink signaling sent by the network device, the terminal sends uplink data to the network device, and the terminal sends uplink signaling to the network device.

In the foregoing design solution, in a downstream direction, if the terminal does not receive, within the timing duration, data or signaling sent by the network device, the terminal may request the network device to release the RRC connection, to reduce power consumption of the terminal, and in an upstream direction, if the terminal does not send, within the timing duration, data or signaling to the network device, the terminal may request the network device to release the RRC connection, to reduce power consumption of the terminal.

In a possible design, the method further includes, if information exchange is performed between the terminal and the network device within the timing duration, re-performing the following steps by using a time at which the information exchange occurs on the terminal as a start point: determining whether information exchange is performed between the terminal and a network device within the timing duration, and if information exchange is not performed, the terminal requests the network device to release the RRC connection of the terminal.

In the foregoing design solution, if information exchange is performed between the terminal and the network device, timing is restarted by using a current time point of the information exchange as a start point, to determine whether information exchange is performed between the terminal and the network device within the timing duration after timing is restarted. Therefore, the network device is requested to release an RRC connection only when information exchange is not performed between the terminal and the network device within the timing duration, so that power consumption of the terminal can be reduced by requesting to release the RRC connection, thereby ensuring data transmission of the first application.

In a possible design, determining a timing duration corresponding to the first application includes determining a timing duration corresponding to an application type of the first application.

In a possible design, determining a timing duration corresponding to the application type of the first application includes, if the application type of the first application is a first application type, the timing duration is the timing duration corresponding to the first application type, or if the application type of the first application is a second application type different from the first application type, the timing duration is a timing duration corresponding to the second application type, and the timing duration corresponding to the second application type is the same as or different from the timing duration corresponding to the first type.

In the foregoing design solution, because applications of different application types generally have different data transmission features, different timing durations are set for different application types, and RRC connection release is controlled based on different timing durations and the data transmission features of the applications of different application types, so that the RRC connection release control is adapted to the transmission features of the application running in the foreground, thereby reducing power consumption of the terminal.

In a possible design, the application type of the first application corresponds to at least two duration values, and determining a timing duration corresponding to an application type of the first application includes determining a first duration value in the at least two duration values as a value of the timing duration.

In the foregoing design solution, because there are at least two (that is, two or more) values of the timing duration corresponding to the application type, one timing duration value may be selected from the values to control RRC connection release, thereby improving flexibility of the RRC connection release control. Further, the design solution may provide support for the following solution: selecting, from the at least two duration values based on a specific data transmission status, a duration value that matches a current status, so as to further reduce power consumption of the terminal.

In a possible design, the first application corresponds to at least two duration values, and determining a timing duration corresponding to the first application includes determining a first duration value in the at least two duration values as a value of the timing duration.

In the foregoing design solution, because different applications usually have different data transmission features, different timing duration values are set for different applications, and RRC connection release may be controlled based on different timing duration values and data transmission features of different applications, so that the RRC connection release control is adapted to the transmission features of the application running in a foreground, thereby reducing power consumption of the terminal.

In a possible design, determining a timing duration corresponding to the first application includes determining a value of the timing duration as a first duration value corresponding to the first application.

After determining that the timing duration corresponding to the first application is the first duration value, the method further includes collecting statistics about data transmission of the terminal in the RRC connected state, to obtain a statistical result, and adjusting a value of the timing duration based on the statistical result.

In the foregoing design solution, the terminal may collect statistics about data transmission, and adjust, based on the statistical result, the timing duration used to control RRC connection release, so that the duration used to control RRC connection release can be dynamically adjusted based on a data transmission status, thereby reducing power consumption of the terminal. The "collecting statistics about data transmission of the terminal in the RRC connected state" means collecting statistics about data transmission in a time period from a time when the terminal enters the RRC connected state to a time when the RRC connection is released (the terminal is always in the RRC connected state in the time period).

In a possible design, after adjusting a value of the timing duration, the method further includes determining whether information exchange is performed between the terminal and the network device within the timing duration obtained after the value is adjusted, and if information exchange is not performed, the terminal requests the network device to release the RRC connection of the terminal.

In the foregoing design solution, after adjusting the value of the timing duration, the terminal determines, based on the adjusted timing duration, whether information exchange is performed between the terminal and the network device within the adjusted timing duration, and if information exchange is not performed, requests the network device to release the RRC connection of the terminal, so that RRC connection release can be controlled based on the dynamically adjusted timing duration.

In a possible design, adjusting a value of the timing duration based on the statistical result includes, if the statistical result is greater than a first threshold, increasing the value of the timing duration from the first duration value to the second duration value, where if the data transmission statistical result is greater than the first threshold, it indicates that data transmission and reception are relatively dense, and in this case, increasing the value of the timing duration can reduce a probability that the RRC connection is released too early, thereby reducing power consumption of the terminal, or when information exchange is not performed between the terminal and the network device within the timing duration (the value of the timing duration is the first duration value), if the statistical result is less than a second threshold, reducing a value of the timing duration from the first duration value to a third duration value, where if the data transmission statistical result is less than the second threshold, it indicates that data transmission and reception are relatively sparse, and in this case, reducing the value of the timing duration may reduce a probability that the RRC connection is released too late, thereby reducing power consumption of the terminal, or if the statistical result is greater than a first threshold, increasing a value of the timing duration from the first duration value to a second duration value, and when information exchange is not performed between the terminal and the network device within the timing duration (the value of the timing duration is the first duration value), if the statistical result is less than a second threshold, reducing the value of the timing duration from the first duration value to a third duration value, where the second threshold is less than or equal to the first threshold.

In a possible design, the second duration value is a times the first duration value, and the first duration value is a times the third duration value, where a is a fixed value greater than 1. Based on a multiple relationship between the second duration value, the first duration value, and the third duration value, to adjust the value of the timing duration, the value of the timing duration may be gradually increased or gradually reduced, so as to avoid an excessively large adjustment amplitude.

In a possible design, after reducing the first duration value to a third duration value if the statistical result is less than the second threshold, the method further includes the terminal that re-enters an RRC connected state, determining whether information exchange is performed between the terminal and the network device within the timing duration, where a value of the timing duration is the third duration value, and if information exchange is not performed, the terminal requests the network device to release the RRC connection of the terminal.

In the foregoing design solution, after the value of the timing duration is adjusted to the third duration value, if the RRC connection is reestablished after the RRC connection is released, and the first application keeps running in the foreground (for example, the first application is not closed or is switched to the background), RRC connection release is still controlled based on the adjusted third duration value. In some other scenarios, after the value of the timing duration is adjusted to the third duration value, if the first application is switched from the foreground to the background for running, and is switched back to the foreground for running, the terminal determines that the value of the timing duration corresponding to the application type of the first application is the first duration value, and after the terminal reestablishes the RRC connection, RRC connection release is controlled based on the first duration value.

In the foregoing design solution, if the first application keeps running in the foreground, the timing duration is kept unchanged before and after the RRC connection is reestablished. However, when the first application is switched between the foreground and the background, the timing duration needs to be reset, so that the timing duration used to control RRC connection release is adapted to the application currently running in the foreground, thereby reducing power consumption of the terminal.

In a possible design, after the timing duration is reduced from the first duration value to the third duration value and the terminal re-enters the RRC connected state, the method further includes collecting statistics about data transmission of the terminal in the RRC connected state, to obtain a statistical result, and if the statistical result is greater than the first threshold, it indicates that data transmission and reception are relatively dense, and in this case, increasing a value of the timing duration from the third duration value to the first duration value, to reduce a probability that the RRC connection is released too early, so as to reduce power consumption of the terminal, or if information exchange is not performed between the terminal and the network device within the timing duration, the terminal requests the network device to release the RRC connection, where if the statistical result is less than the second threshold, it indicates that data transmission and reception are relatively sparse, and in this case, a value of the timing duration is reduced from the third duration value to the fourth duration value, so that a probability that the RRC connection is released too late can be reduced or avoided, thereby reducing power consumption of the terminal.

In a possible design, after the timing duration is reduced from the first duration value to the third duration value, the method further includes, if information exchange is performed between the terminal and the network device within the timing duration whose value is the third duration value, re-performing the following steps by using a time at which the information exchange occurs on the terminal as a start point: determining whether information exchange is performed between the terminal and the network device within the timing duration whose value is the third duration value, and if information exchange is not performed, the terminal requests the network device to release the RRC connection of the terminal.

In the foregoing design solution, after the first duration value is reduced to the third duration value, if information exchange is performed between the terminal and the network device, timing is restarted by using a current time point of the information exchange as a start point, to determine whether information exchange is performed between the terminal and the network device within the timing duration after timing is restarted. Therefore, the network device is requested to release an RRC connection only when information exchange is not performed between the terminal and the network device within the timing duration, so that power consumption of the terminal can be reduced by requesting to release the RRC connection while data transmission of the first application is ensured.

In a possible design, after determining a timing duration corresponding to the first application, the method further includes a first module of the terminal that sends a first instruction to a second module of the terminal, where the first instruction carries indication information used to indicate the timing duration, and the second module sets the timing duration of the first timer of the terminal to a value of the timing duration based on the indication information.

Further, determining whether information exchange is performed between the terminal and a network device within the timing duration includes determining whether information exchange is performed between the terminal and the network device during running of the first timer, where if information exchange is performed between the terminal and the network device during running of the first timer, the first timer is reset.

In the foregoing design solution, the first timer is used to control RRC connection release, so as to simplify technical implementation. The first module sends an instruction to the second module, so that the second module sets the timing duration of the first timer to the value of the timing duration, so that the first timer performs timing based on the timing duration, and if information exchange is performed with the network device during running of the timer, the first timer is reset, so that RRC connection release can be controlled based on the first timer.

In a possible design, after determining a timing duration corresponding to the first application, the method further includes, if information exchange is not performed between the terminal and the network device within the timing duration, a first module of the terminal sends a second instruction to a second module of the terminal, where the second instruction is used to instruct the second module to request the network device to release the RRC connection.

In the foregoing design solution, the first module determines whether information exchange is performed between the terminal and the network device within the timing duration, and when determining that information exchange is not performed, sends an instruction to the second module to instruct the second module to request the network device to release the RRC connection, so as to control RRC connection release.

In a possible design, the first module includes an application processor of the terminal, and the second module includes a modem of the terminal. The application processor sends an instruction to the modem to control RRC connection release. This is simple and easy to implement in terms of technology, adapts to a hardware architecture of the terminal, and almost has no impact on a structure of the terminal.

In a possible design, after determining a timing duration corresponding to the first application, the method further includes determining, in response to an operation of closing the first operation or switching the first application to the background, whether an application is running in a foreground, and if no application is running in the foreground, keeping a duration value of the timing duration unchanged, or if no application is running in the foreground, updating the timing duration to the timing duration corresponding to the application that is running in the foreground.

In the foregoing design solution, after the timing duration corresponding to the first application is determined, if the first application is closed or switched to the background for running, it is determined whether an application is currently running in the foreground. If no application is currently running in the foreground, the duration value of the timing duration is kept unchanged, to simplify technical implementation, otherwise, the timing duration is updated to the timing duration corresponding to the application currently running in the foreground, so that the timing duration is adapted to the application running in the foreground, thereby reducing power consumption of the terminal.

In a possible design, determining a timing duration of a first timer that is corresponding to a first application when the first application of a terminal runs in a foreground includes determining the timing duration corresponding to the first application when the first application runs in the foreground, where a value of the timing duration is a first timing value when the first application runs in a first time period, and a value of the timing duration is a fifth duration value when the first application runs in a second time period, where the first timing duration value is different from the fifth duration value.

In the foregoing design solution, during running of the first application, the value of the timing duration may be different at different times, so that the timing duration used to control RRC connection release can be dynamically adjusted.

In a possible design, the application type of the first application corresponds to at least two duration values, and determining a timing duration corresponding to the first application includes determining a first duration value in the at least two duration values as a value of the timing duration, where the first duration value is a maximum value in the at least two duration values, and/or the first duration value is less than or equal to a timing duration of an inactive timer that is configured on the network device.

In the foregoing design solution, when the first application runs in the foreground, the timing duration is set to the maximum value in at least two duration values corresponding to the first application, so that a probability that an RRC connection is released too early can be reduced. In this way, if data transmission and reception of the first application are relatively dense, data transmission and reception of the first application can be ensured, thereby ensuring data transmission of the first application and reducing power consumption of the terminal. In addition, the first duration value is less than or equal to the timing duration of the inactive timer that is configured on the network device. In this way, an adjustment range of the timing duration used to control RRC connection release can reach a maximum of the timing duration of the inactive timer that is configured on the network device by default, so that performance (for example, power consumption and/or a delay) of the terminal can be at least close to performance of the network side.

According to a fourth aspect, an RRC connection release control method is provided, including, when a terminal is in an RRC connected state, collecting statistics about a data transmission volume of the terminal, and adjusting a timing duration of a first timer of the terminal based on the statistical result, where the first timer is a timer used when the terminal is in the RRC connected state, and when a timing value of the first timer exceeds the adjusted timing duration, the terminal requests a network device to release an RRC connection of the terminal.

In the foregoing design solution, the timing duration of the first timer is adjusted based on the statistical result of the data transmission volume, so that the timing duration of the first timer can be dynamically adjusted. In this way, the timing duration of the first timer can be adaptively adjusted based on a data transmission status, so that the timing duration of the first timer can match the data transmission status, thereby reducing power consumption of the terminal.

In a possible design, the method further includes the first timer that is reset when at least one of the following conditions is met: the terminal receives downlink data, the terminal receives downlink signaling, the terminal sends uplink data, and the terminal sends uplink signaling.

That the first timer is reset means that the first timer starts timing again.

In a possible design, the data transmission volume of the terminal includes a data transmission volume of an application running in a foreground and/or a data transmission volume of an application running in a background.

In the foregoing design solution, if an application is running in the foreground, statistics about data transmission of the application running in the foreground may be additionally collected, so that the first timer is adjusted based on the statistical result of the data transmission volume of the application running in the foreground, and the timing duration of the first timer is adapted to the application running in the foreground. Further, when a background application is running, statistics about the data transmission volume of the application running in the background may be further collected, so that the timing duration of the first timer is adjusted based on the statistical result of the data transmission volume of the application running in the foreground and the data transmission volume of the application running in the background, and the timing duration of the first timer is adapted to the application running in the foreground and the application running in the background.

In a possible design, adjusting the timing duration of the first timer based on the statistical result includes increasing a value of the timing duration of the first timer from a first duration value to a second duration value if the statistical result is greater than a first threshold, where if the statistical result of the data transmission volume is greater than the first threshold, it indicates that data transmission and reception are relatively dense, and in this case, increasing the timing duration of the first timer can reduce a probability that the RRC connection is released too early, thereby reducing power consumption of the terminal, and when the timing value of the first timer exceeds the timing duration, if the statistical result is less than a second threshold, reducing the value of the timing duration of the first timer from the first duration value to a third duration value, where the second threshold is less than or equal to the first threshold, where if the statistical result of the data transmission volume is less than the second threshold, it indicates that data transmission and reception are relatively sparse, and in this case, reducing the timing duration of the first timer can reduce a probability that the RRC connection is released too late, thereby reducing power consumption of the terminal.

In a possible design, the increasing a value of the timing duration of the first timer from a first duration value to a second duration value if the statistical result is greater than a first threshold includes, when the timing value of the first timer exceeds the timing duration, if the statistical result is greater than the first threshold, increasing the value of the timing duration of the first timer from the first duration value to the second duration value. In this case, when the timing value of the first timer exceeds the timing duration (that is, when the first timer expires), the terminal may request the network device to release an RRC connection. If the statistical result is greater than the first threshold, it indicates that data transmission and reception are relatively dense in a previous time period. In this case, after the timing duration of the first timer is increased, regardless of whether the request for releasing the RRC connection sent by the terminal to the network device is accepted, the first timer may perform timing based on the adjusted second duration value.

Therefore, a probability that the RRC connection is released too early is reduced, and power consumption of the terminal is reduced.

In a possible design, the increasing a value of the timing duration of the first timer from a first duration value to a second duration value if the statistical result is greater than a first threshold includes, when the terminal is in the RRC connected state, if the statistical result is greater than the first threshold, increasing the value of the timing duration of the first timer from the first duration value to the second duration value. In this case, if the statistical result of the data transmission volume is greater than the first threshold in the RRC connected state, it indicates that data transmission and reception are relatively dense. In this case, increasing the timing duration of the first timer can reduce a probability that the RRC connection is released too early, thereby reducing power consumption of the terminal.

In a possible design, the method further includes obtaining at least two duration values corresponding to the first timer, determining a duration value that is in the at least two duration values and that is greater than the first duration value as the second duration value, and/or obtaining at least two duration values corresponding to the first timer, and determining a duration value that is in the at least two duration values and that is less than the first duration value as the third duration value.

In a possible design, determining a duration value that is in the at least two duration values and that is greater than the first duration value as the second duration value includes using a minimum value that is in the at least two duration values and that is greater than the first duration value as the second duration value. Determining a duration value that is in the at least two duration values and that is less than the first duration value as the third duration value includes using a maximum value that is in the at least two duration values and that is less than the first duration value as the third duration.

In the foregoing design solution, the timing duration of the first timer may be gradually increased or reduced, to avoid an excessively large adjustment amplitude.

In a possible design, obtaining at least two duration values corresponding to the first timer includes obtaining the at least two duration values corresponding to an application running in a foreground, or obtaining, based on an application type of an application running in a foreground, the at least two duration values corresponding to the application type.

In the foregoing design solution, the obtained duration value may be adapted to the application or the application type of the application, so that the timing duration of the first timer is adapted to the application running in the foreground or the application type of the application, and RRC connection release may be controlled based on data transmission features of the application running in the foreground or the application type of the application.

In a possible design, the method further includes, if the at least two duration values are not obtained based on the application type of the application running in the foreground, obtaining the at least two universal duration values corresponding to the first timer, so that the timing duration of the first timer can still be dynamically adjusted in the foregoing case.

In a possible design, if the applications running in the foreground include at least two applications, obtaining, based on an application type of an application running in the foreground, the at least two duration values corresponding to the application type includes obtaining, based on an application type of a first application, the at least two duration values corresponding to the application type, where the first application is an application with a high priority in the at least two applications, or in the at least two applications, a maximum value in at least two duration values corresponding to an application type of the first application is not less than a maximum value in at least two duration values corresponding to an application type of another application.

In the foregoing design solution, when more than one application is running in the foreground, the timing duration of the first timer may be set based on at least two duration values corresponding to an application with the highest priority in a plurality of applications running on the foreground. In this way, data transmission of an application with a high priority can be ensured while power consumption of the terminal is reduced.

In a possible design, the at least two duration values are sorted in descending order or ascending order, and in two adjacent duration values, the larger duration value is a times the smaller duration value, where a is a fixed value greater than 1. Based on the multiple relationship between different duration values, when the value of the timing duration of the first timer is adjusted, the value may be gradually increased or gradually reduced, thereby avoiding an excessively large adjustment amplitude.

In a possible design, a maximum value in the at least two duration values is less than or equal to the timing duration of an inactive timer that is configured on the network device. In this way, an adjustment range of the timing duration of the first timer can reach a maximum of the timing duration of the inactive timer that is configured on the network device by default, so that an action of the terminal does not conflict with an action of the network device.

In a possible design, the method further includes obtaining, based on an application type of an application running in the foreground, the first threshold and the second threshold that are corresponding to the application type, or obtaining the universal first threshold and second threshold.

In the foregoing design solution, the first threshold and the second threshold that are corresponding to the application type are obtained based on the application type of the application running in the foreground, so that the obtained first threshold and second threshold are used to determine whether to adjust the timing duration of the first timer, so that the RRC connection release control operation is adapted to the application type of the application running in the foreground, thereby reducing power consumption of the terminal.

In a possible design, the method further includes, if the first threshold and the second threshold that are corresponding to the application type are not obtained based on the application type of the application running in the foreground, obtaining the universal first threshold and second threshold, so as to determine whether the timing duration of the first timer needs to be adjusted, so that the timing duration of the first timer can still be dynamically adjusted in the foregoing case.

In a possible design, if the applications running in the foreground include at least two applications, obtaining, based on an application type of an application running in the foreground, the first threshold and the second threshold that are corresponding to the application type includes obtaining, based on an application type of a first application, the first threshold and the second threshold that are corresponding to the application type, where the first application is an application with a high priority in the at least two applications, or in the at least two applications, a maximum value in at least two duration values corresponding to an application type of the first application is not less than a maximum value in at least two duration values corresponding to an application type of another application.

In the foregoing design solution, when more than one application is running in the foreground, the timing duration of the first timer may be adjusted based on the first threshold and the second threshold. In this way, data transmission of an application with a high priority can be ensured while power consumption of the terminal is reduced.

In a possible design, the method further includes collecting statistics about data transmission that is performed when the first application runs in the foreground within a statistical duration, to obtain a data packet interval distribution feature, where the data packet interval distribution feature is used to represent a data packet density, generating N groups of candidate durations, where each group of candidate durations includes at least two duration values, and N is an integer greater than or equal to 1, determining M groups of candidate thresholds based on the data packet interval distribution feature, where each of the M groups of candidate thresholds includes a first threshold and a second threshold, and M is an integer greater than or equal to 1, separately combining the N groups of candidate durations and the M groups of candidate thresholds to obtain K candidate combinations, where each candidate combination includes one group of candidate durations and one group of candidate thresholds, and K is an integer greater than or equal to 2, simulating, based on the data packet interval distribution feature and by using each of the K candidate combinations, adjusting the timing duration of the first timer, to obtain an RRC connection release statistical result corresponding to each candidate combination, and selecting an optimal candidate combination based on the RRC connection release statistical result corresponding to each candidate combination, to obtain at least two duration values corresponding to the application type of the first application, and the first threshold and the second threshold that are corresponding to the application type of the first application.

In the foregoing design solution, the data transmitted when the first application runs as a foreground application within the statistical duration is used as sample data, to obtain the data packet interval distribution feature, the N groups of candidate durations are combined with the M groups of candidate thresholds, and for each candidate combination obtained through combination, the timing duration of the first timer is adjusted by simulation based on the data packet interval distribution feature, to obtain the RRC connection release statistical result corresponding to each candidate combination, so as to obtain an optimal combination. In this way, a group of durations and a group of thresholds that are corresponding to the application type of the first application are obtained, so that the at least two duration values, the first threshold, and the second threshold corresponding to the first application or the application type of the first application are adapted to the data packet interval distribution feature of the first application.

In a possible design, the selecting an optimal candidate combination based on the RRC connection release statistical result corresponding to each candidate combination includes determining, based on the RRC connection release duration and the duration of the RRC non-connected state corresponding to each candidate combination, a false release rate corresponding to each candidate combination and a ratio of the duration of the RRC non-connected state to the statistical duration, where the false release rate is used to indicate a ratio of a quantity of false releases to a quantity of random-access times, and selecting a first candidate combination from the K candidate combinations, where a false release rate corresponding to the first candidate combination is less than a specified threshold, and a proportion of a duration of an RRC non-connected state to the statistical duration is the largest.

In the foregoing design solution, because the false release rate corresponding to the optimal candidate combination is less than the set threshold, and the proportion of the duration of the RRC non-connected state to the statistical duration is the largest, the optimal candidate combination is used to control RRC connection release under the same condition, and an effect of reducing power consumption is not lower than that of another candidate combination.

In a possible design, the method further includes collecting statistics about data transmission that is performed when the first application runs in the foreground within the statistical duration, to obtain a data packet interval distribution feature, where the data packet interval distribution feature is used to represent a data packet density, generating N groups of candidate duration, where each group of candidate durations includes at least two duration values, and N is an integer greater than or equal to 1, determining M groups of candidate thresholds based on the data packet interval distribution feature, where each of the M groups of candidate thresholds includes a first threshold and a second threshold, and M is an integer greater than or equal to 1, separately combining the N groups of candidate durations and the M groups of candidate thresholds to obtain K candidate combinations, where each candidate combination includes one group of candidate durations and one group of candidate thresholds, and K is an integer greater than or equal to 2, separately determining, based on the data packet interval distribution feature and each candidate combination, a Markov state transition probability matrix corresponding to each candidate combination, determining, based on the Markov state transition probability matrix corresponding to each candidate combination, a value of a target function used to evaluate an optimal candidate combination, where the value of the target function is used to indicate a duration in which the terminal is in an RRC connected state or an RRC non-connected state within the statistical duration, and determining an optimal candidate combination based on the value of the target function corresponding to each candidate combination, to obtain at least two duration values corresponding to the application type of the first application, and the first threshold and the second threshold that are corresponding to the application type of the first application.

In the foregoing design solution, the data transmitted when the first application runs as a foreground application within the statistical duration is used as sample data, to obtain the data packet interval distribution feature, the N groups of candidate durations are combined with the M groups of candidate thresholds, for each candidate combination obtained through combination, the Markov state transition probability matrix corresponding to each candidate combination is determined based on the data packet interval distribution feature, and a value of a target function used to evaluate the optimal candidate combination is determined based on the Markov state transition probability matrix corresponding to each candidate combination, so as to obtain an optimal combination. In this way, a group of durations and a group of thresholds that are corresponding to the application type of the first application are obtained, so that the at least two duration values, the first threshold, and the second threshold corresponding to the first application or the application type of the first application are adapted to the data packet interval distribution feature of the first application.

In a possible design, generating N groups of candidate durations includes generating the N groups of candidate durations according to a preset rule.

In a possible design, adjusting a timing duration of a first timer of the terminal includes a first module of the terminal that sends an instruction to a second module of the terminal, where the instruction carries indication information used to indicate the timing duration of the first timer, and the second module sets the timing duration of the first timer based on the indication information.

Optionally, the first module is an application processor, and the second module is a modem.

In the foregoing design solution, the application processor sends an instruction to the modem to set the timing duration of the first timer. This is simple and easy to implement in terms of technology, and adapts to a hardware architecture of the terminal.

In a possible design, the indication information further carries indication information used to indicate that the terminal enters an idle state or an inactive state after the RRC connection is released. The instruction sent by the application processor to the modem may further carry indication information used to indicate that the terminal enters the idle state or the inactive state after the RRC connection is released. Therefore, the terminal may enter the idle state or the inactive state after the RRC connection is released based on a status, thereby improving system flexibility.

In a possible design, the statistical result includes at least one of the following: a quantity of received data packets, a data volume of received data, a throughput rate of received data, and a bit rate of received data.

In the foregoing design solution, all statistical results obtained by collecting statistics about data transmission can reflect a data transmission density. A timing duration of the first timer is set or adjusted based on the statistical results, so that the timing duration of the first timer may be adapted to the data transmission density. Therefore, excessive random-access processes caused by excessively frequent RRC connection release can be reduced or avoided, or power consumption of the terminal can be reduced or avoided if no data is transmitted for a long time but an RRC connection is not released in a timely manner.

According to a fifth aspect, an RRC connection release control method is provided, including determining a first duration value corresponding to a first application when the first application runs in a foreground, and setting a timing duration of a first timer of the terminal to the first duration value, where the first timer is a timer used when the terminal is in an RRC connected state, and when a timing value of the first timer exceeds the timing duration, the terminal enters an RRC non-connected state.

Provided that the first timer receives one data packet, the first timer is reset, that is, the first timer restarts timing.

In the foregoing design solution, when the first application runs in the foreground, the timing duration of the first timer of the terminal is set to the first timing duration value corresponding to the first application, and when the timing value of the first timer exceeds the timing duration, the terminal requests the network device to release the RRC connection of the terminal, so as to control RRC connection release based on the first timer. Because the timing duration value of the first timer is the duration value corresponding to the foreground application, the timing duration of the first timer is adapted to the application running in the foreground. Therefore, RRC connection release may be controlled based on a data transmission status of the first application, thereby reducing power consumption of the terminal.

In a possible design, determining a first duration value corresponding to a first application when the first application runs in a foreground includes determining the first duration value corresponding to an application type of the first application.

In a possible design, determining the first duration value corresponding to an application type of the first application includes, if the application type of the first application is a first application type, the first duration value is a duration value corresponding to the first application type, or if the application type of the first application is a second application type different from the first application type, the first duration value is a duration value corresponding to the second application type, where the duration value corresponding to the second application type is the same as or different from the duration value corresponding to the first type.

In a possible design, setting a timing duration of a first timer of the terminal to the first duration value includes a first module of the terminal that sends a first instruction to a second module of the terminal, where the first instruction carries indication information used to indicate the first duration value, and the second module sets the timing duration of the first timer of the terminal to the first duration value based on the indication information. The first module is an application processor, and the second module is a modem.

In a possible design, after setting a timing duration of a first timer of the terminal to the first duration value, the method further includes, when the timing duration of the first timer of the terminal exceeds the first duration value, the first module of the terminal sends a second instruction to a second module of the terminal, where the second instruction is used to instruct the second module to request the network device to release the RRC connection. The first module is an application processor, and the second module is a modem.

In a possible design, the method further includes the first timer that is reset when at least one of the following conditions is met: the terminal receives downlink data, the terminal receives downlink signaling, the terminal sends uplink data, and the terminal sends uplink signaling.

In a possible design, the application type of the first application corresponds to at least two duration values, and setting a timing duration of a first timer of the terminal to the first duration value includes setting the timing duration of the first timer to the first duration value in the at least two duration values.

In a possible design, the method further includes the terminal that enters the RRC connected state, and after setting a timing duration of a first timer of the terminal to the first duration value, the method further includes collecting statistics about data transmission of the terminal in the RRC connected state, to obtain a statistical result, and adjusting the timing duration of the first timer based on the statistical result.

In a possible design, adjusting the timing duration of the first timer based on the statistical result includes, if the statistical result is greater than a first threshold, increasing the timing duration of the first timer from the first duration value to a second duration value, and when a timing value of the first timer exceeds the timing duration, requesting a network device to release the RRC connection, and reducing the timing duration of the first timer from the first duration value to a third duration value if the statistical result is less than a second threshold, where the second threshold is less than or equal to the first threshold.

In a possible design, after reducing the timing duration of the first timer from the first duration value to a third duration value if the statistical result is less than a second threshold, the method further includes the terminal that re-enters the RRC connected state, where the timing duration of the first timer is the third duration value.

In a possible design, after the terminal re-enters the RRC connected state, the method further includes collecting statistics about data transmission of the terminal in the RRC connected state, to obtain a statistical result, if the statistical result is greater than the first threshold, increasing the timing duration of the first timer from the third duration value to the first duration value, and when the timing duration of the first timer exceeds the third duration value, requesting the network device to release the RRC connection, and if the statistical result is less than the second threshold, reducing the timing duration of the first timer from the third duration value to a fourth duration value.

In a possible design, the first application keeps running in the foreground.

In a possible design, after setting a timing duration of a first timer of the terminal to the first duration value, the method further includes detecting an operation of closing the first application or switching the first operation to the background, determining whether an application is running in the foreground, if no application is running in the foreground, keeping the timing duration of the first timer as the first duration value, and if an application is running in the foreground, setting the timing duration of the first timer to a duration value corresponding to the application running in the foreground.

In a possible design, a value of the first duration value is a first value in a first time period, and the value of the first duration value is a second value in a second time period, where the first value is different from the second value.

In a possible design, the application type of the first application corresponds to at least two duration values, and the first duration value is a maximum value in the at least two duration values, and/or the first duration value is less than or equal to a timing duration of an inactive timer that is configured on the network device.

According to a sixth aspect, a communication apparatus is provided, where the communication apparatus includes at least one processor, the at least one processor is connected to a memory, and the at least one processor is configured to read and execute a program stored in the memory, so that the apparatus performs the method according to any one of the first aspect, the second aspect, the third aspect, the fourth aspect, and the fifth aspect, or any embodiment of the present disclosure.

According to a seventh aspect, a chip is provided. The chip is coupled to a memory, and is configured to read and execute program instructions stored in the memory, to implement the method according to any one of the first aspect, the second aspect, the third aspect, the fourth aspect, and the fifth aspect, or the embodiments of the present disclosure.

According to an eighth aspect, a computer-readable storage medium is provided. The computer-readable storage medium stores computer instructions. When the instructions are run on a computer, the computer is enabled to perform the method according to any one of the first aspect, the second aspect, the third aspect, the fourth aspect, and the fifth aspect, or any embodiment of the present disclosure.

According to a ninth aspect, a computer program product is provided. When the computer program product is invoked by a computer, the computer is enabled to perform the method according to any one of the first aspect, the second aspect, the third aspect, the fourth aspect, and the fifth aspect, or any embodiment of the present disclosure.

DESCRIPTION OF EMBODIMENTS

Figure 1:
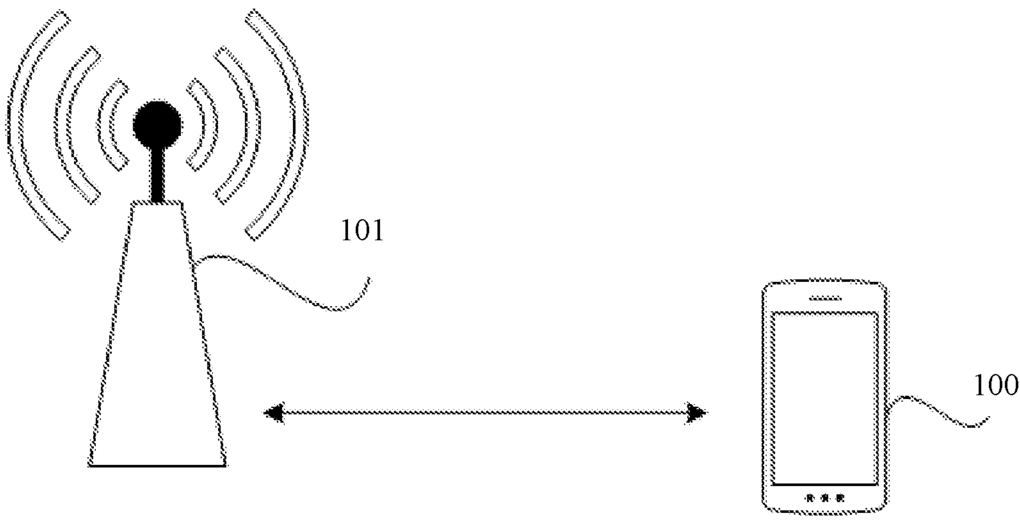
FIG. 1 is a schematic diagram of a network architecture according to an embodiment of this disclosure.

To make the objectives, technical solutions, and advantages of embodiments of this disclosure clearer, the following further describes the embodiments of this disclosure in detail with reference to the accompanying drawings. It should be understood that the terms "first", "second", and the like in the embodiments, claims, and accompanying drawings of this disclosure are intended to distinguish between similar objects but do not necessarily indicate a specific order or sequence. In addition, the terms "include", "have", and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

The following describes some terms in embodiments of this disclosure, to facilitate understanding of a person skilled in the art.

(1) Data Packet:

A data packet may be a data packet that is generated and sent to a corresponding application server after any application (APP) installed in a terminal is started and accesses a corresponding application server. The application herein may be a camera application, an instant messaging application (for example, WeChat®), an Internet short video application (for example, TikTok®), an Internet long video application (for example, iQIYI®), a web browsing application, a game, or the like. These applications may be applications pre-installed before the terminal is delivered from a factory, or may be applications downloaded and installed by the terminal from a network side, or may be applications received by the terminal from another terminal. This is not limited in embodiments of this disclosure.

(2) Foreground Application and Background Application:

A foreground application generally refers to an activity window running on a screen that is interacting with a user or a service bound to an activity that is interacting with the user, for example, a notification listener or a voice text service. All applications other than foreground applications are background applications. A background application may be running and receiving data. For example, if WeChat® is switched to the background, the application may further receive a message. For another example, some news advertisement applications running in the background may also push messages.

Generally, there is only one foreground application on a terminal. In some cases, there may also be a plurality of foreground applications on a terminal. For example, for a terminal that supports a screen splitting function, when a split-screen mode is enabled, two or more split-screen windows may be simultaneously displayed on the screen of the terminal, and one application may run in each split-screen window. For example, a video application runs in a first split-screen window, and a social application runs in a second split-screen window, so that a user can chat on a user interface of the social application while watching a video played in a video window of the video application. In this case, both the video application running in the first split-screen window and the social application running in the second split-screen window are foreground applications.

(3) Mechanism for Monitoring an Action or a Status of an Application:

An application processor in a terminal may monitor startup of an application. When an application is started, the application sends registration information to an application framework layer of the application processor. After detecting an application startup event, the application processor may call a function topActivity.getPackageName( ), and obtain an application name of a foreground application based on a return value of the function. Another method for monitoring application startup is as follows. The application processor calls a queryUsageStats method in UsageStatsManager. In the method, information about applications used in a certain time period may be returned in a form of a list, where the list includes mLastTimeUsed (last use time) and mPackageName (application name) of each application, and a name of an application whose last use time is the latest is a newly started application. Certainly, the application processor may alternatively obtain the name of the started application in another manner. This is not limited in embodiments of this disclosure.

The application processor may further monitor a switching action of an application. The application processor may monitor a life cycle of an activity in an application, to monitor the life cycle of the application, and further monitor a switching action of the application. For example, an activity A and an activity B are used as an example. When the activity A enters the foreground, a life cycle of the activity A changes to A.onStart( ) and A.onResume( ), and when the activity A is switched to the activity B, the life cycle of the activity A and a life cycle of the activity B changes as follows: A.onPause( ), B.onStart( ), B.onResume( ), and A.onStop( ). It can be learned that onResume and onPause are in a group, and the two activities are invoked in sequence, and onStart and onStop are in a group, and the two activities are invoked in cross mode. With this feature, the application processor can use a global counter to collect statistics about an application. The counter is incremented by 1 in all Activity.onStart( ) of the application, and is decremented by 1 in all Activity.onStop( ) of the application. When a count value of a counter corresponding to an application is greater than 0, it indicates that the application is in the foreground, or when a count value of a counter corresponding to an application is equal to 0, it indicates that the application is in the background. If the counter value changes from 1 to 0, the corresponding application enters the background from the foreground. If the counter value changes from 0 to 1, the corresponding application enters the foreground from the background. Certainly, the application processor may alternatively determine, in another manner, whether foreground-background switching of an application occurs. This is not limited in embodiments of this disclosure.

The application processor may further monitor a screen splitting operation. When a user performs screen splitting in a manner such as a gesture, the application processor may receive the screen splitting event, and may further obtain a name of the application in the split-screen window by calling a function topActivity.getPackageName( ).

(4) First Timer:

In this embodiment of this disclosure, a timer may be configured on a terminal, and the timer is referred to as a first timer herein. It should be understood that a name of the timer is not limited in embodiments of this disclosure. For example, the first timer may be named an RRC connection release timer. In some embodiments of this disclosure, the first timer is referred to as an RRC connection release timer. It should be understood that the first timer and the RRC connection release timer have a same meaning.

The first timer is a timer used when the terminal is in an RRC connected state. When the first timer expires, the terminal requests a network device to release an RRC connection of the terminal.

That the first timer expires can be understood as that the timing value of the first timer exceeds the timing duration. That is, in this embodiment of this disclosure, that the timing value of the first timer exceeds the timing duration and that the first timer expires have a same meaning.

The first timer may count down based on a timing duration, and the first timer is reset when at least one of the following conditions is met: the terminal receives downlink data, the terminal receives downlink signaling, the terminal sends uplink data, and the terminal sends uplink signaling.

The data exchanged between the terminal and the network device includes data associated with an application of the terminal, for example, operation data generated by the terminal for the application, data sent to the network device by using the application, and data associated with the application sent by the network device to the terminal. The application may be a foreground application or a background application.

The signaling exchanged between the terminal and the network device includes, for example, signaling such as cell reselection signaling, handover signaling, and redirection signaling.

For example, the timing duration of the first timer is 8 seconds, and the first timer starts counting down from the 8th second. When the countdown reaches 5 seconds, the terminal receives downlink data, and the first timer is reset, that is, the first timer restarts counting down from the 8th second. That is, each time the downlink data or the downlink signaling is received, the first timer is triggered to start countdown again. When the first timer counts down to 0, the first RRC timer expires.

In this embodiment of this disclosure, unless otherwise specified, the RRC connection release timer is an RRC connection release timer configured in the terminal, that is, the first timer. In addition, it should be noted that, in this embodiment of this disclosure, setting the timing duration of the first timer, setting the timing duration of the first timer, setting a value of the timing duration/the timing duration of the first timer, or similar expressions have a same meaning.

Based on explanations of the foregoing terms, FIG. 1 is a schematic diagram of an example architecture of a communication system to which this disclosure is applied. The communication system may include a network device and a terminal. In FIG. 1, an example in which the communication system includes one network device 101 and one terminal 100 is used for description. The network device 101 may communicate with the terminal 100 in a wireless manner, and mainly perform transmission by using a Uu air interface.

The network device 101 includes, for example, an access network (AN) device, which may also be referred to as a radio access network device and is configured to connect the terminal to a wireless network. For example, a base station (for example, an access point) may be a device that communicates with a wireless terminal over an air interface in an access network through one or more cells. For example, the access network device may include an evolved NodeB (eNB, e-NodeB, or evolutional Node B) in a Long-Term Evolution (LTE) system or an LTE-Advanced (LTE-A) system, or may include a next generation node B (gNB), a transmission and reception point (TRP) (or a transceiver node), a baseband processing unit (BBU) and a radio remote unit (RRU) in a fifth generation mobile communication technology (5G) New Radio (NR) system, a BBU, and an active antenna unit (AAU), or may include a centralized unit (CU) and a distributed unit (DU) in a cloud access network (Cloud RAN) system, or may include an access point in a WI-FI system, or may include a radio network controller (RNC), a base station controller (BSC), a base transceiver station (BTS), a home network device (for example, a home evolved NodeB, a home NodeB, or HNB), or may include a base station, a small cell, a micro base station, or the like in a future communication network. This is not limited in embodiments of this disclosure.

The terminal 100 may be a mobile phone, a tablet computer, a notebook computer, a wearable device (for example, a smartwatch or smart glasses) having a wireless communication function, or the like. An example embodiment of the terminal includes but is not limited to a device running iOS®, Android®, Microsoft®, or another operating system. The terminal may alternatively be another portable device provided that the portable device can dynamically adjust a timing duration of the RRC connection release timer. It should be further understood that, in some other embodiments of this disclosure, the terminal may not be a portable device, but a desktop computer that can implement the foregoing functions.

In this embodiment of this disclosure, the communication system may be an LTE system, a 5G communication system such as an NR system, or a communication system integrating a plurality of communication technologies (for example, a communication system integrating an LTE technology and an NR technology), or may be another communication system such as a public land mobile network (PLMN) system, or another communication system that may appear in the future. This is not limited in this disclosure.

Figure 2:
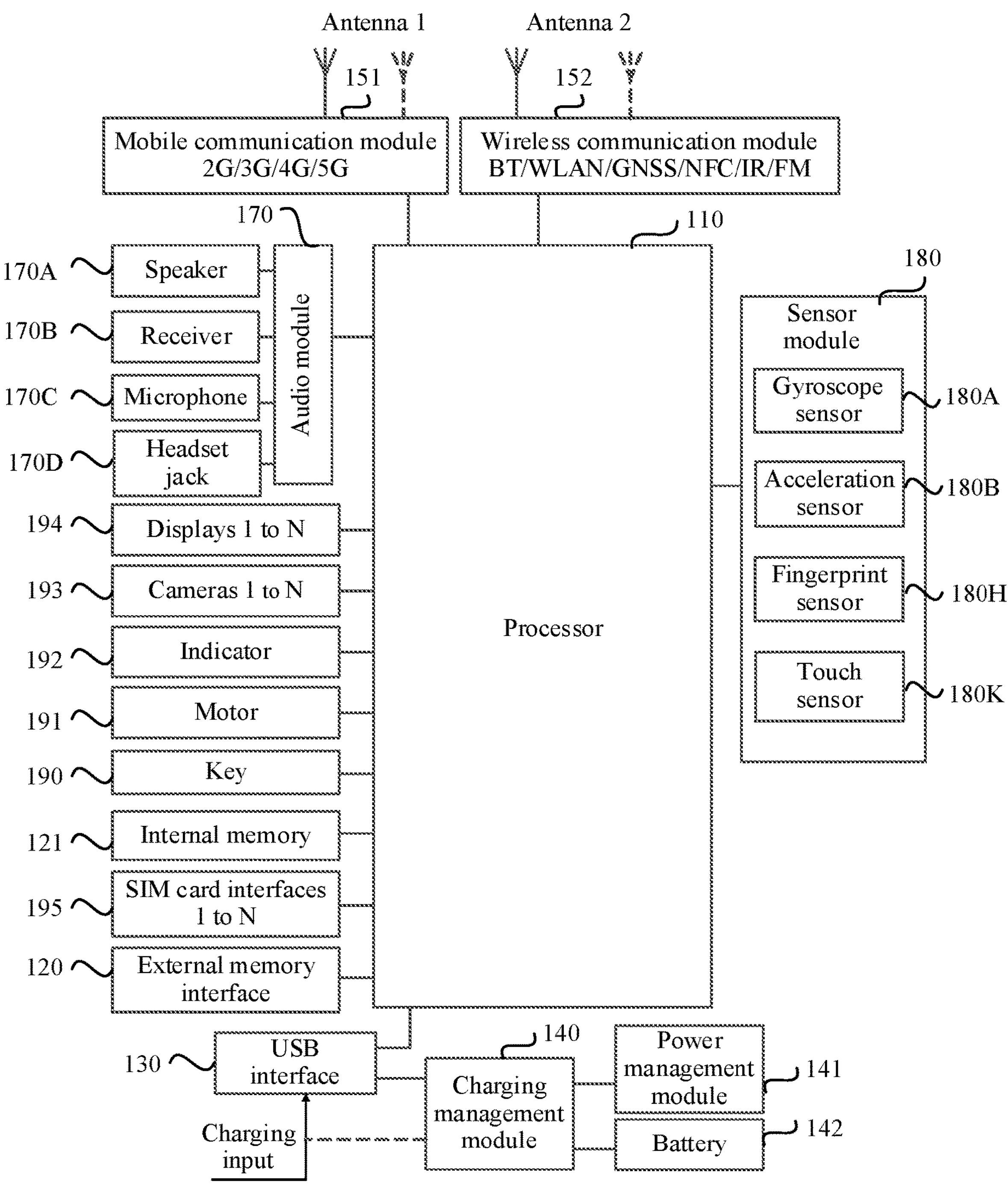
FIG. 2 is a schematic diagram of a structure of a terminal according to an embodiment of this disclosure.

For example, FIG. 2 is a schematic diagram of a possible structure of the terminal 100. The terminal 100 may include a processor 110, an external memory interface 120, an internal memory 121, a Universal Serial Bus (USB) interface 130, a charging management module 140, a power management module 141, a battery 142, an antenna 1, an antenna 2, a mobile communication module 151, a wireless communication module 152, an audio module 170, a speaker 170A, a receiver 170B, a microphone 170C, a headset jack 170D, a sensor module 180, a key 190, a motor 191, an indicator 192, a camera 193, and a display 194, a subscriber identification module (SIM) card interface 195, and the like. The sensor module 180 may include a gyroscope sensor 180A, an acceleration sensor 180B, a fingerprint sensor 180H, a temperature sensor 180J, and a touch sensor 180K (certainly, the terminal 100 may further include other sensors, such as a pressure sensor, an acceleration sensor, a gyroscope sensor, an ambient light sensor, and a bone conduction sensor, which are not shown in the figure).

It can be understood that the structure shown in this embodiment of this disclosure does not constitute a specific limitation on the terminal 100. In some other embodiments of this disclosure, the terminal 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an AP, a modem, a graphics processing unit (GPU), an image signal processor (ISP), a controller, a memory, a video codec, a digital signal processor (DSP), a baseband processor, and/or a neural-network processor (NPU). Different processing units may be independent devices, or may be integrated into one or more processors. The controller may be a nerve center and a command center of the terminal 100. The controller may generate an operation control signal based on an instruction operation code and a time sequence signal, to complete control of instruction reading and instruction execution.

In some embodiments, a memory may be further disposed in the processor 110, and is configured to store instructions and data. For example, the memory in the processor 110 may be a cache. The memory may store instructions or data that has been used or cyclically used by the processor 110. If the processor 110 needs to use the instructions or data again, the processor 110 may directly call the instructions or data from the memory. This avoids repeated access, reduces waiting time of the processor 110, and improves system efficiency.

The internal memory 121 may be configured to store one or more computer programs, and the one or more computer programs include instructions. The processor 110 runs the instructions stored in the internal memory 121, to implement various function applications and data processing of the terminal 100. The internal memory 121 may include a program storage area and a data storage area. The program storage area may store an operating system, code of an application, and the like. The data storage area may store a data transmission statistical result, a threshold (used to determine whether a condition for adjusting a timing duration of an RRC connection release timer is met), and the like that are recorded in a process of using the terminal 100.

In addition, the internal memory 121 may include a high-speed random-access memory (RAM), and may further include a non-volatile memory, such as one or more disk storage components, a flash memory device, or a Universal Flash Storage (UFS). In some embodiments, the processor 110 may run the instructions stored in the internal memory 121 and/or the instructions stored in the memory disposed in the processor 110, so that the terminal 100 performs the RRC connection release control method provided in the embodiments of this disclosure.

Certainly, information such as code of the RRC connection release control method provided in the embodiments of this disclosure and a data transmission statistical result may be further stored in an external memory. In this case, the processor 110 may run, by using the external memory interface 120, the code for releasing an RRC connection stored in the external memory.

The external memory interface 120 may be configured to connect to an external memory card (for example, a micro Secure Digital (SD) card), to extend a storage capability of the terminal 100. The external memory card communicates with the processor 110 through the external memory interface 120, to implement a data storage function. For example, information such as a statistical result obtained by the terminal by collecting statistics about data transmission is stored in the external memory card.

A wireless communication function of the terminal 100 may be implemented by using the antenna 1, the antenna 2, the mobile communication module 151, the wireless communication module 152, the modem processor, the baseband processor, and the like.

The antenna 1 and the antenna 2 are configured to transmit and receive an electromagnetic wave signal. Each antenna in the terminal 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 151 may provide a wireless communication solution that is applied to the terminal 100, including second generation (2G)/third generation (3G)/fourth generation (4G)/5G and the like. The mobile communication module 151 may include at least one filter, a switch, a power amplifier, a low noise amplifier (LNA), and the like. The mobile communication module 151 may receive an electromagnetic wave through the antenna 1, perform processing such as filtering or amplification on the received electromagnetic wave, and transfer the electromagnetic wave to the modem processor for demodulation. The mobile communication module 151 may further amplify a signal modulated by the modem processor, and convert the signal into an electromagnetic wave for radiation through the antenna 1. In some embodiments, at least some functional modules of the mobile communication module 151 may be disposed in the processor 110. In some embodiments, at least some functional modules of the mobile communication module 151 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent device. In some other embodiments, the modem processor may be independent of the processor 110, and is disposed in a same device as the mobile communication module 151 or another functional module.

The wireless communication module 152 may provide a wireless communication solution that is applied to the terminal 100, including a wireless local area network (WLAN) (for example, a WI-FI network), a global navigation satellite system (GNSS), and the like. The wireless communication module 152 may be one or more devices integrating at least one communication processing module. The wireless communication module 152 receives an electromagnetic wave through the antenna 2, performs frequency modulation and filtering processing on an electromagnetic wave signal, and sends a processed signal to the processor 110. The wireless communication module 152 may further receive, from the processor 110, a to-be-sent signal (for example, indication information used to instruct the network device to release an RRC connection), perform frequency modulation and amplification on the signal, and convert the signal into an electromagnetic wave for radiation through the antenna 2.

In some embodiments, the antenna 1 of the terminal 100 is coupled to the mobile communication module 151, and the antenna 2 is coupled to the wireless communication module 152, so that the terminal 100 can communicate with another device.

The charging management module 140 is configured to receive a charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input by using a wireless charging coil of the user equipment 100. The charging management module 140 supplies power to the terminal 100 through the power management module 141 while charging the battery 142.

The power management module 141 is configured to connect to the battery 142, the charging management module 140, and the processor 110. The power management module 141 receives an input of the battery 142 and/or an input of the charging management module 141, and supplies power to the processor 110, the internal memory 121, the external memory interface 120, the display 194, the camera 193, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

Based on the terminal shown in FIG. 2, in this embodiment of this disclosure, a first module in the terminal and a second module in the terminal may cooperate with each other to implement the RRC connection release control method provided in this embodiment of this disclosure.

In some embodiments, the first module of the terminal may send a first instruction to the second module of the terminal, where the first instruction carries indication information used to indicate the timing duration of the RRC connection release timer, and the second module sets the timing duration of the RRC connection release timer of the terminal to a value of the timing duration based on the indication information.

In some other embodiments, if information exchange is not performed (for example, no downlink data or signaling is received, or no uplink data or signaling is sent) between the terminal and the network device within the timing duration of the RRC connection release timer, the first module of the terminal sends a second instruction to the second module of the terminal, where the second instruction is used to instruct the second module to request the network device to release an RRC connection of the terminal.

The first module may be an AP or an internal logic unit thereof, or may be another central processing unit (CPU), a digital signal processor (DSP), a single-chip microcomputer, or the like. The second module may be a modem or an internal logic unit thereof.

Figure 3:
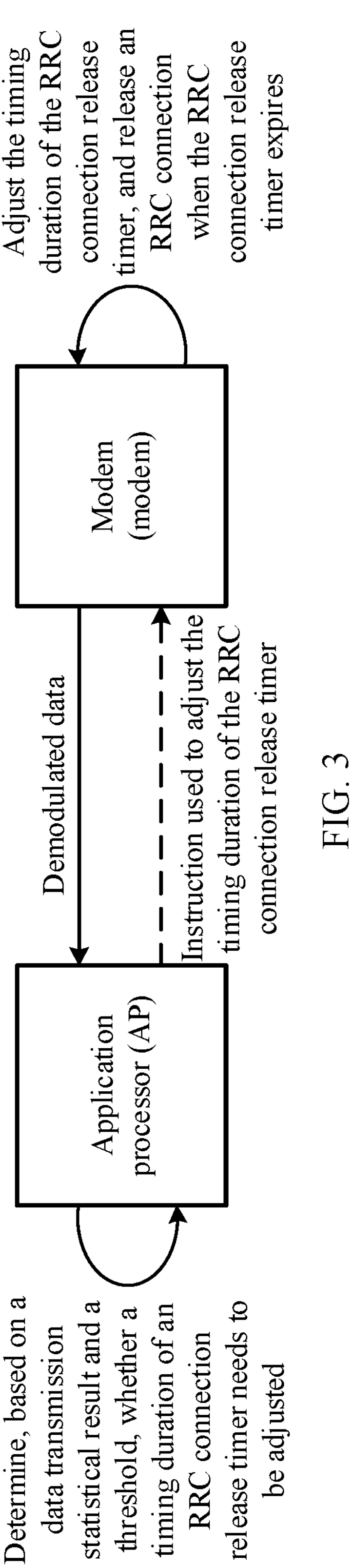
FIG. 3 is a schematic diagram of cooperation between an AP and a modem according to an embodiment of this disclosure.

For example, the first module is an application processor, and the second module is a modem. FIG. 3 is a schematic diagram of an example in which an AP and a modem cooperate with each other to implement this embodiment of this disclosure.

As shown in FIG. 3, the AP collects statistics about data demodulated by the modem to obtain a statistical result, determines, based on the statistical result, whether the timing duration of the RRC connection release timer needs to be adjusted, and if it is determined that the timing duration needs to be adjusted, sends an instruction to the modem, to instruct the modem to adjust the timing duration of the RRC connection release timer. Furthermore, the application processor may send a target value of the timing duration of the RRC connection release timer to the modem by using the instruction, so that the modem adjusts the timing duration of the RRC connection release timer to be equal to the target value. When the RRC connection release timer expires, the modem requests the network side to release the RRC connection. Alternatively, the application processor may send an adjustment value of the timing duration of the RRC connection release timer to the modem, so that the modem adjusts the timing duration of the RRC connection release timer by using the adjustment value.

In some other embodiments, the modem collects statistics about the demodulated data to obtain a statistical result, determines, based on the statistical result, whether the timing duration of the RRC connection release timer needs to be adjusted, and if it is determined that the timing duration needs to be adjusted, adjusts the timing duration of the RRC connection release timer. When the RRC connection release timer expires, the modem requests the network side to release the RRC connection. Optionally, the application processor may configure, for the modem, a value (one or more values) of the timing duration used to control the RRC connection release timer and a threshold (one or more thresholds, for example, a first threshold and a second threshold), so that the modem may control RRC connection release based on the value of the timing duration and the threshold.

Figure 4:
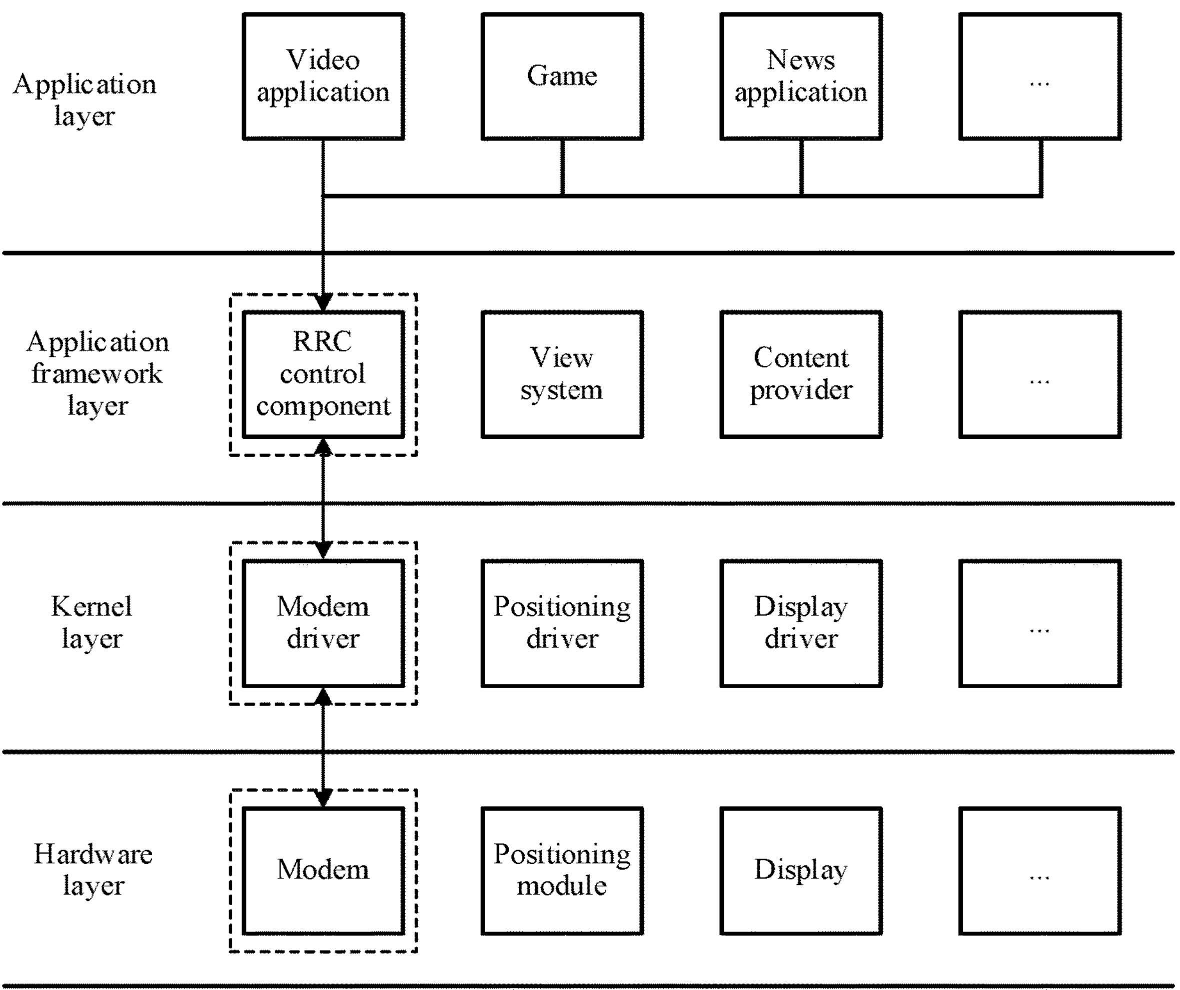
FIG. 4 is a schematic diagram of a software architecture of a terminal according to an embodiment of this disclosure.

FIG. 4 is a schematic diagram of a software architecture of a terminal according to an embodiment of this disclosure. As shown in FIG. 4, from a lower layer to an upper layer, the software architecture may include a hardware layer, a kernel layer, an application framework layer, and an application layer.

The hardware layer includes various hardware circuit structures.

The kernel layer provides underlying drivers (for example, display, positioning, audio, camera, BLUETOOTH, WI-FI, and power management) for various hardware of the terminal. Drivers related to this embodiment of this disclosure include a modem driver.

The application framework layer is used to provide various system components and application components. Components related to this embodiment of this disclosure include an RRC control component, to implement RRC connection management, for example, including RRC connection release and setting of an RRC connection release timer. The RRC control component may be included in the modem.

The application layer includes various applications, for example, a video application and a game.

Based on whether there is an RRC connection between a terminal and a network device, the terminal may be classified into a non-connected state (including an RRC idle state and an RRC inactive state) and a connected state (or an RRC connected state).

(1) In the RRC non-connected state (i.e., the RRC-IDLE state or the RRC INACTIVE state), there is no RRC connection between the terminal and the network, and therefore power consumption is relatively low.

(2) In the RRC connected (i.e., RRC-CONNECTED) state, there is an RRC connection between the terminal and the network, and therefore power consumption is relatively high. The RRC connection may be established on a dedicated physical channel, and in this case, the terminal uses a dedicated channel (DCH), and can transmit a large amount of user data. The RRC connection may also be established on a shared channel, and in this case, the terminal uses a forward access channel (FACH), and the terminal continues to monitor an FACH transport channel in the downstream direction, and can transmit a small amount of user data on a common or shared transport channel (for example, a random-access channel (RACH)) in the upstream direction.

It should be understood that current consumption may be used to represent power consumption of the terminal.

A switchover may occur between the RRC-IDLE state and the RRC-CONNECTED state. In the RRC-IDLE state, when the terminal needs to transmit a data packet, the terminal sends an RRC connection setup request to the network device to request to establish an RRC connection. After the RRC connection is established, the terminal enters the RRC-CONNECTED state. In the RRC-CONNECTED state, after user data is transmitted, if no data is transmitted within a specified time (that is, no information is exchanged between the terminal and the network device within a specified time), the RRC connection is released, and the terminal enters the RRC-IDLE state or the RRC INACTIVE state (that is, the RRC non-connected state).

In a scenario in which the screen of the terminal is turned off, if the terminal does not receive data within a fixed duration after the screen is turned off, the terminal may request to release an RRC connection. For example, if no data arrives within 1 second after the screen is turned off (certainly, a timing duration of an RRC connection release timer in a screen-off state may be another value, for example, 2 seconds or 3 seconds, which is not limited in this embodiment of this disclosure), the terminal requests the network device to release the RRC connection. In a screen-on scenario of the terminal, when an inactive timer that is corresponding to the terminal and that is configured on the base station side expires, the base station releases the RRC connection to the terminal. A duration of the inactive timer is fixed, for example, 10 seconds.

Regardless of whether the screen is turned off or on, a timing duration used to control RRC connection release is a fixed timing duration. This may cause relatively high power consumption because the RRC connection release time is too early or too late.

For example, a scenario in which power consumption of the terminal is excessively high because the RRC connection is released too early is as follows. If the terminal does not transmit data within a specified duration (for example, 1 second or 2 seconds) after the screen is turned off, the terminal requests to release an RRC connection, but if data packets still arrive after the RRC connection is released, the terminal needs to perform random-access to reestablish an RRC connection, so as to receive data that arrives subsequently. In this scenario, the terminal needs to initiate random-access because the RRC connection is released too early. The random-access process consumes a large amount of power.

For another example, a scenario in which power consumption of the terminal is excessively high because an RRC connection is released too late is as follows. For example, the timing duration of the inactive timer that is configured on the network device is equal to 10 seconds. If data packets sent by a service of the terminal are sparse, a new data packet is sent 20 seconds after a data packet arrives. After receiving a data packet, the network device needs to wait for at least 10 seconds before releasing an RRC connection of the terminal. However, the terminal is in an RRC connected state in this time period, causing relatively high power consumption.

Based on the foregoing existing problem, embodiments of this disclosure provide an RRC connection release control method and an apparatus, to set a timing duration of a terminal, so as to control RRC connection release based on the timing duration. The timing duration is used to control release of an RRC connection of the terminal.

In some embodiments, a first timer (or an RRC connection release timer) may be configured in the terminal, and the timing duration of the RRC connection release timer may be set or adjusted, so that the timing duration of the RRC connection release timer can be dynamically adjusted, RRC connection release can be controlled, and power consumption of the terminal can be reduced.

The method and an apparatus are based on a same concept. Because the method and the apparatus have a similar problem-resolving principle, for implementations of the apparatus and the method, refer to each other, and no repeated description is provided.

Figure 5:
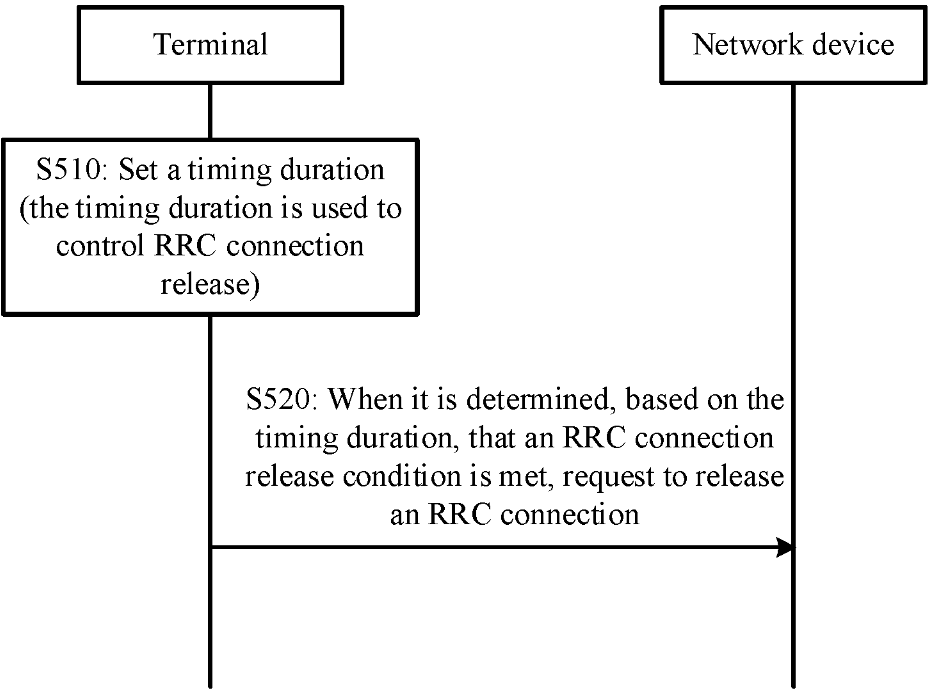
FIG. 5 is a schematic diagram of signaling interaction in an RRC connection release control method according to an embodiment of this disclosure.

FIG. 5 is a schematic diagram of signaling interaction in an RRC connection release control method according to an embodiment of this disclosure. The method may be applied to the network architecture shown in FIG. 1, and certainly may also be applied to another network architecture. This is not limited in this disclosure.

As shown in FIG. 5, in S510, a terminal determines a timing duration, where the timing duration is used to control RRC connection release.

In some embodiments, in this step, the terminal may set the timing duration of the RRC connection release timer.

In S520, when it is determined, based on the timing duration, that an RRC connection release condition is met, the terminal requests the network device to release an RRC connection.

Further, the terminal determines that information exchange is performed between the terminal and the network device within the timing duration, and if information exchange is not performed between the terminal and the network device, an RRC connection release condition is met, and the terminal requests the network device to release the RRC connection of the terminal.

In some embodiments, if an RRC connection release timer is configured in the terminal, when the RRC connection release timer expires, it indicates that an RRC connection release condition is met. Therefore, the terminal requests the network device to release the RRC connection of the terminal.

The information exchange includes at least one of the following cases: the terminal receives downlink data sent by the network device, the terminal receives downlink signaling sent by the network device, the terminal sends uplink data to the network device, and the terminal sends uplink signaling to the network device.

During running of the RRC connection release timer, if the terminal exchanges the foregoing information with the network device, the RRC connection release timer is reset.

Further, if information exchange is performed between the terminal and the network device within the timing duration, the terminal re-performs the following step by using a time at which the information exchange occurs as a start point: determining whether information exchange is performed between the terminal and the network device within the timing duration, and if information exchange is not performed, the terminal requests the network device to release the RRC connection of the terminal. If an RRC connection release timer is configured in the terminal, when the terminal exchanges the foregoing information with the network device, the RRC connection release timer is reset, and the RRC connection release timer restarts timing after being reset. When the RRC connection release timer expires, the terminal requests the network device to release the RRC connection of the terminal.

Optionally, in S520, the terminal may send an RRC connection release request to the network device, to request the network device to release the RRC connection to the terminal. The RRC connection release request is signaling that carries RRC connection release indication information, for example, ReleasePreference-r16::= SEQUENCE{preferredRRC-State-r16 ENUMERATED {idle, inactive, connected, outOfConnected}} carried in an assistance information (UEAssistanceInformation) message sent by the terminal to the base station in NR, indicating a state requested by the terminal. When the preferredRRC-State-r16 is in an idle or inactive state, it indicates that the terminal requests to release the RRC connection. A name of the signaling is not limited in this disclosure.

After receiving the request for releasing the RRC connection of the terminal, the network device may determine, based on a data transmission requirement, whether to release the RRC connection between the network device and the terminal. For example, if the network device does not need to send data to the terminal, the network device may release the RRC connection as requested by the terminal, otherwise, the network device may maintain the RRC connection between the network device and the terminal to send downlink data.

In some embodiments of this disclosure, in S510, when the first application of the terminal runs in the foreground, the terminal determines a timing duration corresponding to the first application.

In response to the first operation, the terminal may determine the timing duration corresponding to the first application running in the foreground. Further, if an RRC connection release timer is configured in the terminal, the terminal sets a timing duration of the RRC connection release timer to the determined timing duration.

The "first application" is not limited to a specific application or a specific type of application, and this expression manner is merely for clear description. An application type classification manner is not limited in this embodiment of this disclosure. For example, the application type may include an Internet long video application, an Internet short video application, a web page news application, a game application, or the like. For example, the first application may be an Internet long video application, an Internet short video application, a game, a social application, or the like.

The first operation may be an operation of starting the first application. For example, the user starts the first application by performing a screen touch operation (for example, tapping an application icon on a home screen of a mobile phone). For another example, the first application may also be started by another application. The first operation may alternatively be an operation of switching the first application from the background to the foreground. For example, the user switches, by performing a screen touch operation, the first application running in the background to the foreground for running.

The application processor may detect the first operation, so as to respond to the first operation, so that the first application runs in the foreground. For example, after detecting the first operation of starting the first application, the application processor may control the first application to run in the foreground. Further, the state of the first application may be set to a running state (for example, a Resume( ) state), and a user interface of the first application is displayed on a screen of the terminal.

In some embodiments of this disclosure, a timing duration is configured in the terminal for an application type of the first application, so that the terminal can obtain the timing duration corresponding to the application type after determining the application type of the first application. Further, if an RRC connection release timer is configured in the terminal, the terminal may set a timing duration of the RRC connection release timer of the terminal as the timing duration. The timing duration of the RRC connection release timer is set, so that the timing duration of the RRC connection release timer may be adapted to the application type of the application running in a foreground, so that RRC connection release can be controlled based on a data transmission status of the first application, thereby reducing power consumption of the terminal.

In some embodiments of this disclosure, the timing duration is less than or equal to the timing duration of the inactive timer that is configured on the network device. In this way, a timing duration adjustment range of the RRC connection release timer can reach a maximum of a timing duration of the inactive timer that is configured on the network device by default, so that performance (for example, power consumption and/or a delay) of the terminal can be at least close to performance of the network side.

In some embodiments of this disclosure, timing durations corresponding to different application types may be the same or may be different. For example, if the application type of the first application is a first application type (for example, an Internet short video application type), the timing duration is a timing duration corresponding to the first application type, or if the application type of the first application is a second application type (for example, an Internet short video application type) different from the first application type, the timing duration is a timing duration corresponding to the second application type, where the timing duration corresponding to the second application type is the same as or different from the timing duration corresponding to the first type. In this way, the timing duration that may be used to control RRC connection release or the timing duration of the RRC connection release timer is adapted to the application type of the application running in the foreground.

In some embodiments, a timing duration corresponding to the first application or the application type of the first application includes at least two duration values, where the at least two duration values include a first duration value. Correspondingly, during running of the first application in the foreground, the first duration value in the at least two duration values may be determined as a value of the timing duration used to control RRC connection release. Further, if an RRC connection release timer is configured in the terminal, the timing duration of the RRC connection release timer may be set to the first duration value. Certainly, in another scenario, when the first application runs in the foreground, the timing duration of the RRC connection release timer may also be set to another duration value in the at least two duration values, so that the RRC connection release timer can be set more flexibly.

The at least two duration values may be stored as an RRC connection release timer duration set, or certainly may be stored in another form or data structure. This is not limited in this embodiment of this disclosure.

In some embodiments, the first duration value of the at least two duration values is a maximum value in the at least two duration values. In this way, after the first application runs in the foreground, a timing duration used to control RRC connection release or a timing duration of an RRC connection release timer is set to a maximum value in at least two duration values corresponding to the first application or an application type of the first application, so that a probability that an RRC connection is released too early can be reduced or avoided. In this way, if data transmission and reception of the first application are relatively dense, data transmission and reception of the first application can be ensured, thereby ensuring data transmission of the first application and reducing power consumption of the terminal. In some other embodiments, the first duration value is a maximum value in the at least two durations, and the first duration value is less than or equal to a timing duration of an inactive timer that is configured on the network device.

In some embodiments of this disclosure, during running of the first application in the foreground, after the terminal enters the RRC connected state, statistics about data transmission of the terminal in the RRC connected state are collected, to obtain a statistical result, and a timing duration used to control RRC connection release is adjusted based on the statistical result. If the RRC connection release timer is provided in the terminal, a timing duration of the RRC connection release timer may be adjusted based on the statistical result, so that the timing duration of the RRC connection release timer is no longer fixed, but can be dynamically adjusted. In this way, the timing duration of the RRC connection release timer can be adaptively adjusted based on a data transmission status, so that the timing duration can match a data transmission status, thereby reducing power consumption of the terminal.

Optionally, the terminal may adjust the timing duration used to control RRC connection release or the RRC connection release timer in the RRC non-connected state, or may adjust the timing duration used to control RRC connection release or the RRC connection release timer in the RRC connected state.

Further, after adjusting the value of the timing duration, the terminal continues to determine whether information exchange is performed with the network device within the timing duration after the value is adjusted, and if information exchange is not performed, requests the network device to release the RRC connection of the terminal. If an RRC connection release timer is configured in the terminal, after the value of the timing duration of the RRC connection release timer is adjusted, when the RRC connection release timer expires, it indicates that information exchange is not performed within the timing duration of the RRC connection release timer, and the terminal requests the network device to release the RRC connection of the terminal.

When the terminal is in an RRC connected state and runs a foreground application, received data is mainly data of the foreground application. Therefore, in some embodiments of this disclosure, the terminal may collect statistics about data transmission of the foreground application. In some scenarios, when the terminal is in an RRC connected state, a background application may also transmit a small data volume. Therefore, in some embodiments of this disclosure, the terminal may collect statistics about data transmission of the foreground application and statistics about data transmission of a background application that transmits data.

In some scenarios, there is one foreground application. For example, when the terminal is in a full-screen mode, there is one foreground application. In some other scenarios, there may be a plurality of foreground applications. For example, when the terminal is in a split-screen mode, a screen may be divided into a plurality of split-screen windows, and different applications may be started and run in different split-screen windows. In this case, there may be a plurality of foreground applications, and a data transmission statistical result collected by the terminal includes data transmission statistical results of these foreground applications.

In this embodiment of this disclosure, the data transmission statistical result may be used to represent a data transmission density. The data transmission statistical result may be a statistical result of data received by the terminal, or may be a statistical result of data sent by the terminal. The terminal may dynamically adjust the timing duration of the RRC connection release timer based on the statistical result of received data, or may dynamically adjust the timing duration of the RRC connection release timer based on the statistical result of sent data.

In this embodiment of this disclosure, collecting statistics about data transmission can be understood as collecting statistics about a data transmission volume. Optionally, when statistics about data transmission of downlink data are collected, the statistical result may include at least one of the following:

(1) Data volume, that is, the amount of received data, for example, a quantity of bytes or a quantity of bits of received data. A measurement unit of the data volume is not limited in this disclosure.

(2) Quantity of data packets, that is, a quantity of received data packets.

(3) Data throughput rate, that is, a throughput rate of the received data. The data throughput rate refers to an average rate of data transmitted within a certain time period. For example, the data throughput rate of received data may be a quantity of bits received per second (bits per second (bps)). For example, the quantity of bits of the received data may be divided by a statistical duration (seconds), to obtain the data throughput rate at the current moment.

(4) Bit rate, that is, a bit rate of the received data. The bit rate refers to a quantity of bits (bits) transmitted per second.

(5) Packet interval, for example, an average interval between two received packets, measured in seconds.

In this embodiment of this disclosure, a statistical result may be compared with a threshold to determine whether a condition for adjusting the timing duration or adjusting the timing duration of the RRC connection release timer is met. If it is determined that the condition is met, the value of the timing duration or the value of the timing duration of the RRC connection release timer is adjusted, otherwise, the value of the timing duration or the timing duration of the RRC connection release timer may be kept unchanged.

Optionally, the threshold used to determine whether to adjust the foregoing timing duration or adjust the timing duration of the RRC connection release timer may include a first threshold and a second threshold, where the first threshold is greater than or equal to the second threshold. The first threshold and the second threshold may be stored as a threshold group, or certainly may be stored in another form or data structure. This is not limited in this embodiment of this disclosure.

When the terminal is in the RRC connected state, and the data transmission statistical result reaches (greater than or equal to) the first threshold, the value of the timing duration may be increased. When information exchange is not performed between the terminal and the network device within the timing duration, if the data transmission statistical result is less than or equal to the second threshold, the value of the timing duration may be reduced. Further, after it is determined that information exchange is not performed between the terminal and the network device within the timing duration whose value is the first duration value, if the statistical result is less than the second threshold, the value of the timing duration is reduced from the first duration value to a third duration value, or if the statistical result is greater than the first threshold, the value of the timing duration is increased from the first duration value to a second duration value, or after it is determined that information exchange is not performed between the terminal and the network device within the timing duration whose value is the first duration value, if the statistical result is less than a second threshold, the value of the timing duration is reduced from the first duration value to a third duration value.

If an RRC connection release timer is configured in the terminal, when the terminal is in an RRC connected state, and the data transmission statistical result reaches (greater than or equal to) the first threshold, the value of the timing duration of the RRC connection release timer may be increased, or when the RRC connection release timer expires, if the data transmission statistical result is less than or equal to the second threshold, the value of the timing duration of the RRC connection release timer may be reduced. Further, if the data transmission statistical result is greater than the first threshold, the value of the timing duration of the RRC connection release timer is increased from the first duration value to the second duration value, or when a timing value of the RRC connection release timer exceeds the timing duration, the terminal requests the network device to release the RRC connection, and if the data transmission statistical result is less than the second threshold, the timing duration of the RRC connection release timer is reduced from the first duration value to the third duration value.

Optionally, if the data transmission statistical result is greater than the first threshold, that if the data transmission statistical result is greater than the first threshold, the value of the timing duration of the RRC connection release timer is increased from the first duration value to the second duration value may include the following cases:

Case 1: When the RRC connection release timer expires, if the data transmission statistical result is greater than the first threshold, the timing duration of the RRC connection release timer is increased from the first duration value to the second duration value.

Case 2: When the terminal is in the RRC connected state, if the data transmission statistical result is greater than the first threshold, the timing duration of the RRC connection release timer is increased from the first duration value to the second duration value.

Further, if the statistical result is less than the second threshold, after the timing duration (a timing duration used to control RRC connection release) is reduced from the first duration value to the third duration value, the terminal re-enters the RRC connected state, and the terminal determines whether information exchange is performed between the terminal and the network device within the timing duration whose value is the third duration value, and if information exchange is not performed, the terminal requests the network device to release the RRC connection of the terminal. If information exchange is performed between the terminal and the network device within the timing duration whose value is the third duration value, the terminal re-performs the following step by using a time at which the information exchange occurs as a start point: determining whether information exchange is performed between the terminal and the network device within the timing duration whose value is the third duration value, and if information exchange is not performed, the terminal requests the network device to release the RRC connection of the terminal.

If an RRC connection release timer is configured in the terminal, and the first application keeps running in the foreground, after the value of the timing duration of the RRC connection release timer is reduced from the first duration value to the third duration value, the terminal re-enters the RRC connected state, and the timing duration of the RRC connection release timer is still the third duration value. In some other scenarios, after the timing duration of the RRC connection release timer is reduced from the first duration value to the third duration value, if the first application is switched from the foreground to the background for running, and is switched back to the foreground for running, the terminal determines the first duration value corresponding to the application type of the first application, and sets the timing duration of the RRC connection release timer of the terminal to the first duration value after the terminal reestablishes an RRC connection.

Further, in some embodiments, after the terminal re-enters the RRC connected state, the method further includes collecting statistics about data transmission of the terminal in the RRC connected state to obtain a statistical result, and if the statistical result is greater than a first threshold, increasing a timing duration of an RRC connection release timer from a third duration value to a first duration value, when a timing value of the RRC connection release timer exceeds the timing duration, requesting the network device to release the RRC connection, and if the statistical result is less than the second threshold, reducing the timing duration of the RRC connection release timer from the third duration value to the fourth duration value.

Further, in some embodiments, after the timing duration of the RRC connection release timer of the terminal is set to the first duration value, the method further includes determining, in response to an operation of closing the first application or switching the first application to the background, whether an application is running in the foreground, and if no application is running in the foreground, keeping the timing duration of the RRC connection release timer to be the first duration value, or if an application running is running in the foreground, setting the timing duration of the RRC connection release timer to a duration value corresponding to the application running in the foreground.

In the foregoing embodiment, if the data transmission statistical result is greater than the first threshold, the value of the timing duration of the RRC connection release timer is increased, or if the timing value of the RRC connection release timer exceeds the timing duration, and if the data transmission statistical result is less than the second threshold (the second threshold is less than or equal to the first threshold), the value of the timing duration of the RRC connection release timer is reduced. If the data transmission statistical result is greater than the first threshold, it indicates that the data transmission and reception are relatively dense. In this case, increasing the value of the timing duration of the RRC connection release timer can reduce or avoid a probability that the RRC connection is released too early, thereby reducing power consumption of the terminal. If the data transmission statistical result is less than the second threshold, it indicates that data transmission and reception are relatively sparse. In this case, reducing the value of the timing duration of the RRC connection release timer can reduce or avoid a probability that the RRC connection is released too late, thereby reducing power consumption of the terminal.

It should be noted that processes of S510 and S520 are relatively independent. Although S510 is displayed before S520 in FIG. 5, in actual application, the two processes are separately performed, and there is no strict time sequence. For example, the terminal may obtain the data transmission statistical result in S510, and adjust the timing duration of the RRC connection release timer when determining, based on the data transmission statistical result, that a condition is met. In S520, the terminal determines, based on the RRC connection release timer, whether a condition for releasing an RRC connection is met, and requests the network device to release an RRC connection when determining that the condition is met (that is, when the RRC connection release timer expires).

According to an execution status of S510, the timing duration used to control RRC connection release or the timing duration of the RRC connection release timer may be initial duration (for example, the timing duration of the RRC connection release timer is initialized to the initial duration after the RRC connection is established, and is not adjusted subsequently), or may be adjusted once, or may be adjusted for a plurality of times. For example, in a first time period, the timing duration used to control RRC connection release or the timing duration of the RRC connection release timer is equal to a first value, and in a second time period, the timing duration used to control RRC connection release or the timing duration of the RRC connection release timer is equal to a second value, where the first value is different from the second value.

In the foregoing procedure, the timing duration of the RRC connection release timer is set, so that the timing duration of the RRC connection release timer is not fixed, but can be dynamically adjusted. In this way, the timing duration of the RRC connection release timer can be adaptively adjusted based on a data transmission status, so that the timing duration can match the data transmission status, thereby reducing power consumption of the terminal.

In some embodiments of this disclosure, the application processor in the terminal may set the timing duration of the RRC connection release timer by sending an instruction to the modem in the terminal. Further, the application processor sends an instruction to the modem, where the instruction carries indication information used to indicate a value (for example, the first duration value) of the timing duration. The modem may set the timing duration of the RRC connection release timer to a corresponding duration value (for example, the first duration value) based on the indication information.

Optionally, the instruction may be an attention (AT) command.

The AT command may carry indication information used to indicate a value of the timing duration of the RRC connection release timer. Further, the AT command may further carry at least one piece of the following indication information: indication information used to indicate that the terminal enters the idle state or the inactive state after the RRC connection is released, where for example, the indication information may indicate that the terminal enters the idle state after the RRC connection is released, or indicate that the terminal enters the inactive state after the RRC connection is released, and indication information used to indicate whether to enable a quick RRC connection release feature, that is, whether to dynamically adjust the timing duration of the RRC connection release timer in the manner provided in this embodiment of this disclosure.

For example, the AT command may include five information fields, which are successively a first information field, a second information field, a third information field, a fourth information field, and a fifth information field. A length of each information field may be one bit or more bits. The meaning of each information field is as follows.

First information field: A value of the information field is a fixed value, and the fixed value is equal to 1.

Second information field: This information field is used to carry indication information used to indicate whether to enable the quick RRC connection release feature. For example, when a value of the indication information carried in the information field is equal to 1, it indicates that the quick RRC connection release feature (enable OPEN_RRC_QUICKLY_RELEASE_FEATURE) is enabled, that is, the timing duration of the RRC connection release timer is dynamically adjusted in the manner provided in this embodiment of this disclosure, or when a value of the indication information field is equal to 0, it indicates that the quick RRC connection release feature (RRC_QUICKLY_RELEASE_PERIODIC_DETECTIO) is disabled, to be specific, the solution of dynamically adjusting the timing duration of the RRC connection release timer provided in this embodiment of this disclosure is not used, and a solution in which the timing duration of the RRC connection release timer is fixed may be used. For example, when the terminal is in a screen-on state, the base station performs RRC connection release control based on the RRC connection release timer (the timing duration of the timer is a fixed duration, for example, 10 seconds) configured by the base station for the terminal, or when the terminal is in the screen-off state, an RRC connection release timer (a timing duration of the timer is a fixed duration, for example, 1 second or 2 seconds) configured in the terminal performs RRC connection release control.

Third information field: This information field is a reserved information field.

Fourth information field: This information field carries indication information used to indicate that the terminal enters the idle state or the inactive state after the RRC connection is released, and may be represented as para1, and is used to indicate a state that the terminal enters after the RRC connection is released. If para1=0, it indicates that the terminal enters the idle state (i.e., IDLE_STATE) after the RRC connection is released, or if para1=1, it indicates that the terminal enters the inactive state (i.e., INACTIVE_STATE) after the RRC connection is released.

Fifth information field: This information field is used to carry the timing duration (that is, a target value of the timing duration) of the RRC connection release timer, and may be represented as para2. For example, para2=10 indicates that the timing duration of the RRC connection release timer needs to be set to 10 seconds.

For example, the AT command includes the foregoing five information fields. If the application processor determines that the timing duration of the RRC connection release timer needs to be set to 10 seconds, and the terminal enters the idle state after the RRC connection is released, the AT command sent by the application processor to the modem may be expressed as:

AT^NRPOWERSAVINGCFG=1, 1, 0, 0, 10.

The AT command includes the following information from left to right:

First information field: A value is 1, and the value is a fixed value.

Second information field "enable OPEN_RRC_QUICKLY_RELEASE_FEATURE": A value is 1, indicating that the timing duration of the RRC connection release timer is dynamically adjusted in the manner provided in this embodiment of this disclosure.

Third information field: A value of the third information field is 0, and the information field is a reserved information field.

Fourth information field: para1=0, indicating "IDLE_STATE", that is, the idle state is entered after the RRC connection is released.

Fifth information field: para2=10, indicating that a timing duration of the RRC connection release timer is 10 seconds.

An arrangement order and an arrangement manner of the information fields in the AT command are merely examples. This is not limited in this embodiment of this disclosure.

In some embodiments of this disclosure, when the terminal is in the RRC connected state, statistics about data transmission are collected to obtain a statistical result, and the timing duration of the RRC connection release timer is adjusted based on the statistical result. Further, when the terminal is in an RRC connected state, the data transmission statistical result is obtained, and if it is determined, based on the data transmission statistical result, that the condition for adjusting the timing duration of the RRC connection release timer is met, the timing duration of the RRC connection release timer is adjusted.

Further, the RRC connection release timer corresponds to at least two duration values, and that the timing duration of the RRC connection release timer is adjusted based on the statistical result may include the following several cases:

Case 1: If the statistical result is greater than a first threshold, at least two duration values corresponding to the RRC connection release timer are obtained, a duration that is greater than a first duration value and that is in the at least two duration values is determined as a second duration value, and the timing duration of the RRC connection release timer is increased from the first duration value to a second duration value.

Optionally, a minimum value that is in the at least two duration values and that is greater than the first duration value may be used as the second duration value.

Case 2: When the RRC connection release timer expires, if the statistical result is less than the second threshold, at least two duration values corresponding to the RRC connection release timer are obtained, a duration value that is less than a first duration value and that is in the at least two duration values is determined as a third duration value, and the timing duration of the RRC connection release timer is reduced from the first duration value to the third duration value.

Optionally, a maximum value that is less than the first duration value and that is in the at least two duration values is used as the third duration value.

Case 3: The foregoing case 1 and the case 2 are combined. That is, if the statistical result is greater than the first threshold, the timing duration of the RRC connection release timer is increased from the first duration value to the second duration value, and when the RRC connection release timer expires, if the statistical result is less than the second threshold, the timing duration of the RRC connection release timer is reduced from the first duration value to the third duration value.

The at least two duration values corresponding to the RRC connection release timer may include the following several cases:

Case 1: A group of durations (including at least two duration values) is set, and the group of durations include universal timing durations of the RRC connection release timer.

Correspondingly, the terminal may obtain a group of durations that is corresponding to the application type, so as to set the timing duration of the RRC connection release timer based on a duration value in the group of durations.

Case 2: A plurality of groups of durations are set, and each group of durations corresponds to an application type.

Correspondingly, the terminal may obtain, based on an application type of an application running in the foreground, a group of durations that is corresponding to the application type, so as to set the timing duration of the RRC connection release timer based on a duration value in the group of durations.

Case 3: A plurality of groups of durations are set, and each group of durations corresponds to an application.

Case 4: A plurality of groups of durations are set, one group of durations includes universal timing durations of the RRC connection release timer, and each of other groups of durations corresponds to an application type.

Correspondingly, if the terminal does not obtain, based on the application type of the application running in the foreground, the group of durations that is corresponding to the application type, the terminal obtains a universal group of durations.

Case 5: A plurality of groups of durations are set, one group of durations include universal timing durations of the RRC connection release timer, and each of other groups of durations is corresponding to an application.

In some embodiments of this disclosure, starting or restarting of data transmission statistics collection may be triggered in the following cases:

Case 1: If no application is running in the foreground, when an application is started, and the application runs in the foreground, data transmission statistics collection is started.

Case 2: If a started application is switched from the background to the foreground, for example, a user selects a window of a background application for displaying on a screen, and the application is switched from the background to the foreground, or when the foreground application is closed so that the application running in the background is switched to the foreground, data transmission statistics collection is restarted.

Case 3: After the duration of the RRC connection release timer is increased because the data transmission statistical result reaches the first threshold, data transmission statistics collection is restarted.

Case 4: After the RRC connection is reestablished and an application is running currently, data transmission statistics collection may be restarted. Optionally, when the RRC connection release timer expires, the counter used for data transmission statistics collection may be reset, so as to recollect data transmission statistics after an RRC connection is reestablished.

Counting of the quantity of data packets is used as an example. After an application A is started and runs in the foreground, a counter is used to accumulate the quantity of received data packets. Then, when an application B is started, the application A is switched to the background for running, where the application B is a foreground application, the counter is reset, so as to re-accumulate the quantity of received data packets. Then, during running of the application B as a foreground application, when a count value of the counter (that is, the accumulated quantity of data packets) reaches a first threshold, the duration of the RRC connection release timer is increased, and the counter is reset, so as to accumulate the quantity of received data packets. Then, the RRC connection release timer expires, the terminal requests the network device to release the RRC connection, and the counter is reset. After that, when the RRC connection is reestablished, the application B is a foreground application, and the counter starts to count the quantity of received data packets.

Counting of the quantity of received data packets is still used as an example. When the accumulated quantity of data packets counted by the counter is greater than the first threshold, it indicates that current data packets arrive densely and a packet interval is relatively small. In this case, the timing duration of the RRC connection release timer is increased, so that an unnecessary random-access process caused by too early release of the RRC connection can be avoided, thereby reducing power consumption of the terminal. For example, if a conventional RRC connection release control method is used, a timing duration of an RRC connection release timer configured in the terminal is equal to 1 second, and the terminal turns off the screen after receiving a data packet A, and a new data packet B arrives 1.1 seconds later. In this case, the terminal has not received the data packet B, but the terminal has requested the network device to release an RRC connection 1 second after receiving the data packet A and turning off the screen. Consequently, the terminal releases the RRC connection and enters the non-connected state, and before receiving the data packet B, the terminal needs to perform random-access again to reestablish an RRC connection to the network device. However, according to the method provided in this embodiment of this disclosure, the terminal may detect that current data packets arrive relatively densely, and therefore a timing duration of the RRC connection release timer may be increased, for example, to 1.2 seconds. In this way, the terminal does not request to release the RRC connection 1.1 seconds after receiving the data packet A and turning off the screen because the RRC connection release timer does not expire, so that the terminal can receive the data packet B, thereby avoiding a random-access process, and reducing power consumption caused by the random-access process.

When the RRC connection release timer expires, if the accumulated quantity of data packets counted by the counter is less than the second threshold, it indicates that the current data packets arrive sparsely and the packet interval is relatively large. In this case, the timing duration of the RRC connection release timer is reduced, so that unnecessary waiting time in the RRC connected state due to delayed RRC connection release can be avoided, thereby reducing power consumption of the terminal.

A quantity of data packets received in a time period may indicate, to some extent, sparsity of data packets in a subsequent time period. For example, if data packets arrive densely in a current phase, a probability that data packets will arrival relatively densely in a future time period is also relatively high, or if data packets arrive sparsely in a current phase, a probability that data packets will arrive relatively sparsely in a future time period is also relatively high. Based on this prediction, the timing duration of the RRC connection release timer may be adjusted in advance by using the foregoing embodiments of this disclosure, so as to adapt to data transmission in a future time period, thereby reducing power consumption of the terminal.

The effect brought by adjusting the timing duration of the RRC connection release timer based on the statistics about the quantity of received data packets may also be achieved in other similar cases, for example, a case in which the timing duration of the RRC connection release timer is adjusted based on the statistics about the data volume, the data throughput rate, or the bit rate of the received data.

In some embodiments of this disclosure, a corresponding first threshold and a corresponding second threshold may be set for an application type. The two thresholds may form a threshold group. Different application types may be corresponding to different thresholds or threshold groups. For example, a first threshold in a threshold group corresponding to a first application type is different from a first threshold in a threshold group corresponding to a second application type, and/or a second threshold in the threshold group corresponding to the first application type is different from a second threshold in the threshold group corresponding to the second application type.

In some embodiments of this disclosure, a corresponding threshold group may be set for an application. For example, a threshold group A may be set for an application A, and a threshold group B may be set for an application B. Thresholds or threshold groups corresponding to different applications may be different or may be the same. Correspondingly, when it is determined whether a condition for adjusting the timing duration of the RRC connection release timer is met, a data transmission statistical result may be compared with the threshold group corresponding to the application to determine whether the condition for adjusting the timing duration of the RRC connection release timer is met. For example, when the terminal is in an RRC connected state, and the data transmission statistical result reaches (greater than or equal to) the first threshold corresponding to the foreground application, the value of the timing duration of the RRC connection release timer may be increased, or when the RRC connection release timer expires, if the data transmission statistical result is less than or equal to the second threshold corresponding to the foreground application, the value of the timing duration of the RRC connection release timer may be reduced.

Optionally, a universal threshold or threshold group may be set. Correspondingly, when it is determined whether the condition for adjusting the timing duration of the RRC connection release timer is met, a data transmission statistical result may be compared with the universal threshold group to determine whether the condition for adjusting the timing duration of the RRC connection release timer is met. For example, when the terminal is in the RRC connected state, and the data transmission statistical result reaches (greater than or equal to) the first threshold in the universal threshold group, the value of the timing duration of the RRC connection release timer may be increased, when the RRC connection release timer expires, if the data transmission statistical result is less than or equal to the second threshold in the universal threshold group, the value of the timing duration of the RRC connection release timer may be reduced.

In some embodiments of this disclosure, an RRC connection release timer duration set may be set. That the set includes at least two-timing durations of the RRC connection release timer means that when adjusting the value of the timing duration of the RRC connection release timer, the terminal may select a duration value in the set as an adjustment target value. A quantity of durations in different RRC connection release timer duration sets may be the same or different.

Optionally, duration values in the RRC connection release timer duration set are sorted in ascending order or descending order. For example, duration values in the RRC connection release timer duration set may form an arithmetic sequence, or form a geometric sequence, or duration values in the set comply with another rule. Certainly, a difference between adjacent duration values may be random, that is, duration values in the set may be randomly sorted. This is not limited in this disclosure.

Optionally, a corresponding RRC connection release timer duration set is set for an application type. Correspondingly, when the timing duration of the RRC connection release timer needs to be adjusted, a target value may be selected from the RRC connection release timer duration set corresponding to the application type based on the application type of the foreground application, and is used as the adjusted value of the timing duration of the RRC connection release timer. Quantities of timing duration values that are of the candidate RRC connection release timer and that are included in RRC connection release timer duration sets set for different application types may be the same or different.

For example, using an Internet long video application type, an Internet short video application type, and a web page news application type as an example, an RRC connection release timer duration set corresponding to the Internet long video application type includes four durations a first value, a second value, a third value, and a fourth value, and the four values may be sorted in descending order or ascending order. The RRC connection release timer duration set corresponding to the Internet short video application type includes three durations: a fifth value, a sixth value, and a seventh value. The three values may be sorted in descending order or ascending order. The RRC connection release timer duration set corresponding to the web page news application type includes two durations an eighth value and a ninth value, and the two values may be sorted in descending order or ascending order. Durations in an RRC connection release timer duration set are different. For example, the first value to the fourth value are different, and the fifth value to the seventh value are different. Durations in an RRC connection release timer duration set may be different from or partially the same as duration values in another RRC connection release timer duration set. For example, a first value (the first value is a maximum value in the set) in the RRC connection release timer duration set corresponding to the Internet long video application type is the same as a fifth value (the fifth value is a maximum value in the set) in the RRC connection release timer duration set corresponding to the Internet short video application type, for example, 10 seconds.

Optionally, a corresponding RRC connection release timer duration set is set for an application. Correspondingly, when the timing duration of the RRC connection release timer needs to be adjusted, a target value may be selected from the RRC connection release timer duration set corresponding to the foreground application, and is used as the adjusted value of the timing duration of the RRC connection release timer. Quantities of candidate duration values of the RRC connection release timer that are included in RRC connection release timer duration sets corresponding to different applications may be the same or different.

Optionally, a universal RRC connection release timer duration set may be set. Correspondingly, when the timing duration of the RRC connection release timer needs to be adjusted, a target value may be selected from the universal RRC connection release timer duration set, and is used as an adjusted timing duration value of the RRC connection release timer.

In some embodiments, the maximum timing duration of the RRC connection release timer in the RRC connection release timer duration set is less than or equal to a timing duration of the RRC connection release timer that is configured on the network device by default. For example, the maximum timing duration of the RRC connection release timer is equal to 10 seconds. In this way, a timing duration adjustment range of the RRC connection release timer can reach a maximum of the timing duration of the RRC connection release timer that is configured on the network device by default, so that performance (for example, power consumption and/or a delay) of the terminal can be at least close to performance of the network side.

In some embodiments, a minimum timing duration of the RRC connection release timer in the RRC connection release timer duration set is greater than or equal to a timing duration of the RRC connection release timer that is configured in the terminal by default. For example, the minimum duration of the RRC connection release timer is not less than 1 second. In this way, a timing duration adjustment range of the RRC connection release timer may be at least not less than the timing duration of the RRC connection release timer that is configured on the device by default in the screen-off scenario of the terminal, so as to ensure that neither connection release nor connection reestablishment is frequently performed.

In some embodiments, a quantity of timing durations of the RRC connection release timer in the RRC connection release timer duration set is less than or equal to a preset maximum quantity of timing durations of the RRC connection release timer. For example, a value interval of the maximum quantity of timing durations of the RRC connection release timer may be defined as [2, 10], and for example, the maximum quantity of timing durations of the RRC connection release timer may be set to be equal to 5. The quantity of timing durations in the RRC connection release timer duration set is limited, so that the timing duration of the RRC connection release timer is not adjusted too frequently due to a relatively large quantity of timing durations, thereby reducing signaling overheads and reducing impact on system stability.

Based on the settings of the foregoing threshold groups and the RRC connection release timer duration sets, in some embodiments, for different application types, the terminal separately stores an RRC connection release timer duration set corresponding to each application type and a threshold group used to determine whether the timing duration of the RRC connection release timer needs to be adjusted. When it is determined, based on the data transmission statistical result and the threshold group corresponding to the application type of the foreground application, that the timing duration of the RRC connection release timer needs to be adjusted, an adjustment target value is selected from the RRC connection release timer duration set corresponding to the application type of the foreground application.

Based on the settings of the foregoing threshold groups and the RRC connection release timer duration set, in some embodiments, for different application types, the terminal separately stores an RRC connection release timer duration set corresponding to each application type, but only one universal threshold group is configured. When it is determined, based on the data transmission statistical result and the universal threshold group, that the timing duration of the RRC connection release timer needs to be adjusted, an adjustment target value is selected from an RRC connection release timer duration set corresponding to the application type of the foreground application.

Further, a universal RRC connection release duration set and a universal threshold group used to determine whether the RRC connection release timer needs to be adjusted may be further configured in the terminal. If the corresponding RRC connection release timer duration set and the threshold group used to determine whether the timing duration of the RRC connection release timer needs to be adjusted are not set for the application type of the foreground application, the transmission data statistical result may be compared with the universal threshold group, and when it is determined, based on the comparison result, that the timing duration of the RRC connection release timer needs to be adjusted, an adjustment target value is selected from the universal RRC connection release timer duration set.

Based on the settings of the foregoing threshold groups and the RRC connection release timer duration sets, in some embodiments, only one universal RRC connection release timer duration set and one universal threshold group used to determine whether the timing duration of the RRC connection release timer is adjusted may be set in the terminal. In this embodiment, regardless of which application or which type of application is running as a foreground application on the terminal, the timing duration of the RRC connection release timer is adjusted by using the universal RRC connection release timer duration set and the universal threshold group.

In some other embodiments, a corresponding RRC connection release timer duration set and a corresponding threshold group used to determine whether to adjust a timing duration of the RRC connection release timer may be respectively set for a screen-off scenario and a screen-on scenario respectively, so as to adjust the timing duration of the RRC connection release timer by using the corresponding RRC connection release timer duration set and the corresponding threshold group based on a current scenario.

In some embodiments, if the terminal is in the split-screen mode and runs a plurality of foreground applications in a plurality of split-screen windows in the split-screen mode, whether a timing duration of the RRC connection release timer needs to be adjusted may be determined based on priorities of application types of the plurality of foreground applications, a threshold group corresponding to a high-priority application type, and a data transmission statistical result, and when it is determined that the timing duration of the RRC connection release timer needs to be adjusted, the target value of the timing duration of the RRC connection release timer is determined based on the RRC connection release timer duration set corresponding to the application type of the high-priority application. The data transmission statistical result may be obtained by counting the quantity of data packets received by the terminal, where the data packets include data packets received by the plurality of foreground applications. Further, if data is transmitted by background applications, the counted data packets further include data packets received by the background applications with data transmission, that is, the applications are not distinguished when the received data packets are counted. The data transmission statistical result may also be obtained by counting the quantity of data packets received by a high-priority application, that is, only data packets received by a high-priority application are counted when the received data packets are counted. For example, whether the received service flow data belongs to a high-priority application may be determined by identifying the received service flow data, so that only data packets belonging to a high-priority application are counted.

Optionally, priorities of different application types may be set based on factors such as whether the service data is delay-sensitive. For example, a priority of an application type of a delay-sensitive application may be set to be relatively high, and a priority of an application type of a delay-insensitive application may be set to be relatively low. For example, in a social application (for example, WeChat®), a game application, and an Internet short video application (for example, TikTok®), because service data of the Internet short video application and the game application has a relatively high requirement on a delay and relatively high-power consumption, the service data of the Internet short video application and the game application may be set to a relatively high priority.

In some other embodiments, if the terminal is in a split-screen mode, and runs a plurality of foreground applications in a plurality of split-screen windows in the split-screen mode, a set with maximum duration may be selected from the RRC connection release timer duration sets corresponding to application types of the plurality of foreground applications, and whether the timing duration of the RRC connection release timer needs to be adjusted is determined based on a threshold group corresponding to the set and a data transmission statistical result, and when it is determined that the timing duration of the RRC connection release timer needs to be adjusted, the target value of the timing duration of the RRC connection release timer is determined based on the set with the maximum duration. The data transmission statistical result may be obtained by counting the quantity of data packets received by the terminal, where the data packets include data packets received by the plurality of foreground applications. Further, if data is transmitted by background applications, the counted data packets further include data packets received by background applications with data transmission, that is, the applications are not distinguished when the received data packets are counted. The data transmission statistical result may alternatively be obtained by counting the quantity of the data packets received by the application corresponding to the set with the maximum duration, that is, during counting of the received data packets, only the data packets received by the application corresponding to the set with the maximum duration are counted.

The set with the maximum duration is an RRC connection release timer duration set with a maximum value in RRC connection release timer duration sets corresponding to application types of the plurality of foreground applications.

Optionally, when an application is started and the application runs in the foreground, an RRC connection release timer duration set corresponding to an application type of the foreground application may be determined, and a duration of the RRC connection release timer is set to be equal to a maximum value in the set. When a background application is switched to a foreground application, an RRC connection release timer duration set corresponding to an application type of the foreground application may be determined, and a duration of the RRC connection release timer is set to be equal to a maximum value in the set.

Optionally, when the foreground application is closed and no foreground application is currently running on the terminal, the timing duration of the RRC connection release timer may be kept unchanged, or the timing duration of the RRC connection release timer may be set to be equal to a maximum value in the universal RRC connection release timer duration set. In some other embodiments, when a foreground application is closed and no foreground application is currently running on the terminal, if the terminal is in a screen-on state, release of an RRC connection of the terminal is controlled by the network device, that is, the network device controls the RRC connection of the terminal based on an inactive timer (for example, a timing duration of the timer is fixed 10 seconds) configured on the network device (for example, when the inactive timer expires, the RRC connection of the terminal is released). If the terminal enters the screen-off state, the terminal controls RRC connection release based on a fixed duration that is configured by default (for example, 1 second or 2 seconds) (for example, when the terminal does not exchange information with the network device within the fixed duration after the screen is off, the terminal requests the network device to release the RRC connection). In an embodiment, when the foreground application is closed and no foreground application is currently running on the terminal, the AP may send an instruction to the modem to instruct to restore the default configuration. In this case, if the terminal is in a screen-on state, the network device controls RRC connection release duration of the terminal, and the terminal no longer controls RRC connection release based on the timing duration of the first timer, or if the terminal is in a screen-off state, the timing duration of the first timer is set to the fixed duration that is configured by default.

In some embodiments of this disclosure, an RRC connection release timer duration set and a threshold or a threshold group used to determine whether to adjust a timing duration of the RRC connection release timer are set on an AP of the terminal. The AP may determine, based on a data transmission statistical result and the threshold group, whether to adjust the timing duration of the RRC connection release timer, and when determining that the timing duration of the RRC connection release timer needs to be adjusted, selects a target value from the RRC connection release timer duration set based on the current timing duration of the RRC connection release timer, and send an instruction to a modem, to instruct the modem to adjust the timing duration of the RRC connection release timer to the target value. The instruction may carry the target value, or may carry a duration adjustment amplitude of the RRC connection release timer.

Optionally, in some embodiments, when an application in the terminal in the non-connected state is started, an RRC connection is established. In this case, the AP obtains the maximum duration in a corresponding RRC connection release timer duration set, and sends an instruction to the modem, to instruct the modem to set the timing duration of the RRC connection release timer to the maximum duration.

Optionally, if the timing duration of the RRC connection release timer is adjusted based on the RRC connection release timer duration set corresponding to the application type of the application, that the AP obtains the maximum duration in the corresponding RRC connection release timer duration set may include the application processor that obtains the RRC connection release timer duration set corresponding to the application type of the application, and if obtaining succeeds (that is, a corresponding RRC connection release timer duration set is set for the application type), the maximum duration in the set is obtained, to instruct the modem to set the timing duration of the RRC connection release timer to the maximum duration, or if obtaining fails (that is, no corresponding RRC connection release timer duration set is set for the application type), the universal RRC connection release timer duration set is obtained, and the maximum duration in the set is obtained, to instruct the modem to set the timing duration of the RRC connection release timer to the maximum duration.

Optionally, if the timing duration of the RRC connection release timer is adjusted based on the RRC connection release timer duration set corresponding to the application, that the AP obtains the maximum duration in the corresponding RRC connection release timer duration set may include the application processor that obtains the RRC connection release timer duration set corresponding to the application, and if obtaining succeeds (that is, a corresponding RRC connection release timer duration set is set for the application), the maximum duration in the set is obtained, to instruct the modem to set the timing duration of the RRC connection release timer to the maximum duration, or if obtaining fails (that is, no corresponding RRC connection release timer duration set is set for the application), the universal RRC connection release timer duration set is obtained, and the maximum duration in the set is obtained, to instruct the modem to set the timing duration of the RRC connection release timer to the maximum duration.

Optionally, if the timing duration of the RRC connection release timer is adjusted only based on the universal RRC connection release timer duration set, that the AP obtains the maximum duration in the corresponding RRC connection release timer duration set may include the application processor that obtains the maximum duration in the universal RRC connection release timer duration set, to instruct the modem to set the timing duration of the RRC connection release timer to the maximum duration.

Optionally, when the RRC connection is released and the current foreground application is kept unchanged, the modem may keep the duration of the RRC connection release timer unchanged.

In some other embodiments, an RRC connection release timer duration set and a threshold group used to determine whether to adjust a timing duration of the RRC connection release timer are set on a modem in the terminal. The modem may determine, based on a data transmission statistical result and the threshold group, whether to adjust the timing duration of the RRC connection release timer, and when determining that the timing duration of the RRC connection release timer needs to be adjusted, a target value may be selected from the RRC connection release timer duration set based on the current timing duration of the RRC connection release timer, so as to adjust the timing duration of the RRC connection release timer to the target value.

The foregoing method for determining, by the modem, whether the timing duration of the RRC connection release timer needs to be adjusted, and the foregoing methods for setting and adjusting the timing duration of the RRC connection release timer are the same as the foregoing corresponding methods performed by the application processor.

It should be noted that, in this embodiment of this disclosure, a same threshold may be set for all the durations of the RRC connection release timer in the RRC connection release timer duration set, or a corresponding threshold may be set for each duration of the RRC connection release timer. If a corresponding threshold is set for each RRC connection release timer, in a process of determining whether a timing duration of an RRC connection release timer needs to be adjusted, a threshold corresponding to a current duration of the RRC connection release timer may be used to determine whether adjustment is needed.

Figure 6A:
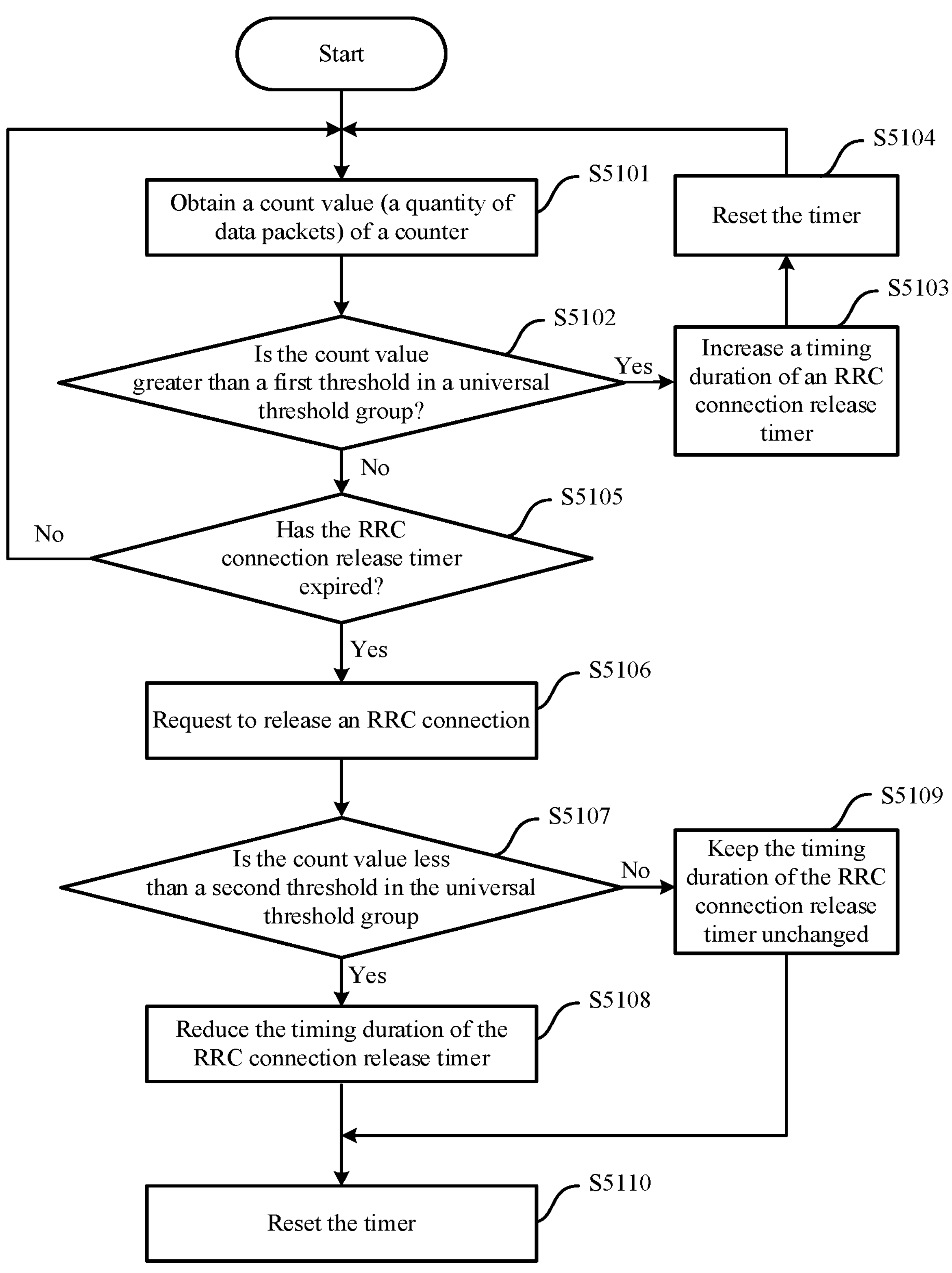
FIG. 6A is an RRC connection release timer adjustment procedure when a candidate RRC connection release timer duration set is set according to an embodiment of this disclosure.

FIG. 6A shows an example of a process of dynamically adjusting a timing duration of an RRC connection release timer based on a universal RRC connection release timer duration set and a threshold group in S510 in FIG. 5. This procedure is described by using an example in which a counter is used to count a quantity of received data packets.

As shown in FIG. 6A, the procedure may include the following steps.

S5101: Obtain a count value of a counter, where the count value is a quantity of received data packets.

The counter may start counting in the following cases. No foreground application is running, and an application is started, or when foreground-background switching of an application occurs, or the terminal enters a connected state.

A quantity of data packets counted by the counter includes data packets received by a foreground application, and may further include data packets received by a background application with data transmission.

S5102: Compare a count value of the counter with a first threshold in a universal threshold group, and if the count value is greater than the first threshold, go to S5103, otherwise, go to S5105.

S5103: Increase a duration of an RRC connection release timer.

S5104: Reset the counter, and return to S5101.

In this step, a duration value that is greater than a current timing duration value of the RRC connection release timer is selected from the universal RRC connection release timer duration set as a target value, and the timing duration of the RRC connection release timer is set to be equal to the target value.

For example, the current timing duration of the RRC connection release timer is equal to the first duration value, the universal RRC connection release timer duration set includes at least the first duration value and the second duration value, and the second duration value is the minimum value in all duration values that are in the universal RRC connection release timer duration set and that are greater than the first duration value. A method for increasing the timing duration of the RRC connection release timer may be selecting the second duration value from the universal RRC connection release timer duration set, and setting the timing duration of the RRC connection release timer to be equal to the second duration value. Certainly, the second duration value may also be another value in the universal RRC connection release timer duration set, provided that the second duration value is greater than the first duration value.

Further, for example, the duration values in the RRC connection release duration set are sorted in descending order. The universal set includes the first duration value and the second duration value adjacent to the first duration value (the second duration value is greater than the first duration value). In this case, the second duration value adjacent to the first duration value may be selected from the universal RRC connection release timer duration set, and the timing duration of the RRC connection release timer is set to be equal to the second duration value.

S5105: Determine whether the RRC connection release timer has expired, and if the RRC connection release timer has expired, go to S5106, otherwise, go to S5101.

S5106: Request the network device to release the RRC connection.

S5107: Compare the count value of the counter with the second threshold in the universal threshold group, and if the count value is less than the second threshold, go to S5108, otherwise, go to S5109.

S5108: Reduce the duration of the RRC connection release timer, and go to S5110.

In this step, a timing duration value that is less than the current timing duration of the RRC connection release timer is selected from the universal RRC connection release timer duration set as a target value, and the timing duration of the RRC connection release timer is set to be equal to the target value.

For example, the current timing duration of the RRC connection release timer is equal to the first duration value, the universal RRC connection release timer duration set includes at least a third duration value and the first duration value, and the third duration value is the maximum value in all duration values that are in the RRC connection release timer duration set and that are less than the first duration value. A method for reducing the duration of the RRC connection release timer may be selecting the third duration value from the universal RRC connection release timer duration set, and setting the timing duration of the RRC connection release timer to be equal to the third duration value, where the third duration value is the maximum value in all duration values that are in the universal RRC connection release timer duration set and that are less than the first duration value. Certainly, the third duration value may also be another value in the universal RRC connection release timer duration set, provided that the third duration value is less than the first duration value.

Further, for example, the duration values in the RRC connection release duration set are sorted in descending order. The universal set includes the first duration and the third duration value adjacent to the first duration value (the third duration value is less than the first duration value). In this case, the third duration value adjacent to the first duration value may be selected from the universal RRC connection release timer duration set, and the timing duration of the RRC connection release timer is set to be equal to the third duration value.

S5109: If the count value of the counter is between the first threshold and the second threshold (including the first threshold and the second threshold), keep the timing duration of the RRC connection release timer unchanged, and go to S5110.

S5110: Reset the count value of the counter.

It should be noted that, when the current timing duration of the RRC connection release timer is equal to the maximum duration value in the universal RRC connection release timer duration set, if it is determined that the timing duration of the RRC connection release timer needs to be increased, the current timing duration of the RRC connection release timer may be kept unchanged, and the counter is reset, or when the current timing duration of the RRC connection release timer is equal to the minimum duration value in the universal RRC connection release timer duration set, if it is determined that the timing duration of the RRC connection release timer needs to be reduced, the current timing duration of the RRC connection release timer may be kept unchanged.

For example, in a scenario, a universal RRC connection release timer duration set {timer1, timer2, timer3, timer4, timer5} (duration values in the set are sorted in a descending order) and a universal packet quantity threshold group {ThHigh (that is, a first packet quantity threshold), ThLow (that is, a second packet quantity threshold)} are set in the terminal. A current timing duration of the RRC connection release timer of the terminal is equal to a timer3. According to the procedure shown in FIG. 6A, at a moment t1, the terminal compares a count value N1 of the counter with ThHigh, and a comparison result is that N1 is greater than ThHigh. Therefore, the terminal obtains, from the universal RRC connection release timer duration set, the duration timer2 that is adjacent to the timer3 and greater than the timer3, adjusts the timing duration of the RRC connection release timer from the timer3 to the timer2, and resets the counter to restart counting the quantity of received data packets. At a subsequent moment t2, the RRC connection release timer expires, and the terminal compares a current count value N2 of the counter with a second threshold ThLow in the universal threshold group, and a comparison result is that N2 is less than ThLow. Therefore, the terminal obtains, from the universal RRC connection release timer duration set, the duration timer3 that is adjacent to the timer2 and less than the timer2, adjusts the timing duration of the RRC connection release timer from the timer2 to the timer3, and resets the counter.

Various possible values of the RRC connection release timer are defined by setting the RRC connection release timer duration set. When the timing duration of the RRC connection release timer needs to be adjusted, a target duration value of the RRC connection release timer is selected from the set. Therefore, an adjustment amplitude of the timing duration of the RRC connection release timer may not be excessively large, to ensure system stability and achieve an effect of gradual adjustment, and this is simple and easy to implement in terms of technology.

Figure 6B:
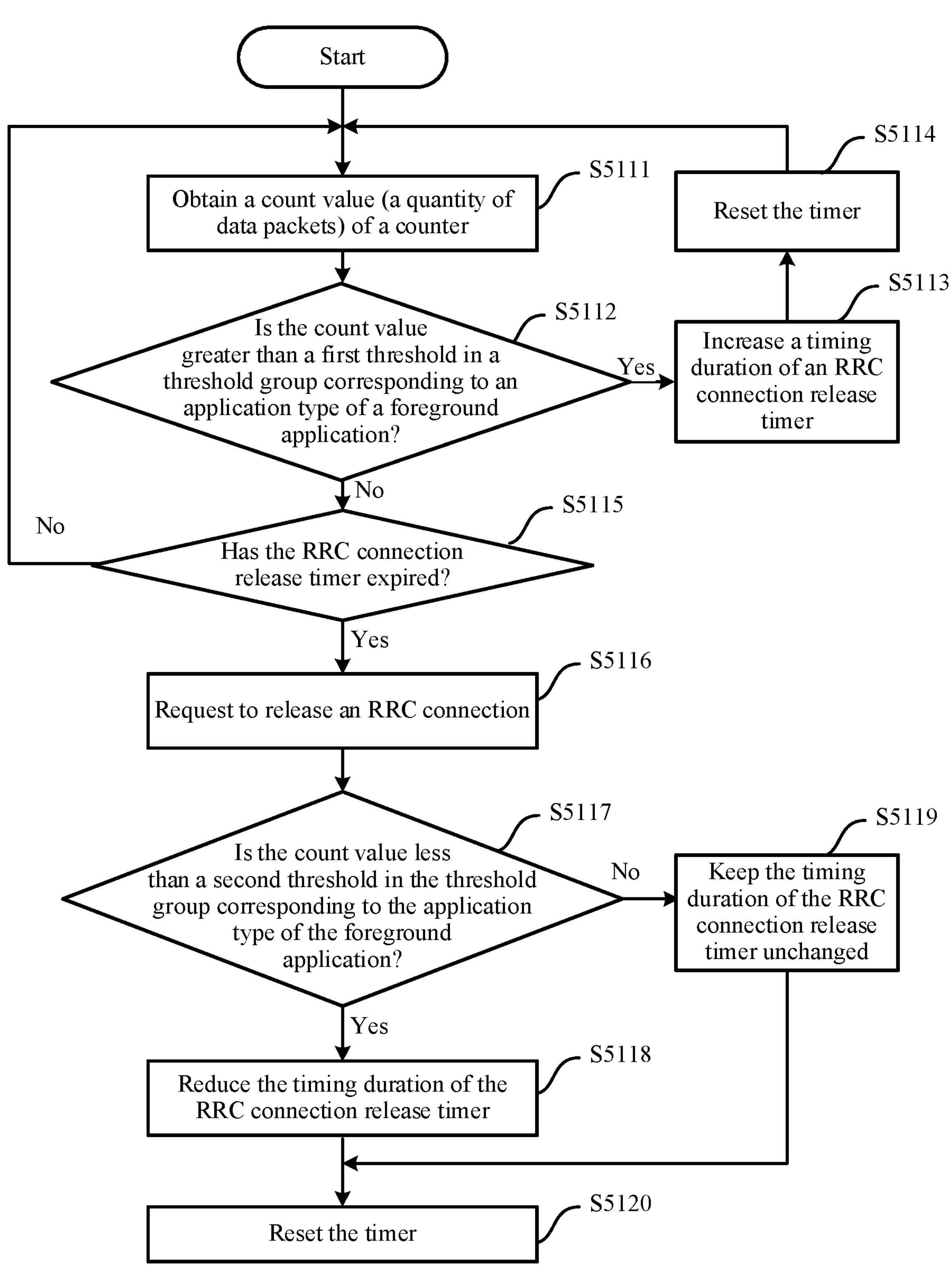
FIG. 6B is an RRC connection release timer adjustment procedure when candidate RRC connection release timer duration sets are separately set for different applications according to an embodiment of this disclosure.

FIG. 6B shows an example of a procedure of dynamically adjusting an RRC connection release timer in S510 in FIG. 5 by separately setting an RRC connection release timer duration set and a threshold group based on different application types. This procedure is described by using an example in which a counter is used to count a quantity of received data packets.

As shown in FIG. 6B, the process may include the following steps.

S5111: Obtain a count value of a counter, where the count value is the quantity of received data packets.

The counter may start counting in the following cases. No foreground application is running, and an application is started, or when foreground-background switching of an application occurs, or the terminal enters a connected state.

A quantity of data packets counted by the counter includes data packets received by a foreground application, and may further include data packets received by a background application with data transmission.

S5112: Compare the count value of the counter with a first threshold in a threshold group corresponding to the application type based on the application type of the foreground application, and if the count value is greater than the first threshold, go to S5113, otherwise, go to S5115.

Optionally, in some embodiments, an RRC connection release lookup table is set in the terminal. The RRC connection release lookup table is used to store a correspondence between an application type, an RRC connection release timer duration set, and a threshold group. For example, the RRC connection release lookup table stores information about an Internet short video application type and an RRC connection release timer duration set and a threshold group that are corresponding to the application type, and further stores information about a game application type and an RRC connection release timer duration set and a threshold group that are corresponding to the game application type.

In some scenarios, when an application is started as a foreground application or is switched to a foreground application, an application type of the application may be determined based on an application name of the current foreground application (for example, a preset correspondence table between an application name and an application type may be queried based on the application name), and the foregoing lookup table is searched based on the type of the application. If the application type of the foreground application is found in the lookup table, a threshold group and an RRC connection release timer duration set corresponding to the application type may be obtained.

When the application is started, the name of the application may be obtained in the following manner. After the application is started, information about the application may be registered with the application framework layer, where the registered information may include the name of the application. After detecting an event that the application is started, the application framework layer may call a function used to obtain a name of a foreground application, and determine, based on an application name returned by the function, the name of the application currently running in the foreground.

When the application is switched from the background to the foreground, the application framework layer may detect the event. In this case, the application framework layer may call the function used to obtain a name of a foreground application, and determine, based on an application name returned by the function, the name of the application currently running in the foreground.

The terminal may determine the application type of the foreground application, and search the RRC connection release lookup table based on the application type to obtain the threshold group corresponding to the application type of the foreground application, so as to compare a data transmission statistical result with the first threshold in the threshold group to determine whether to adjust the duration of the RRC connection release timer.

S5113: Increase the timing duration of the RRC connection release timer.

S5114: Reset the counter, and return to S5111.

In this step, a duration value that is greater than a current timing duration of the RRC connection release timer is selected from the RRC connection release timer duration set corresponding to the application type of the foreground application as a target value, and the timing duration of the RRC connection release timer is set to be equal to the target value.

For example, the current timing duration of the RRC connection release timer is equal to a first duration value, the RRC connection release timer duration set corresponding to the application type of the foreground application includes at least a second duration value and the first duration value, and the second duration value is the minimum value in all duration values that are in the RRC connection release timer duration set and that are greater than the first duration value. A method for increasing the timing duration of the RRC connection release timer may be selecting the second duration value from the RRC connection release timer duration set, and setting the timing duration of the RRC connection release timer to be equal to the second duration value.

Furthermore, in an example in which duration values in the RRC connection release duration set are sorted in descending order, the set includes the first duration value and the second duration value adjacent to the first duration value (the second duration value is greater than the first duration value). In this case, the second duration value adjacent to the first duration value may be selected from the RRC connection release timer duration set, and the timing duration of the RRC connection release timer is set to be equal to the second duration value.

In some embodiments, after determining the target value of the duration of the RRC connection release timer, the AP may send an instruction to the modem, to instruct the modem to set the timing duration of the RRC connection release timer to be equal to the target value. In some other embodiments, the modem may determine, according to the foregoing method, whether the timing duration of the RRC connection release timer needs to be adjusted, and when adjustment is needed, determine the target value of the timing duration of the RRC connection release timer, and set the timing duration of the RRC connection release timer to be equal to the target value.

S5115: Determine whether the RRC connection release timer has expired, and if the RRC connection release timer has expired, go to S5116, otherwise, go to S5111.

S5116: Request the network device to release the RRC connection.

S5117: Compare the count value of the counter with the second threshold in the universal threshold group, and if the count value is less than the second threshold, go to S5118, otherwise, go to S5119.

S5118: Reduce the duration of the RRC connection release timer, and go to S5120.

In this step, a duration value that is less than the current timing duration of the RRC connection release timer is selected from the RRC connection release timer duration set corresponding to the application type of the foreground application as a target value, and the timing duration of the RRC connection release timer is set to be equal to the target value.

For example, the current timing duration of the RRC connection release timer is equal to the first duration value, the RRC connection release timer duration set corresponding to the application type of the foreground application includes at least a third duration value, and the third duration value is less than the first duration value. A method for reducing the timing duration of the RRC connection release timer may be selecting the third duration value from the RRC connection release timer duration set, and setting the timing duration of the RRC connection release timer to be equal to the third duration value, where the third duration value is the maximum value in all duration values that are in the universal RRC connection release timer duration set and that are less than the first duration value.

Further, in an example in which the duration values in the RRC connection release duration set are sorted in descending order is used, the set includes the first duration value and the third duration value adjacent to the first duration value (the third duration value is less than the first duration value). In this case, the third duration value adjacent to the first duration value may be selected from the RRC connection release timer duration set, and the timing duration of the RRC connection release timer is set to be equal to the third duration value.

In some embodiments, after determining the target value of the timing duration of the RRC connection release timer, the AP may send an instruction to the modem, to instruct the modem to set the timing duration of the RRC connection release timer to be equal to the target value. In some other embodiments, the modem may determine, according to the foregoing method, whether the timing duration of the RRC connection release timer needs to be adjusted, and when adjustment is needed, determine the target value of the timing duration of the RRC connection release timer, and set the timing duration of the RRC connection release timer to be equal to the target value.

S5119: If the count value of the counter is between the first threshold and the second threshold (inclusive), keep the timing duration of the RRC connection release timer unchanged, and go to S5120.

S5120: Reset the count value of the counter.

It should be noted that, when the current timing duration of the RRC connection release timer is equal to the maximum duration value in the RRC connection release timer duration set corresponding to the application type of the foreground application, if it is determined that the timing duration of the RRC connection release timer needs to be increased, the current timing duration of the RRC connection release timer may be kept unchanged, and the counter is reset, or when the current timing duration of the RRC connection release timer is equal to the minimum duration value in the RRC connection release timer duration set corresponding to the application type of the foreground application, if it is determined that the timing duration of the RRC connection release timer needs to be reduced, the current timing duration of the RRC connection release timer may be kept unchanged.

It should be further noted that, if foreground-background switching of an application occurs on the terminal, for example, if an application A currently running in the foreground is switched to an application B based on a user operation, so that the application B becomes a foreground application and the application A becomes a background application, the counter may be reset, so that the terminal starts to recollect statistics about data transmission, and determines, based on a data transmission statistical result and by using a threshold group corresponding to an application type of the application B, whether the timing duration of the RRC connection release timer needs to be adjusted, and the target value is further selected from the RRC connection release timer duration set corresponding to the application type of the application B based on the current timing duration of the RRC connection release timer. For a specific implementation process, refer to FIG. 6B.

In some embodiments, when an application is started as a foreground application or is switched to a foreground application, but a threshold group corresponding to an application type of the application and an RRC connection release timer duration set are not found (that is, neither a corresponding threshold group nor an RRC connection release timer duration set is set for the application type) in the foregoing lookup table, a universal threshold group may be used to determine whether the duration of the RRC connection release timer needs to be adjusted, and an adjustment target value of the duration of the RRC connection release timer may be determined based on the universal RRC connection release timer duration set. For a specific implementation, refer to the procedure shown in FIG. 6A.

In some embodiments, it may be determined, based on a threshold group corresponding to a foreground application, whether the duration of the RRC connection release timer needs to be adjusted, and an adjustment target value of the duration of the RRC connection release timer may be determined based on an RRC connection release timer duration set corresponding to the foreground application. The procedure is similar to that shown in FIG. 6B. Further, if neither a corresponding threshold group nor an RRC connection release timer duration set is set for the foreground application, a universal threshold group may be used to determine whether the duration of the RRC connection release timer needs to be adjusted, and an adjustment target value of the duration of the RRC connection release timer may be determined based on the universal RRC connection release timer duration set. For a specific implementation, refer to the procedure shown in FIG. 6A.

In the foregoing procedure, the RRC connection release timer duration set is set, and various possible values of the RRC connection release timer are defined. When the timing duration of the RRC connection release timer needs to be adjusted, a target value of the timing duration of the RRC connection release timer is selected from the set. Therefore, an adjustment amplitude of the timing duration of the RRC connection release timer may not be excessively large, to ensure system stability and achieve an effect of gradual adjustment, and this is simple and easy to implement in terms of technology. In addition, corresponding RRC connection release timer duration sets and threshold groups are set for different application types, so as to determine, based on a data transmission statistical result of the foreground application, the timing duration adjustment of an RRC connection release timer by using the threshold group corresponding to the application type of the foreground application, and further adjust the timing duration of the RRC connection release timer by using the RRC connection release timer duration set corresponding to the application type of the foreground application. Therefore, the timing duration of the RRC connection release timer may be adjusted based on data transmission features or data transmission requirements of different application types, the RRC connection release timer is properly adjusted, so as to meet a data transmission requirement of the application of the corresponding application type, and reduce power consumption of the terminal.

In some embodiments of this disclosure, continuous values are divided into discrete values based on a discretization idea of mathematical modeling, to form an RRC connection release timer duration set. Further, the RRC connection release timer duration set may be obtained by performing an exponential segmentation method on $T_{max}$. The exponential segmentation method can be used to obtain a geometric sequence in which a segmentation resolution (or a base in the exponential segmentation method) is a common ratio. A segmentation resolution (that is, a base) in the exponential segmentation method represents a granularity used for dividing an RRC connection release duration. The exponential segmentation method can be used to perform exponential segmentation on $T_{max}$, to obtain a plurality of durations of the RRC connection release timer, so as to form an RRC connection release timer duration set.

$T_{max}$ is preset, and may be set to be equal to a default duration of the RRC connection release timer that is configured by the network device by default, for example, be equal to 10 seconds.

The exponential segmentation formula is $$T_i = \frac{T_{max}}{\alpha^{i-1}},$$

where 1=1,2,3 . . . K. α is a segmentation resolution, the segmentation resolution is also referred to as a base of exponential segmentation, and α is an integer greater than 1.

For example, in an example in which $T_{max}$=10 seconds, α=2, and a minimum value in the RRC connection release timer duration set is not less than 1 second, the RRC connection release timer duration set obtained according to the foregoing exponential segmentation formula may be represented as {10, 5, 2.5, 1.25}.

In the RRC connection release timer duration set generated by using the exponential segmentation method, each element corresponds to one Markov model state, that is, the RRC connection release timer duration set corresponds to a plurality of Markov states. Based on an idea of Markov model state transition, the duration of the RRC connection release timer may be adjusted by using the RRC connection release timer duration set.

Markov model states refer to the current, past, and future states of a random variable sequence X1, X2, . . . , X3 with Markov properties. Given the current state, the future state and the past state are independent of each other. The probability distribution of a system state at a moment t+1 is related only to a state at the moment t and is not related to a state before the moment t, and state transition from the moment t to the moment t+1 is not related to a value of t.

Figure 7:
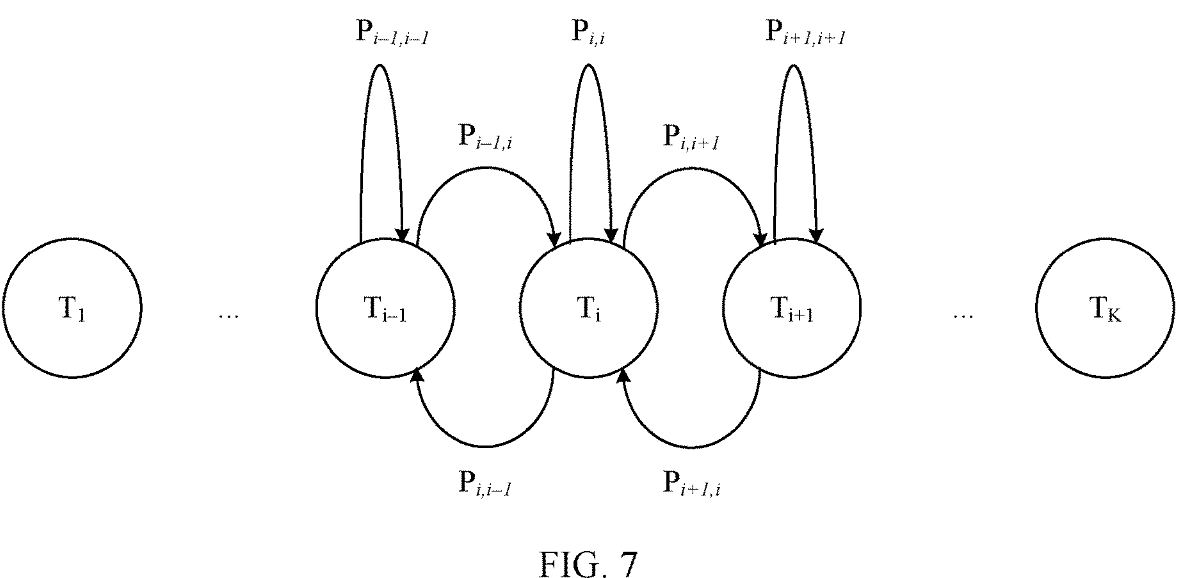
FIG. 7 is a schematic diagram of state transition of a Markov model at an RRC release time according to an embodiment of this disclosure.

FIG. 7 is a schematic diagram of an example of Markov model state transition at an RRC release time according to an embodiment of this disclosure. As shown in the figure, a Markov chain of the timing durations of the RRC connection release timer includes K states shown in the figure, and each state corresponds to one timing duration of the RRC connection release timer, where $T_1 > \ldots > T_{i-1} > T_i > T_{i+1} \ldots > T_K$. A probability of transiting from $T_i$ to $T_{i+1}$ is $P_{i,i}+1$, a probability of transiting from $T_i$ to $T_{i-1}$ is $P_{i,i-1}$, a probability of transiting from $T_{i+1}$ to $T_i$ is $P_{i+1,i}$, a probability of transiting from $T_i$ to $T_{i-1}$ is $P_{i,i-1}$, a probability of keeping $T_{i-1}$ unchanged is $P_{i-1,i-1}$, a probability of keeping $T_i$ unchanged is $P_{i,i}$, and a probability of keeping $T_{i+1}$ unchanged is $P_{i+1,i+1}$.

Based on the foregoing Markov chain of the timing durations of the RRC connection release timer, in an example in which the quantity of received data packets is counted, the terminal is currently configured with a Markov chain of the timing durations of the RRC connection release timer shown in FIG. 7, that is, an RRC connection release timer duration set, a first threshold ThHigh, and a second threshold ThLow.

The terminal is currently in an RRC connected state and is in a state $T_i$ of the Markov chain (that is, a duration of the RRC connection timer is $T_i$). When it is detected that a quantity of data packets that arrive (that is, a quantity of received data packets) reaches the first threshold ThHigh, the terminal transits from the state $T_i$ to the state $T_{i+1}$, that is, the current timing duration of the RRC connection timer is adjusted from $T_i$ to $T_{i+1}$, so that the duration of the RRC connection release timer is increased, and the quantity of data packets is reset.

The terminal is currently in the RRC connected state and is in a state $T_i$ of the Markov chain (that is, the duration of the RRC connection timer is $T_i$). When the RRC connection release timer expires, if it is detected that the quantity of data packets that arrive is less than the second threshold ThLow, $T_i$ is transited to $T_{i-1}$, that is, the current timing duration of the RRC connection timer is adjusted from $T_i$ to $T_{i-1}$, so that the duration of the RRC connection release timer is reduced, and the quantity of data packets is reset.

In this embodiment of this disclosure, the threshold or the threshold group used to determine whether to adjust the duration of the RRC connection release timer, and the RRC connection release timer duration set used to adjust the duration of the RRC connection release timer may be obtained by the terminal by using an online learning method, or may be obtained by the terminal by using an offline learning method, or may be configured by the network side. The foregoing parameters configured by the network side (that is, the threshold or the threshold group used to determine whether to adjust the timing duration of the RRC connection release timer, and the RRC connection release timer duration set used to adjust the timing duration of the RRC connection release timer) may be obtained by the network side by using an offline learning method. Certainly, a combination of the foregoing methods may also be used.

It should be noted that, when the foregoing parameters are configured by the network side, the network side may send the parameters to the terminal, or may send, to the terminal, information used to generate the foregoing parameter. For example, a segmentation resolution (that is, a base) in the exponential segmentation method may be sent to the terminal, and the terminal may generate an RRC connection release timer duration set based on the segmentation resolution (that is, the base) and the exponential segmentation method.

The following describes in detail a process of obtaining, by using an online learning method and an offline learning method, a threshold or a threshold group used to determine whether to adjust a timing duration of an RRC connection release timer, and an RRC connection release timer duration set used to adjust the duration of the RRC connection release timer according to an embodiment of this disclosure.

(1) Obtaining an RRC Connection Release Timer Duration Set and a Threshold Group by Using an Online Learning Method.

The method may be performed by a terminal.

In the online learning method described below, an example in which an RRC connection release timer duration set is generated by using an exponential segmentation method is used for description. This idea may be applied to an online learning method in which an RRC connection release timer duration set is generated by using another method.

Figure 8:
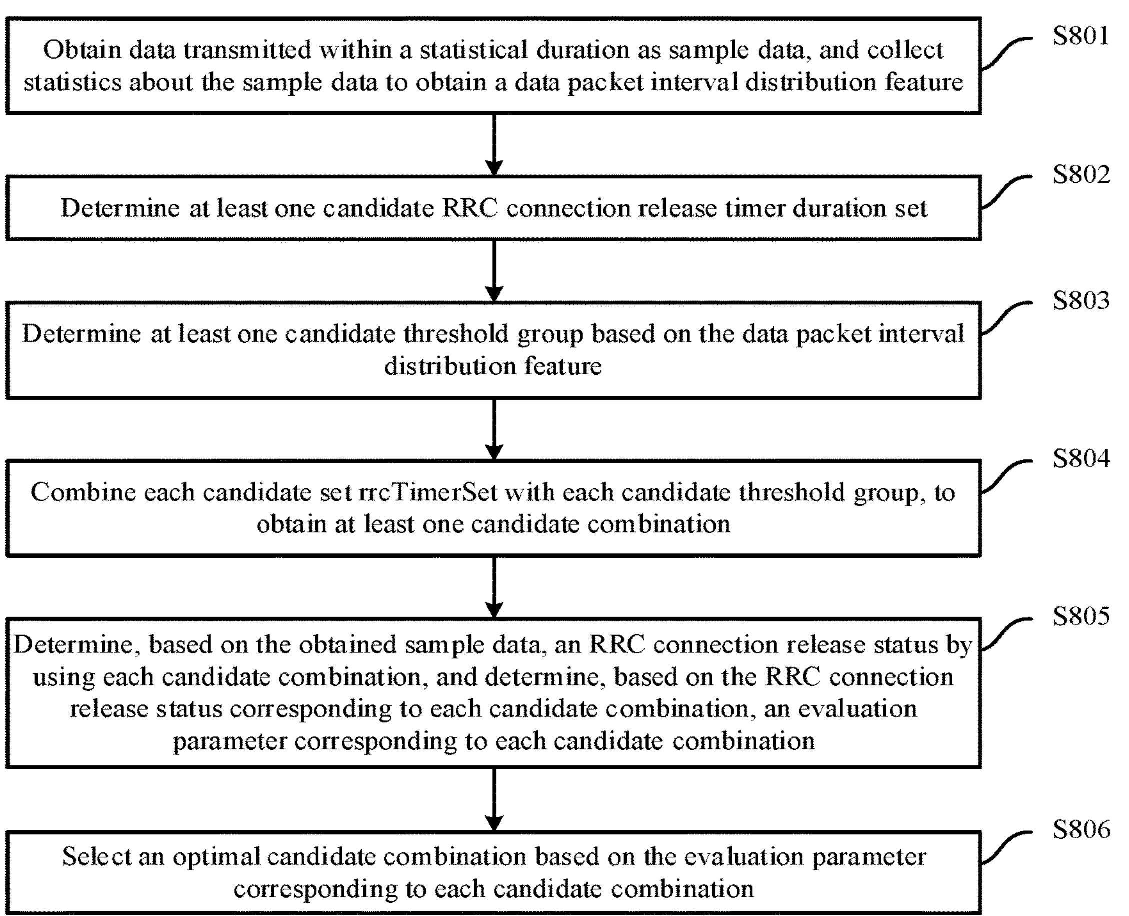
FIG. 8 is a schematic flowchart of an online learning method according to an embodiment of this disclosure.
Figure 9:
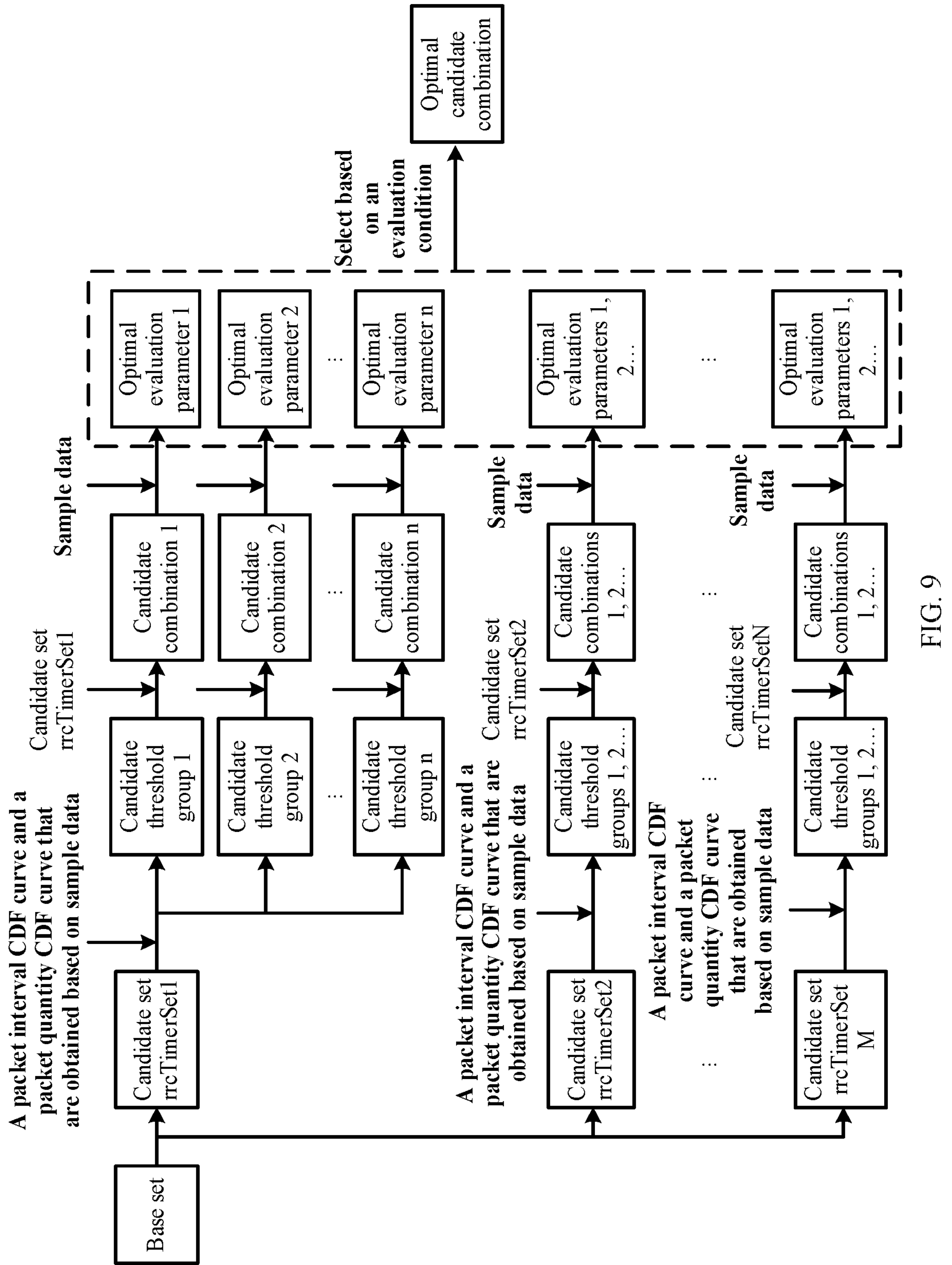
FIG. 9 is a schematic diagram of a principle of an online learning method according to an embodiment of this disclosure.

FIG. 8 shows an example of a procedure of an online learning method, and FIG. 9 shows an example of a principle of the online learning method. The following describes the online learning method with reference to FIG. 8 and FIG. 9.

As shown in FIG. 8, the online learning method may include the following steps.

S801: Obtain data transmitted by a terminal within a statistical duration as sample data, and collect statistics about sample data to obtain a data packet interval distribution feature.

The statistical duration is a preset value. A value range of the statistical duration may be several minutes to dozens of minutes, for example, 5-20 minutes. This is not limited in this disclosure.

The data transmitted within the statistical duration may include data received within the statistical duration or data sent within the statistical duration. For example, data packets received by the terminal when an application runs as a foreground application within the statistical duration are obtained, where the data packets received by the terminal may include data packets received by the foreground application, and may further include data packets received by a background application with data transmission.

The data packet interval distribution feature may be obtained by collecting statistics about received or sent data packets, and may be represented as a packet interval probability density distribution curve and a packet quantity probability density distribution curve. For example, statistics about time intervals between adjacent data packets may be collected, or a quantity of received data packets may be counted based on a set period to obtain packet intervals. For example, statistical data (that is, a quantity of data packets) of five consecutive periods is {1000, 0, 0, 3000, 2000}, and packet intervals are respectively 3 and 1, so that a packet interval probability density distribution curve is obtained based on the packet intervals.

Figure 10A:
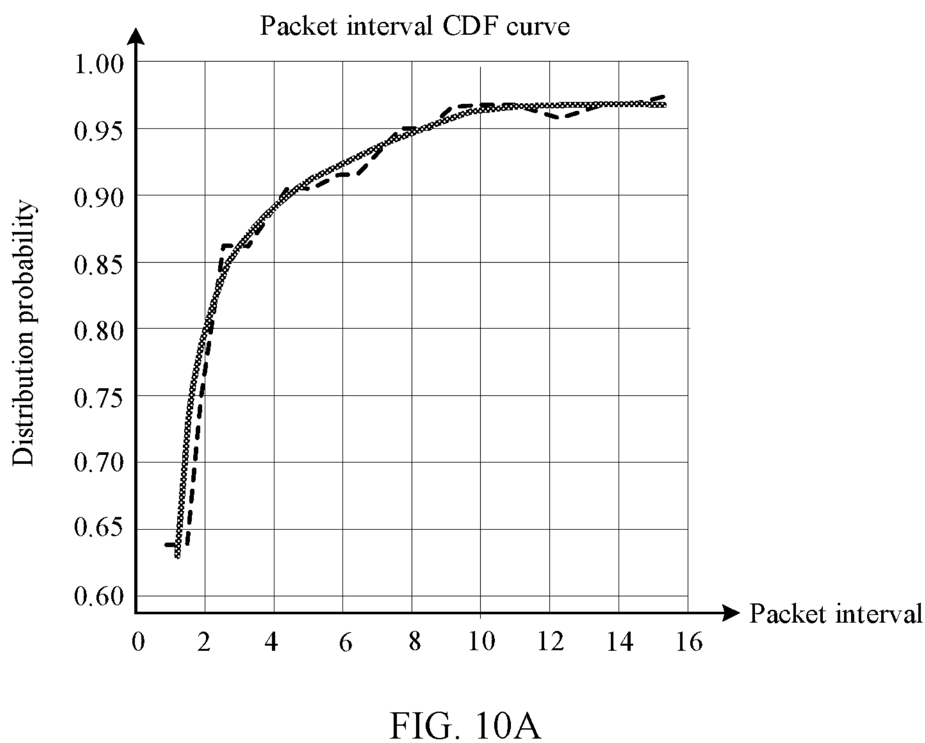
FIG. 10A is a schematic diagram of a packet interval cumulative distribution function (CDF) curve according to an embodiment of this disclosure.

After the packet intervals are obtained through statistics collection, the packet interval probability density distribution may be obtained through calculation by using a CDF, where the packet interval probability density distribution indicates the probability of occurrence of each interval obtained through statistics collection. The packet interval probability density distribution may be presented in a form of a packet interval CDF curve (or a packet interval probability density distribution curve). FIG. 10A shows a packet interval CDF curve. In FIG. 10A, a horizontal coordinate represents a packet interval, which is measured in seconds or another time unit, and a vertical coordinate represents a probability. As shown in FIG. 10A, a curve (or a broken line) shown by a dashed line is obtained by connecting discrete points. After fitting is performed on the curve (or a broken line) shown by the dashed line, a packet interval CDF curve represented by a solid line in FIG. 10A may be obtained.

Figure 10B:
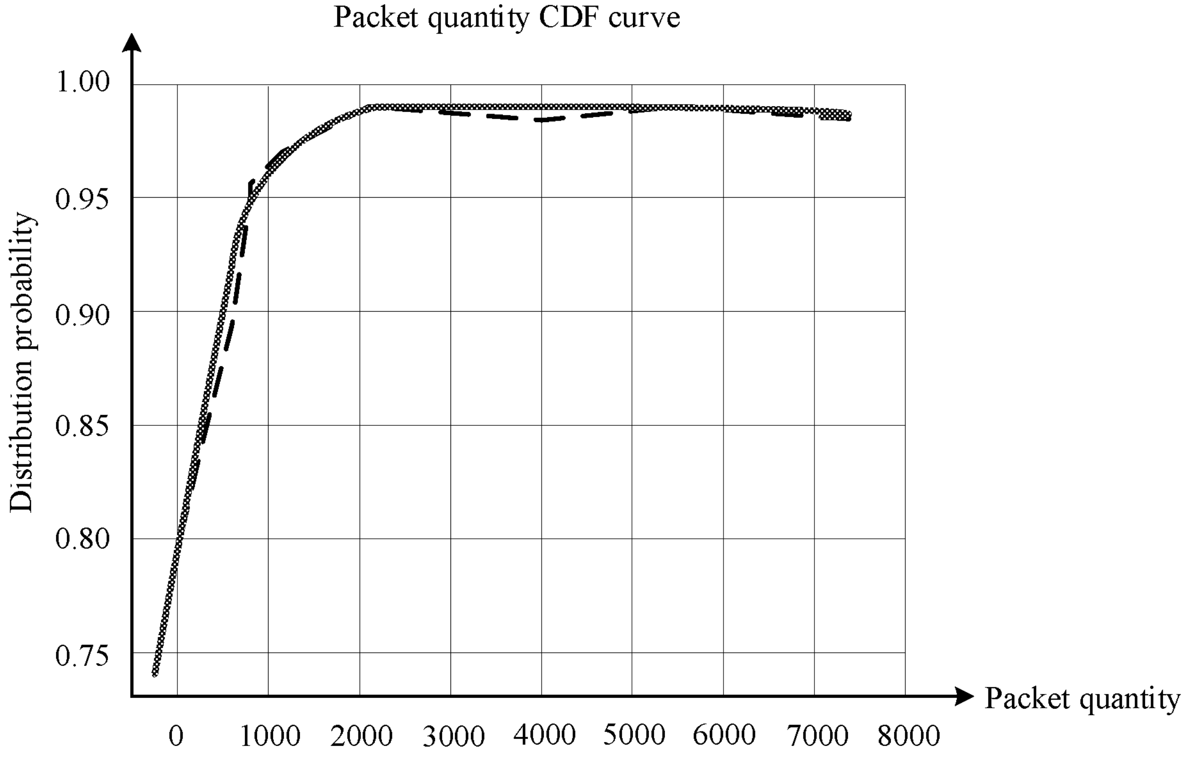
FIG. 10B is a schematic diagram of a packet quantity CDF curve according to an embodiment of this disclosure.

After the accumulated quantity of packets is obtained through statistics collection, the CDF function may be used to calculate the probability density distribution of the quantity of packets, where the probability density distribution of the quantity of packets indicates the probability distribution of the accumulated quantities of packets obtained through statistics collection. The packet quantity probability density distribution may be presented in a form of a packet quantity CDF curve (or a packet quantity probability density distribution curve). FIG. 10B shows a packet quantity CDF curve. In FIG. 10B, a horizontal coordinate represents a quantity of packets in a period, and a vertical coordinate represents a probability that the quantity of packets in the period is less than the quantity of packets in the horizontal coordinate. As shown in FIG. 10B, a curve (or a broken line) shown by a dashed line is obtained by connecting discrete points. After fitting is performed on the curve (or a broken line) shown by the dashed line, a packet quantity CDF curve represented by a solid line in FIG. 10B may be obtained. For example, as shown in the figure, a probability that the quantity of packets less than 1000 is greater than 0.95.

S802: Determine at least one candidate RRC connection release timer duration set.

There is at least one candidate RRC connection release timer duration set (hereinafter a candidate set, which is represented by rrcTimerSet). Each candidate set rrcTimerSet includes at least two elements, and each element is a candidate value of the timing duration of the RRC connection release timer. Elements in each candidate set rrcTimerSet may be sorted in descending order (that is, sorted in descending order of RRC connection release duration), or may be sorted in ascending order (that is, sorted in ascending order of RRC connection release duration). Optionally, in each candidate set rrcTimerSet, a maximum value of the duration of the RRC connection release timer does not exceed a preset maximum duration of the RRC connection release timer. Optionally, a minimum value of the duration of the RRC connection release timer is not less than a preset minimum duration of the RRC connection release timer. Optionally, a total quantity of elements in each candidate set does not exceed a preset maximum quantity of durations of the RRC connection release timer.

In an example in which the candidate set rrcTimerSet is generated by using the exponential segmentation method, the following parameters may be preset:

(1) An exponential segmentation base base=arange (1.1, 5.2, 0.05), where arange (1.1, 5.2, 0.05) represents an arithmetic sequence with 1.1 as a lower limit, 5.2 as an upper limit, and 0.05 as a common difference, and the arithmetic sequence may be represented as [1.1, 1.15, 1.2, . . . , 5.15, 5.2].

(2) NUM_STATE_MAX indicates a maximum quantity of segmentation states, and the value of NUM_STATE_MAX is a positive integer. In this example, NUM_STATE_MAX=5.

(3) RRC_REL_MAX indicates a maximum duration of the RRC connection release timer. In this example, the value of RRC_REL_MAX is a duration of the RRC connection release timer that is configured on the base station by default, for example, RRC_REL_MAX=10 seconds.

(4) RRC_REL_MIN indicates a minimum duration of the RRC connection release timer. In this example, the value of RRC_REL_MIN is a duration of the RRC connection release timer that is configured in the terminal by default, for example, RRC_REL_MIN=1 second.

According to the foregoing preset parameters and the foregoing exponential segmentation formula, in an example in which base=2, the following candidate set rrcTimerSet may be obtained:

When base=2, possible values of the duration of the RRC connection release timer include {10, 5, 2.5, 1.25}, and the following candidate set rrcTimerSet that meets the foregoing condition may be obtained through permutation and combination:

{10, 5, 2.5, 1.25}
{10, 5, 2.5}
{10, 5, 1.25}
{10, 2.5, 1.25}
{5, 2.5, 1.25}
{10, 5}
{10, 2.5}
{10, 1.25}
{5, 2.5}
{5, 1.25}
{2.5, 1.25}

It should be noted that, in the foregoing example, when the elements in the candidate set rrcTimerSet are calculated according to the indication segmentation formula, a rounding method may be used to obtain only two digits after the decimal point.

The foregoing merely shows some candidate sets rrcTimerSets as an example. Based on a same idea, a person skilled in the art may determine, based on an exponential segmentation base base=arange(1.1, 5.2, 0.05), a candidate set rrcTimerSet corresponding to each base. In each candidate set rrcTimerSet, the maximum value of the RRC connection release timer is 10 (RRC_REL_MAX=10), and the minimum value of the RRC connection release timer is 1 (RRC_REL_MIN=1). In each candidate set rrcTimerSet, a total quantity of elements does not exceed 5 (NUM_STATE_MAX=5).

In some embodiments, the candidate set rrcTimerSet may be preconfigured in the terminal. In some other embodiments, the terminal may generate the candidate set rrcTimerSet based on preconfigured parameters (for example, the foregoing base=arange (1.1,5.2,0.05), NUM_STATE_MAX=5, and RRC_REL_MAX=10 seconds).

S803: Determine at least one candidate threshold group based on the data packet interval distribution feature.

A candidate threshold group includes one threshold or two thresholds. If two thresholds are included, the two thresholds are referred to as a first threshold and a second threshold, and the first threshold is greater than or equal to the second threshold.

One candidate set rrcTimerSet may correspond to one candidate threshold group, or may correspond to a plurality of candidate threshold groups. If one candidate set rrcTimerSet corresponds to a plurality of candidate threshold groups, different candidate threshold groups include different thresholds. For example, if one candidate set rrcTimerSet corresponds to a first candidate threshold group and a second candidate threshold group, there may be the following cases:

Case 1: A value of a first threshold in the first candidate threshold group is different from a value of a first threshold in the second candidate threshold group, and a value of a second threshold in the first candidate threshold group is the same as a value of a second threshold in the second candidate threshold group.

Case 2: A value of a second threshold in the first candidate threshold group is different from a value of a second threshold in the second candidate threshold group, and a value of a first threshold in the first candidate threshold group is the same as a value of a first threshold in the second candidate threshold group.

Case 3: A value of a first threshold in the first candidate threshold group is different from a value of a first threshold in the second candidate threshold group, and a value of a second threshold in the first candidate threshold group is different from a value of a second threshold in the second candidate threshold group.

In step 403, a candidate threshold group corresponding to each candidate set rrcTimerSet may be determined by using a packet interval CDF curve and a packet quantity CDF curve. Further, the following operations may be performed for each candidate set rrcTimerSet: obtaining, based on a packet interval CDF curve, a distribution probability corresponding to each duration of the RRC connection release timer in the candidate set rrcTimerSet by using each duration of the RRC connection release timer in the candidate set rrcTimerSet as a time interval, obtaining, on the packet quantity distribution CDF curve, a packet quantity corresponding to the corresponding distribution probability, and obtaining, based on the packet quantity, at least one candidate threshold group corresponding to the candidate set rrcTimerSet.

A candidate set rrcTimerSet19 {10, 5, 2.5, 1.25} when base=2 in the foregoing example is used as an example below to describe how to determine a candidate threshold group corresponding to the candidate set rrcTimerSet19 by using the packet interval CDF curve shown in FIG. 10A and the packet quantity CDF curve shown in FIG. 10B.

Figure 11A:
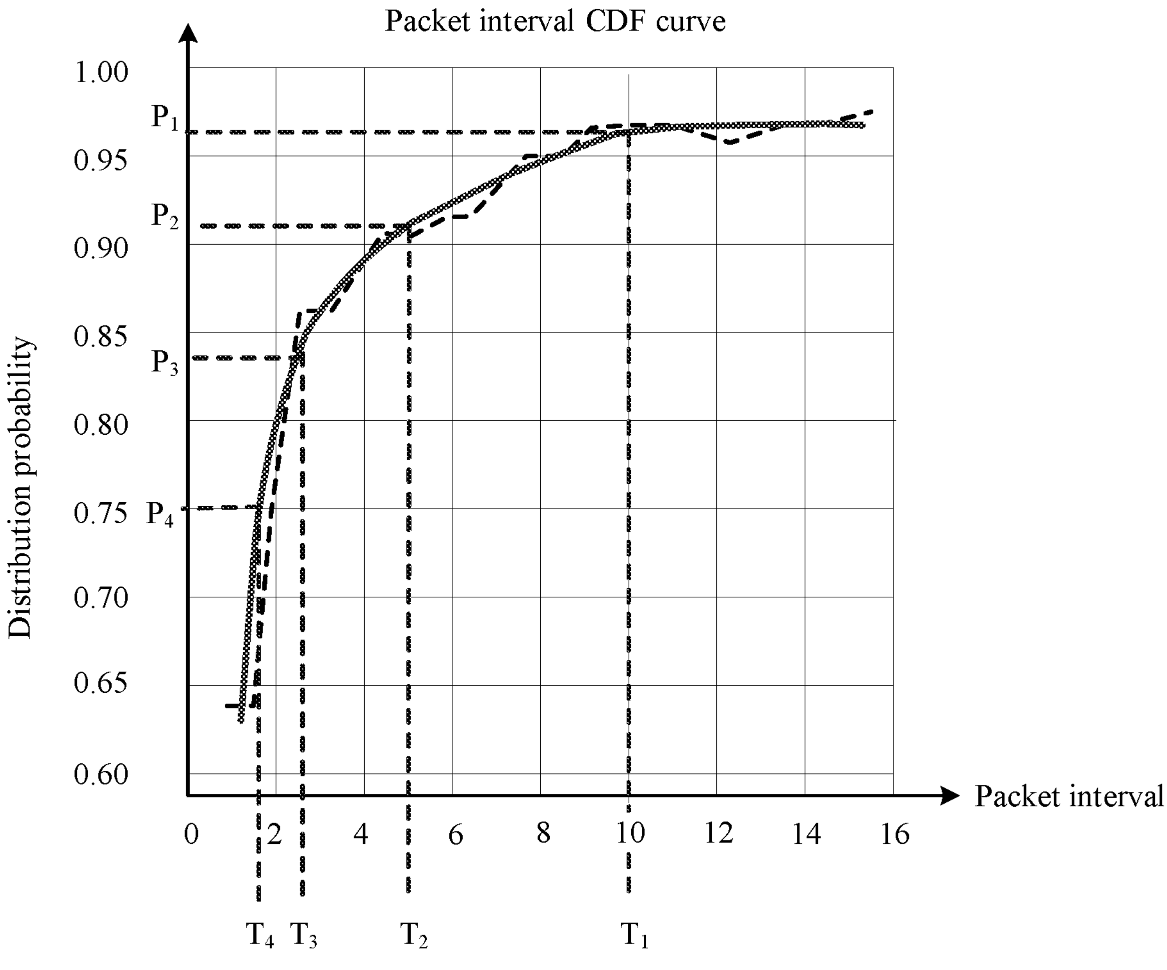
FIG. 11A is a schematic diagram of a packet interval CDF curve according to an embodiment of this disclosure.

Refer to FIG. 11A. Based on the packet interval CDF curve shown in FIG. 10A, four corresponding interval values (10, 5, 2.5, 1.25) are selected on a horizontal coordinate of the packet interval CDF curve based on the durations of the RRC connection release timer in the candidate set rrcTimerSet19 {10, 5, 2.5, 1.25}, to obtain distribution probabilities $P_1$ to $P_4$ that are respectively corresponding to the four interval values, as shown in FIG. 11A. For example, a distribution probability corresponding to $T_1=10$ is $P_1$, a distribution probability corresponding to $T_2=5$ is $P_2$, a distribution probability corresponding to $T_3=2.5$ is $P_3$, and a distribution probability corresponding to $T_4=1.25$ is $P_4$.

Figure 11B:
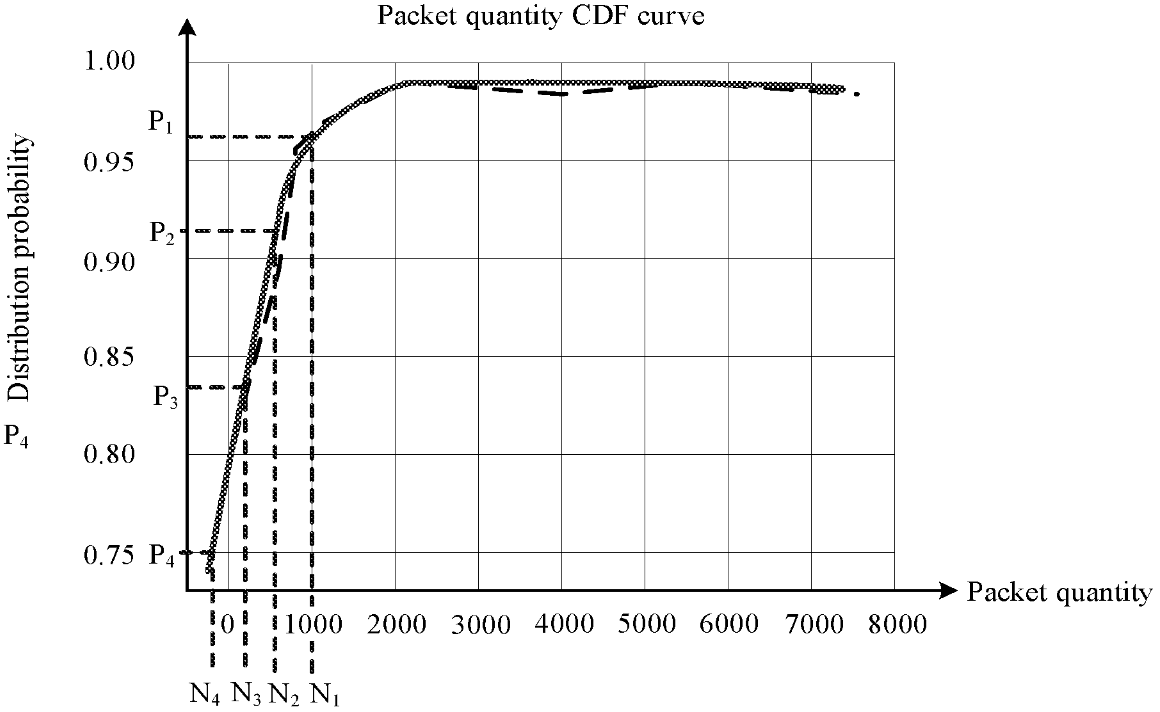
FIG. 11B is a schematic diagram of a packet quantity CDF curve according to an embodiment of this disclosure.

Refer to FIG. 11B. Based on the packet quantity CDF curve shown in FIG. 10B, corresponding packet quantities $N_1$, $N_2$, $N_3$, and $N_4$ are determined on the packet quantity CDF curve based on distribution probabilities $P_1$, $P_2$, $P_3$, and $P_4$, as shown in FIG. 11B.

A candidate threshold group corresponding to the candidate set rrcTimerSet19 may be obtained based on the packet quantities $N_1$, $N_2$, $N_3$, and $N_4$ through permutation and combination:

Candidate threshold group 1: a first threshold thHigh=$N_1$, and a second threshold thLow=$N_2$.

Candidate threshold group 2: a first threshold thHigh=$N_1$, and a second threshold thLow=$N_3$.

Candidate threshold group 3: a first threshold thHigh=$N_1$, and a second threshold thLow=$N_4$.

Candidate threshold group 4: a first threshold thHigh=$N_2$, and a second threshold thLow=$N_3$.

Candidate threshold group 5: a first threshold thHigh=$N_2$, and a second threshold thLow=$N_4$.

Candidate threshold group 6: a first threshold thHigh=$N_3$, and a second threshold thLow=$N_4$.

Certainly, the first threshold thHigh and the second threshold thLow in the candidate threshold group may also be equal. For example, in one candidate threshold group, thHigh=$N_1$, and thLow=$N_1$, and in another candidate threshold group, thHigh=$N_2$, and thLow=$N_2$. The rest can be deduced by analogy.

S804: Separately combine each candidate set rrcTimerSet with each candidate threshold group corresponding to a corresponding candidate set rrcTimerSet, to obtain at least one candidate combination.

Each candidate combination includes a candidate set rrcTimerSet and a candidate threshold group.

The candidate set rrcTimerSet19 {10, 5, 2.5, 1.25} is still used as an example. The six candidate threshold groups are combined with the candidate set rrcTimerSet19 based on the six candidate threshold groups corresponding to the candidate set determined in S803, to obtain six candidate combinations.

S805: Determine, based on the sample data obtained in S801, an RRC connection release status by using each candidate combination, and determine, based on the RRC connection release status corresponding to each candidate combination, an evaluation parameter corresponding to each candidate combination.

In this step, each candidate combination may be separately applied, based on the sample data obtained in S801, to the RRC connection release control method provided in this embodiment of this disclosure, to obtain a corresponding RRC connection release moment for each candidate combination, and for each candidate combination, an evaluation parameter corresponding to the candidate combination may be determined based on the corresponding RRC connection release moment, where the evaluation parameter is used to select an optimal candidate combination.

A candidate combination is used as an example. This step is equivalent to simulating, based on the sample data obtained in S801 and by using the candidate combination, the RRC connection release procedure provided in this embodiment of this disclosure, to obtain an RRC connection release status of the sample data within a statistical duration. The RRC connection release status includes an RRC connection release moment and a quantity of RRC connection release times.

The optimal evaluation parameter may include at least one of a total duration of the RRC connected state and a total duration of the RRC non-connected state within the statistical duration, and at least one of a release matching rate and a false release rate within the statistical duration, where: the release matching rate=1—the false release rate, and the false release rate=a quantity of false releases/a quantity of random-access times.

Meaning of the false release. After an RRC connection is released, if data is transmitted (for example, data is sent or received) within a preset duration, the release is considered as a false release. Because after the RRC connection is released, a random-access request is initiated when new data is transmitted, to reestablish an RRC connection, and the random-access process requires certain power consumption. In this case, power consumption saved by the current RRC connection release is less than power consumption of the random-access process, and therefore the release is considered as a false release.

The preset duration is preset, and a value of the preset duration may be several seconds. For example, the preset duration REL_ERR_TH=2 seconds.

S806: Select an optimal candidate combination based on the evaluation parameter corresponding to each candidate combination.

A threshold group in the optimal candidate combination may be configured as a threshold group used to determine whether to adjust a timing duration of the RRC connection release timer, and an RRC connection release timer duration set in the optimal candidate combination may be used to determine a target value of the timing duration of the RRC connection release timer.

A universal threshold group and a universal RRC connection release timer duration set may be obtained through learning by following the procedure shown in FIG. 8. If data packets received when a target application is a foreground application are obtained as the sample data in S801, a threshold group and an RRC connection release timer duration set that are corresponding to the application may be obtained through learning. If data packets received when a representative application in a certain type of applications is a foreground application is obtained as the sample data in S801, a threshold group and an RRC connection release timer duration set that are obtained through learning may be used as the threshold group and the RRC connection release timer duration set that are corresponding to the application type.

In this embodiment of this disclosure, a condition for evaluating an optimal candidate combination may be preset. A principle for selecting the optimal combination is to select a candidate combination with a relatively low false release rate and a relatively long total duration of the RRC non-connected state. Based on this principle, the condition for evaluating the optimal candidate combination may include one of the following conditions:

Condition 1: The false release rate is less than the preset false release rate threshold, and the total duration of the RRC non-connected state is the longest or the proportion of the total duration of the RRC non-connected state to the measurement duration is the largest. For example, the false release rate threshold can be set to 40%.

Condition 2: The false release rate is less than a preset false release rate threshold, and the total duration of the RRC connected state is the smallest or the ratio of the total duration of the RRC connected state to the statistical duration is the smallest.

Condition 3: The release matching rate is greater than a preset release matching rate threshold, and the total duration of the RRC non-connected state is the largest or the proportion of the total duration of the RRC non-connected state to the statistical duration is the largest, where the release matching rate=1−the false release rate. For example, the release matching rate threshold may be set to 60%.

Condition 4: The release matching rate is greater than a preset release matching rate threshold, and the total duration of the RRC connected state is the smallest or the ratio of the total duration of the RRC connected state to the statistical duration is the smallest, where the release matching rate=1−the false release rate.

The foregoing condition 1 is used as an example. A candidate combination whose false release rate is less than a false release rate threshold may be selected based on the false release rate corresponding to each candidate combination, and then a candidate combination corresponding to the largest proportion is selected as an optimal candidate combination based on the proportion of a total duration of the RRC non-connected state that is corresponding to each candidate combination in this range to statistical duration.

The following describes the procedure shown in FIG. 8 by using three examples.

Configuration information may be preset in the terminal, and the configuration information is used to generate an RRC connection release timer duration set rrcTimerSet. The configuration information may include the following.

A range of the exponential segmentation base is base=arange(1.1, 5.2, 0.05), where arange(1.1, 5.2, 0.05) indicates an arithmetic sequence with 1.1 as a lower limit, 5.2 as an upper limit, and 0.05 as a common difference.

A maximum quantity of segmentation states NUM_STATE_MAX=5, that is, the maximum quantity of durations in the rrcTimerSet is 5.

A maximum duration of the RRC connection release timer RRC_REL_MAX=10, that is, the maximum value in the rrcTimerSet is less than or equal to 10.

A minimum duration of the RRC connection release timer RRC_REL_MIN=1, that is, the minimum value in the rrcTimerSet is greater than or equal to 1.

The release matching rate threshold is 0.6.

EXAMPLE 1

Based on the foregoing configuration information and sample data collected when an Internet long video application (for example, Tencent® Video) is running in the foreground, the following optimal RRC connection release timer duration set rrcTimerSet, an optimal first threshold ThHigh, and a second threshold thLow may be obtained by following the procedure shown in FIG. 8:

The optimal rrcTimerSet is the set rrcTimerSet=[10.0, 4.65, 2.16, 1.01] corresponding to an exponential segmentation base base=2.15, and a duration quantity numState included in the optimal rrcTimerSet is 4, the optimal first threshold ThHigh=7, and the optimal second threshold thLow=7.

Based on the sample data collected when an Internet long video application (for example, Tencent® Video) runs in the foreground, when the optimal rrcTimerSet, optimal ThHigh, and optimal thLow are used to control RRC connection release.

The release matching rate matchRate is 0.86, which is greater than the threshold 0.6.

It can be learned from tests that a quantity of random-access times of RRC connection release control performed by using a conventional method is 28, and a quantity of random-access times of RRC connection release control performed by using this embodiment of this disclosure is 20. According to the RRC connection release control method provided in this embodiment of this disclosure, power consumption of the terminal in an RRC connected state and power consumption of random access can be considered, thereby reducing overall power consumption of the terminal. It can be learned from tests that the reduced power consumption powerSaving of the terminal can be 41.70% according to the embodiments of this disclosure.

EXAMPLE 2

Based on the foregoing configuration information and sample data collected when an Internet short video application (for example, TikTok®) is running in the foreground, the following optimal RRC connection release timer duration set rrcTimerSet, an optimal first threshold ThHigh, and a second threshold thLow may be obtained by following the procedure shown in FIG. 8.

The optimal rrcTimerSet is the set rrcTimerSet=[9.01, 3.0, 1.0] corresponding to an exponential segmentation base base=3.00, and a duration quantity numState included in the optimal rrcTimerSet is 3, the optimal first threshold ThHigh=346, and the optimal second threshold thLow=346.

Based on sample data collected when an Internet short video application (for example, TikTok®) is running in the foreground, when the foregoing optimal rrcTimerSet, optimal ThHigh, and optimal thLow are used to control RRC connection release.

The release matching rate matchRate is 0.76, which is greater than the threshold 0.6.

Tests show that, in this embodiment of this disclosure, a quantity of random-access times for RRC connection release control is 45, and a quantity of random-access times for RRC connection release control is 4. In the RRC connection release control method provided in this embodiment of this disclosure, both power consumption of the terminal in the RRC connected state and power consumption of the terminal in the random-access mode can be considered, thereby reducing overall power consumption of the terminal. For example, in this example, a duration of the terminal in the RRC connected state is relatively short because of a relatively large quantity of RRC connection releases, and therefore power consumption of the terminal can be reduced. It can be learned from the test that reduced power consumption powerSaving of the terminal can be 41.06% in this embodiment of this disclosure.

EXAMPLE 3

Based on the foregoing configuration information and sample data collected when the web page news application (for example, Toutiao®) is running in the foreground, the following optimal RRC connection release timer duration set rrcTimerSet, an optimal first threshold ThHigh, and a second threshold thLow may be obtained by following the procedure shown in FIG. 8.

The optimal rrcTimerSet is the set rrcTimerSet=[6.51, 2.0] corresponding to an exponential segmentation base base=3.25, and a duration quantity numState included in the optimal rrcTimerSet is 2, the optimal first threshold ThHigh=61, and the optimal second threshold thLow=61.

Based on sample data collected when a web page news application (for example, Toutiao®) is running in the foreground, when the optimal rrcTimerSet, optimal ThHigh, and optimal thLow are used to control RRC connection release.

The release matching rate matchRate is 0.65, which is greater than the threshold 0.6.

Tests show that, in this embodiment of this disclosure, a quantity of random-access times for RRC connection release control is 17, and a quantity of random-access times for RRC connection release control is 2. In the RRC connection release control method provided in this embodiment of this disclosure, both power consumption of the terminal in the RRC connected state and power consumption of the terminal in the random-access mode can be considered, thereby reducing overall power consumption of the terminal. For example, in this example, a duration of the terminal in the RRC connected state is relatively short because of a relatively large quantity of RRC connection releases, and therefore power consumption of the terminal can be reduced. It can be learned from the test that the reduced power consumption powerSaving of the terminal can be 14.76% in this embodiment of this disclosure.

The selected optimal combination (ThLow, ThHigh, and RRC connection release duration set) may be updated in subsequent use.

In some embodiments, the terminal may repeat the foregoing procedure periodically or irregularly to obtain an optimal duration of the RRC connection release timer and an optimal threshold group, and perform configuration.

In some other embodiments, the terminal not only performs learning based on currently collected sample data to obtain an optimal combination, but may also perform learning based on a data transmission statistical result of sample data that is obtained for a plurality of times. For example, the terminal may obtain a data transmission statistical result of sample data collected one day before a current date and a transmission statistical result of sample data collected two days ago, and then perform learning based on the foregoing two types of statistical results and a data transmission statistical result of the currently collected sample data, to obtain a current optimal combination. Optionally, an optimal combination may be generated by using a data transmission statistical result of sample data collected in recent days (for example, five days).

In some other embodiments, the terminal may perform learning based on a data transmission statistical result of the currently collected sample data to obtain an optimal combination, and then perform weighted averaging on the optimal combination and a historical optimal combination, to generate a new optimal combination. For example, if the threshold group in the optimal combination that is obtained through learning on the current date is (ThLow1, ThHigh1), and the threshold group in the optimal combination that is obtained through learning on the day before the current date is (ThLow2, ThHigh2), weighted averaging may be performed according to the following formula:

$$ThLow3=a*ThLow1+(1-a)*ThLow2; \text{ and}$$

$$ThHigh\ 3=b*ThHigh\ 1+(1-b)*ThHigh\ 2,$$

where a and b are weighting coefficients, and both a and b are positive numbers less than 1. Values of a and b may be the same or may be different. Optionally, both a and b are greater than 0.5, so that a weight of a currently learned threshold is the largest.

The threshold group (ThLow3 and ThHigh3) that is obtained through weighted averaging is used as an updated threshold group.

According to the method for obtaining the RRC connection release timer duration set and the threshold group shown in FIG. 8, an optimal timing duration of the RRC connection release timer may be set online based on data packet receiving and sending statuses of a foreground application, so that the determined timing duration of the RRC connection timer matches service receiving and sending statuses of the foreground service, thereby reducing power consumption of the terminal.

It should be noted that a time sequence of the steps in the procedure shown in FIG. 8 is merely an example. This is not limited in this embodiment of this disclosure. For example, a sequence of S801 and S802 may be adjusted, or may be performed concurrently.

(2) Obtaining an RRC Connection Release Timer Duration Set and a Threshold by Using An Offline Learning Method.

The method may be performed by a terminal, or may be performed by another device.

For example, for one or more applications, sample data generated when a target application runs as a foreground application within a statistical duration is obtained, and the sample data is sent to a computing device. The computing device determines, according to the method shown in FIG. 8, an optimal RRC connection release timer duration set and a threshold group that are corresponding to the target application or an application type of the target application, or the learned threshold group and the learned RRC connection release timer duration set are used as the threshold group and the RRC connection release timer duration set that are corresponding to the application type of the target application, or the learned threshold group and the learned RRC connection release timer duration set may be used as a universal threshold group and a universal RRC connection release timer duration set.

The sample data may be obtained by the terminal through statistics collection, or may be obtained by a network device through statistics collection. For example, the terminal collects statistics about data sent within the statistical duration to obtain the sample data, or the network device collects statistics about data received within the statistical duration to obtain the sample data.

The computing device may be any device that has a data computing processing capability and can implement a data processing function in the procedure shown in FIG. 8.

In some embodiments, an optimal RRC connection release timer duration set and a threshold group that are respectively corresponding to one or more application types may be obtained by using an offline learning method, so as to form an RRC connection release lookup table. The RRC connection release lookup table is used to store a correspondence between application type information and an RRC connection release timer duration set and a threshold. The RRC connection release lookup table is searched based on the application type information, to obtain an RRC connection release timer duration set and a threshold group that are corresponding to the application type.

Table 1 shows an example of an RRC connection release lookup table.

TABLE 1

| Application type information | RRC connection release timer duration set | Threshold group |
|---|---|---|
| Internet long video application type | {10.0, 4.65, 2.16, 1.01} | thHigh = 7, thLow = 7 |
| Internet short video application type | {9.01, 3.0, 1.0} | thHigh = 346, thLow = 346 |
| Web page news application type | {6.51, 2.0} | thHigh = 61, thLow = 61 |
| . . . | . . . | . . . |

In some other embodiments, an optimal RRC connection release timer duration set and a threshold group that are respectively corresponding to one or more applications may be obtained by using an offline learning method, so as to form an RRC connection release lookup table shown in Table 2. The RRC connection release lookup table is used to store a correspondence between application information, an RRC connection release timer duration set, and a threshold. The RRC connection release lookup table is searched based on the application information, to obtain an RRC connection release timer duration set and a threshold group that are corresponding to the application. The application information is used to identify an application, and the application information may include an application identifier and an application name.

Table 2 shows an example of an RRC connection release lookup table.

TABLE 2

| Application type information | RRC connection release timer duration set | Threshold group |
|---|---|---|
| Internet long video application A | {10.0, 4.65, 2.16, 1.01} | thHigh = 7, thLow = 7 |
| Internet short video application B | {9.01, 3.0, 1.0} | thHigh = 346, thLow = 346 |
| Web page news application C | {6.51, 2.0} | thHigh = 61, thLow = 61 |
| . . . | . . . | . . . |

The RRC connection release timer duration set and the threshold group are obtained and configured by using an offline learning method, so that the terminal can save computing resources used for online learning of the RRC connection release timer duration set and the threshold.

(3) Obtaining an RRC Connection Release Timer Duration Set and a Threshold Through Offline Learning.

The method may be performed by a terminal, or may be performed by another device. For example, for one or more applications, sample data of each application within a statistical duration is obtained, and the sample data is sent to a computing device. The computing device determines, by using a mathematical calculation method, an optimal RRC connection release timer duration set and a threshold group that are respectively corresponding to the one or more applications.

In the following offline learning method, an example in which the RRC connection release timer duration set is generated by using an exponential segmentation method is used for description. This idea may be applied to an online learning method in which the RRC connection release timer duration set is generated by using another method.

Figure 12:
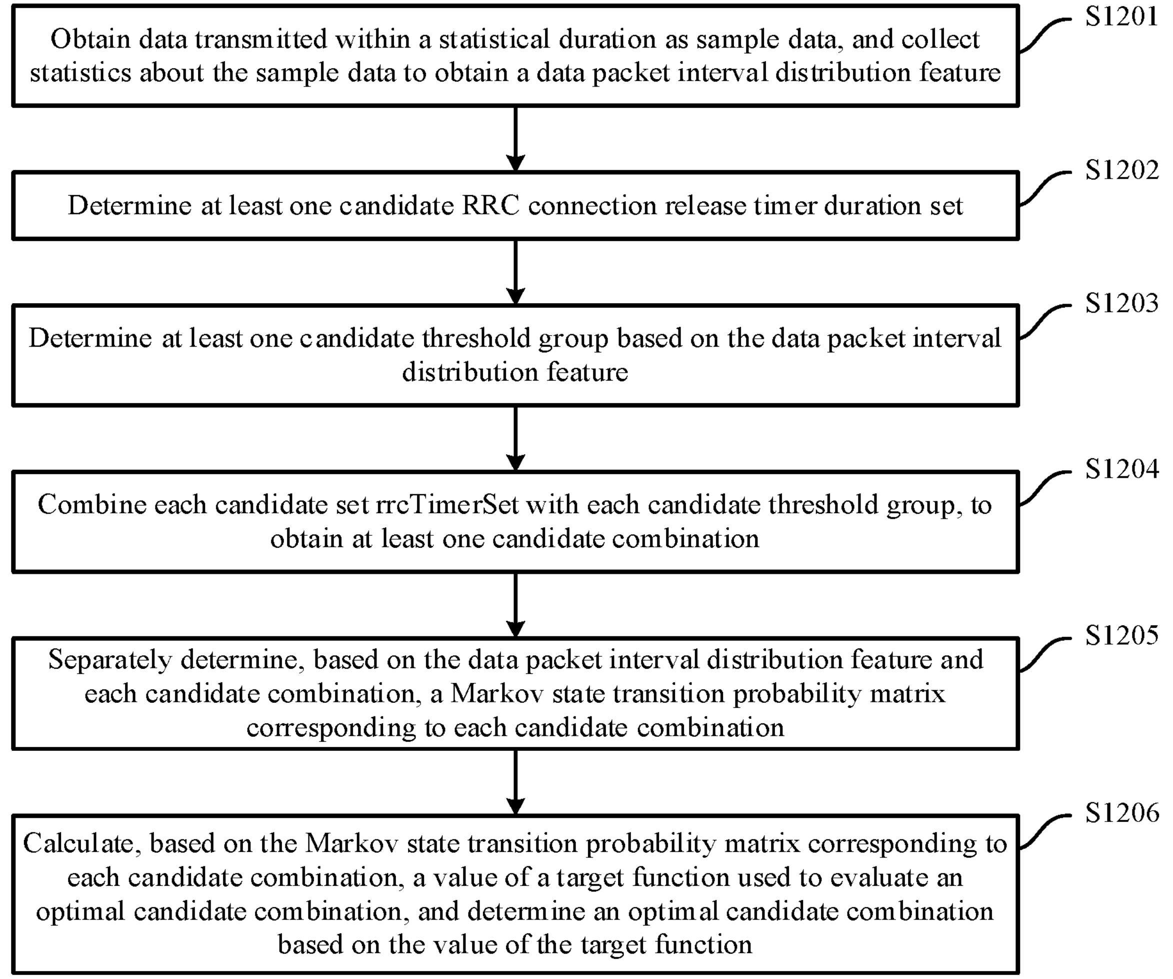
FIG. 12 is a schematic flowchart of an offline learning method according to an embodiment of this disclosure.

FIG. 12 shows an example of a procedure of an online learning method. As shown in FIG. 12, a target application is used as an example for description below. The online learning method may include the following steps.

S1201: Obtain data transmitted by a terminal within a statistical duration as sample data, and collect statistics about sample data to obtain a data packet interval distribution feature.

A specific implementation of this step is the same as an implementation of a corresponding step in FIG. 8, and details are not described herein again.

S1202: Determine at least one candidate RRC connection release timer duration set.

A specific implementation of this step is the same as an implementation of a corresponding step in FIG. 8, and details are not described herein again.

S1203. Determine, based on the data packet interval distribution feature, at least one candidate threshold group corresponding to each candidate RRC connection release timer duration set.

A specific implementation of this step is the same as an implementation of a corresponding step in FIG. 8, and details are not described herein again.

S1204: Separately combine each candidate set rrcTimerSet with each candidate threshold group corresponding to a corresponding candidate set rrcTimerSet, to obtain at least one candidate combination.

Each candidate combination includes a candidate RRC connection release timer duration set and a candidate threshold group corresponding to the candidate RRC connection release timer duration set.

A specific implementation of this step is the same as an implementation of a corresponding step in FIG. 8, and details are not described herein again.

S1205: Separately determine, based on the data packet interval distribution feature and each candidate combination, a Markov state transition probability matrix corresponding to each candidate combination.

An element in a candidate RRC connection release timer duration set is a duration of the RRC connection release timer and corresponds to one Markov state.

A Markov state transition probability matrix $P_t$ is expressed as:

$$P_t = \begin{bmatrix} P_{1,1} & P_{1,2} & P_{1,3} & & \cdots & P_{1,K-1} & P_{1,K} \\ P_{2,1} & P_{2,2} & P_{2,3} & & \cdots & P_{2,K-1} & P_{2,K} \\ P_{3,1} & P_{3,2} & P_{3,3} & & \cdots & P_{3,K-1} & P_{3,K} \\ \cdots & \cdots & \cdots & \cdots & \cdots & \cdots & \cdots \\ P_{K-1,1} & P_{K-1,2} & P_{K-1,3} & \cdots & P_{K-1,K-1} & P_{K-1,K} \\ P_{K,1} & P_{K,2} & P_{K,3} & \cdots & P_{K,K-1} & P_{K,K} \end{bmatrix},$$

where K represents a quantity of Markov states, $P_{1,1}$ indicates a probability that a state 1 is kept unchanged, $P_{1,2}$ indicates a probability of transiting from the state 1 to a state 2, and so on. There is no possibility of transiting between non-adjacent states. Therefore, a probability of transiting between non-adjacent states is 0, for example, $P_{1,3}=0$. In the Markov state transition probability matrix $P_t$, a sum of probabilities of all rows is equal to 1.

Counting of the quantity of received data packets is used as an example. When the quantity of data packets is less than the second threshold ThLow in the RRC connected state, the probability $P_{i,i+1}$ of transiting from the current state $T_i$ to the state $T_{i+1}$ is:

$$P_{i,i+1} = \sum_{n=1}^{ThLow} P_{rob}(t_{session} < T_i)^n,$$

where $t_{session}$ indicates a data packet interval, $P_{rob}(t_{session}<T_i)$ indicates a probability that the data packet interval is less than a duration of an RRC connection release timer that is corresponding to a state $T_i$, and n is a positive integer.

In the $T_i$ state in the RRC connected state, when the quantity of data packets that arrive reaches the first threshold ThHigh, the probability $P_{i,i-1}$ of transiting from the current state $T_i$ to the state $T_{i-1}$ is:

$$P_{i,i-1}=P_{rob}(t_{session}<T_i)^{ThHigh},$$

In the $T_i$ state in the RRC_CONNECTED state, when the quantity of received data packets $T_i$ is greater than or equal to ThLow and less than or equal to ThHigh, the probability $P_{i,i}$ of keeping the current state $T_i$ unchanged is as follows:

$$P_{i,i}=1-P_{i,i-1}-P_{i,i+1},$$

When a probability density function of the target application is known, the probability $S_t=(P_{rob}(T_1), P_{rob}(T_2) \ldots P_{rob}(T_K))$ of the Markov state $T_i$ may be calculated based on the Markov state transition probability matrix:

$$S_t=S_0P_t,$$

where $S_0$ is a probability of an initial state, and $P_t$ is the Markov state transition probability matrix.

S1206: Calculate, based on the Markov state transition probability matrix corresponding to each candidate combination, a value of a target function used to evaluate an optimal candidate combination, and determine an optimal candidate combination based on the value of the target function.

A threshold group in the optimal candidate combination may be configured as a threshold group used to determine whether to adjust a timing duration of the RRC connection release timer, and an RRC connection release timer duration set in the optimal candidate combination may be used to determine a target value of the timing duration of the RRC connection release timer.

A universal threshold group and a universal RRC connection release timer duration set may be obtained through learning by following the procedure shown in FIG. 8. If data packets received when a target application is a foreground application are obtained as the sample data in S801, a threshold group and an RRC connection release timer duration set that are corresponding to the application may be obtained through learning. If data packets received when a representative application in a certain type of applications is a foreground application is obtained as the sample data in S801, a threshold group and an RRC connection release timer duration set that are obtained through learning may be used as the threshold group and the RRC connection release timer duration set that are corresponding to the application type.

In some embodiments, the target function may be set to a function for minimizing an average connected-state residence time, and the function may be expressed as:

$$\min \overline{T}_{conn},$$

where:

$$\overline{T}_{conn} = \sum_{T_{session}} \sum_{T_i} P_{rob}(T_i)(T_i P_{rob}(t_{session} > T_i) + t_{session} P_{rob}(t_{session} < T_i)).$$

According to the foregoing target function, a smaller value of the target function indicates that the terminal is in the connected state for a shorter time period, and that the terminal saves more power. Therefore, a candidate combination corresponding to the minimum target function value may be selected as an optimal candidate combination corresponding to the target application.

In some embodiments, an optimal RRC connection release timer duration set and a threshold group that are respectively corresponding to one or more application types or applications may be obtained by using foregoing offline learning method, so as to form an RRC connection release lookup table shown in Table 1 or Table 2.

It should be noted that a time sequence of the steps in the procedure shown in FIG. 12 is merely an example. This is not limited in this embodiment of this disclosure. For example, a sequence of S1201 and S1202 may be adjusted, or may be performed concurrently.

According to one or a combination of the foregoing embodiments, the following describes an implementation process of the embodiments of this disclosure by using a specific application scenario as an example.

Scenario 1:

For a mobile phone that is not configured with a threshold group and an RRC connection release timer duration set, for example, a newly purchased mobile phone, RRC connection release may be controlled based on a timing duration of an RRC connection release timer that is specified by a system. For example, when an RRC connection release timer of 10 seconds that is configured by the base station for the mobile phone by default expires, the base station releases an RRC connection to the mobile phone.

After the mobile phone is powered on or is powered on and unlocked, if a user taps an icon of an Internet long video application A (for example, Tencent® Video) in on a user interface displayed on the screen of the mobile phone to start the application A, an application processor may monitor that the application is started, and may obtain a name of the application. When the user triggers a control in a form of a movie thumbnail on an interface of the application A to request to play a movie, the application sends a data obtaining request (for example, a Hypertext Transfer Protocol (HTTP) get request) to the application processor after obtaining the event, to request to obtain video data of the movie. The application processor sends Transmission Control Protocol (TCP) connection establishment information to a modem, where the TCP connection establishment information may be carried in a data transmission and reception request and sent to the modem, and the request may be an attention (AT) command. The modem establishes an RRC connection to a base station based on the AT command. The AT command does not carry indication information used to indicate an RRC connection release duration.

After the mobile phone is powered on or is powered on and unlocked, if the user taps an icon of a game application (for example, a car racing game) on a user interface displayed on the screen of the mobile phone to start the game application, the application processor may monitor that the game application is started, and may obtain a name of the game application. After the user triggers a "start game" option on the interface of the game application, the game application sends a data obtaining request (for example, a User Datagram Protocol (UDP) request) to the application processor, the application processor sends UDP data to the modem, where the UDP data may be carried in a data transmission and reception request and sent to the modem, and the request may be an AT command, and the modem establishes an RRC connection to the base station based on the AT command. The AT command does not carry indication information used to indicate an RRC connection release duration.

The application processor determines whether the timing duration of the RRC connection release timer needs to be set. If it is determined that the timing duration of the RRC connection release timer needs to be set, the application processor sends an AT command to the modem, where the command may carry indication information used to indicate the timing duration of the RRC connection release timer, so that the modem sets the timing duration of the RRC connection release timer to be equal to the timing duration value indicated by the indication information, and when the RRC connection release timer expires, the mobile phone requests the base station to release the RRC connection, or if it is determined that the timing duration of the RRC connection release timer does not need to be set, the application processor does not send, to the modem, an AT command used to set the timing duration of the RRC connection release timer. When the RRC connection release timer of 10 seconds that is configured by the base station for the mobile phone by default expires, the base station releases the RRC connection to the mobile phone.

In this scenario, because neither a threshold group nor an RRC connection release timer duration set is configured in the mobile phone, the application processor determines that the AT command used to set the timing duration of the RRC connection release timer does not need to be sent to the modem. Further, in an example in which the current application A is started, the AP determines an application type of the application A, and searches the lookup table based on the application type. Because the lookup table is not configured currently, the search fails. In addition, because neither a universal threshold group nor a universal duration of the RRC connection release timer is configured currently, the AP determines that the AT command for setting the timing duration of the RRC connection release timer does not need to be sent to the modem.

In this scenario, when the screen of the mobile phone is turned on, the base station controls RRC connection release. When the 10-second RRC connection release timer configured by the base station for the mobile phone expires, the base station releases the RRC connection to the mobile phone. Optionally, after the screen of the mobile phone is turned off, if no data is transmitted within one second, the mobile phone requests, one second later, the base station to release the RRC connection.

After the mobile phone reestablishes an RRC connection to the base station, if no foreground-background switching of an application occurs on the mobile phone, and no new application is started and requests to obtain data, in a screen-on state of the mobile phone, the base station controls RRC connection release. For example, when the 10-second RRC connection release timer configured by the base station for the mobile phone expires, the base station releases the RRC connection to the mobile phone.

Scenario 2:

For a mobile phone that is configured with neither a threshold group nor an RRC connection release timer duration set, after the mobile phone is used for a time period, an AP of the mobile phone obtains, by using the foregoing self-learning method, a threshold group used to determine whether a timing duration of the RRC connection release timer needs to be adjusted, and an RRC connection release timer duration set (rrcTimerSet) used to determine a target timing duration value of the RRC connection release timer. For example, a configuration status of the threshold group and the RRC connection release timer duration set may be:

Case 1: One universal RRC connection release timer duration set and one universal threshold group are included.

Case 2: A plurality of RRC connection release timer duration sets and a plurality of threshold groups are included, where each RRC connection release timer duration set corresponds to one application, and each threshold group corresponds to one application.

Case 3: A plurality of RRC connection release timer duration sets and a plurality of threshold groups are included, where each RRC connection release timer duration set corresponds to one application type, and each threshold group corresponds to one application type.

Case 4: Based on case 2, one universal RRC connection release timer duration set and one universal threshold group are further included.

Case 5: Based on case 3, one universal RRC connection release timer duration set and one universal threshold group are further included.

One RRC connection release timer duration set includes at least two duration values, and one threshold group may include one threshold or two thresholds, for example, including ThHigh and ThLow, where ThHigh>ThLow.

The following uses the threshold group and the RRC connection release timer duration set configured in the foregoing case 4 as an example for description.

For example, the AP is set as follows:

rrcTimerSetA={10.0, 4.65, 2.16, 1.01}, and threshold group A (ThHighA, ThLowA).

rrcTimerSetB={9.01, 3.0, 1.0}, and threshold group B (ThHighB, ThLowB).

rrcTimerSetUN={6.51, 2.0}, and threshold group UN (ThHighUN, ThLowUN).

A lookup table shown in Table 3 may be set in the AP.

TABLE 3

| Application type | RRC connection release timer duration set | Threshold group |
|---|---|---|
| Internet long video application | rrc TimerSetA = {10.0, 4.65, 2.16, 1.01} | Threshold group A (ThHighA, ThLowA) |
| Internet short video application | rrcTimerSetB = {9.01, 3.0, 1.0} | Threshold group B (ThHighB, ThLowB) |
| Universal type | rrcTimerSetUN = {6.51, 2.0} | Threshold group UN (ThHighUN, ThLowUN) |

The rrcTimerSetA and threshold group A correspond to an Internet long video application, the rrcTimerSetB and the threshold group B correspond to an Internet short video application, the rrcTimerSetUN is a universal RRC connection release timer duration set, the threshold group UN is a universal threshold group, and durations in each rrcTimerSet are sorted in descending order.

Scenario 3:

For a mobile phone that is configured with a threshold group and an RRC connection release timer duration set, the mobile phone accesses the network after being powered on. After the mobile phone is powered on, if the user does not start any application, the mobile phone is still in a non-connected state.

After the mobile phone is powered on or unlocked, and the mobile phone is in the non-connected state. If the user taps an icon of an Internet long video application A on a user interface displayed on a screen of the mobile phone to start the long video application A, and triggers an option of a movie on the user interface of the long video application A (for example, the user taps a control in a form of a movie thumbnail to request to obtain video data of the movie), the long video application A sends TCP connection information to the application processor after obtaining the event, the application processor sends an AT command to the modem based on the TCP connection information, and the modem establishes an RRC connection to the base station based on the AT command.

The application processor further determines whether a timing duration of the RRC connection release timer needs to be set. In this scenario, the application processor determines that a current foreground application is the application A, determines that an application type of the application A is the Internet long video application, searches the lookup table shown in Table 3 based on the application type to obtain the threshold group A and an RRC connection release timer duration set rrcTimerSetA={10.0, 4.65, 2.16, 1.01} that are corresponding to the application type, and determines that the timing duration of the RRC connection release timer needs to be set, and therefore sends an AT command to the modem, to instruct the modem to set the duration of the RRC connection release timer to the maximum duration of 10 seconds in the set rrcTimerSetA. After the timing duration of the RRC connection release timer is set, the timer starts timing based on the set timing duration.

For example, values of the information fields in the AT command are as follows: a value of the first information field is equal to 1, a value of the second information field is equal to 1, indicating "enable OPEN_RRC_QUICKLY_RELEASE_FEATURE", and the third information field is reserved.

Fourth information field: para1=0 indicates that the idle state is entered after the RRC connection enters is released.

Fifth information field: para2=10 indicates that the timing duration of the RRC connection release timer is set to 10 seconds.

The AP further starts a counter to count the quantity of received data packets in the RRC connected state. During running of the long video application A, data sent by the network side arrives at a modem of the mobile phone, and is demodulated by the modem and then sent to the AP. The AP plays the data in a video playing window of the application A. In this process, the counter counts the quantity of data packets received by the mobile phone. The data packets received by the mobile phone include a data packet of the long video application A sent by the network side, and may further include a data packet received by a background application with data transmission.

After receiving video data of a movie that is sent by the network side, the mobile phone buffers the video data of the movie into a buffer of the player, and plays the video data buffered in the buffer in a video window of the video application A. In the first time period after the RRC connection is established, because the network performance is relatively good, the data volume in the buffer of the player reaches a relatively high capacity proportion (for example, 100%) in a relatively short time, and the long video application A pauses sending of a video data download request to the network side, so that the network side does not send video data to the mobile phone. When the mobile phone does not receive data from the network side within 10 seconds, the RRC connection release timer expires, and the mobile phone sends a request to the base station to release an RRC connection, the base station accepts the request, and releases the RRC connection to the mobile phone. The application processor reads the count value of the counter, determines that the count value is greater than ThLowA in the threshold group A corresponding to the long video application, and therefore determines that the timing duration of the RRC connection release timer does not need to be adjusted. The application processor does not need to send, to the terminal, an AT command used to set the timing duration of the RRC connection release timer. In this case, the duration of the RRC connection release timer is still 10 seconds. The application processor resets the counter, so as to count the quantity of received data packets after the RRC connection is reestablished.

In a second time period after this (that is, after the RRC connection is released), the data volume in the buffer of the player decreases to a relatively low threshold (for example, 40%), the long video application A sends a data transmission and reception request to the application processor, and the application processor sends an AT command to the modem, to trigger the modem to reestablish an RRC connection to the base station. Because the application processor does not detect that a foreground-background switching action of an application occurs, and does not detect that a new application is started, the application processor does not need to send, to the modem, an AT command used to set the timing duration of an RRC connection release timer. Therefore, after the RRC connection is reestablished, duration of the RRC connection release timer on the mobile phone is still 10 seconds.

In the third time period after (that is, after the RRC connection is reestablished), the user taps a pause play control key in a player window in the process of watching the movie. The long video application A pauses sending of a download request to the network side based on the user operation event. Because the long video application A pauses sending of the download request, the network side no longer sends video data to the mobile phone. The mobile phone does not receive a data packet in a time period. When the duration reaches 10 seconds, the RRC connection release timer expires, the mobile phone sends a request to the base station to request to release an RRC connection, and the base station accepts the request and releases the RRC connection between the base station and the mobile phone. The application processor reads the count value of the counter, determines that the count value is less than ThLowA in the threshold group A corresponding to the long video application, and therefore determines that the timing duration of the RRC connection release timer needs to be reduced. Therefore, the application processor selects 4.65 seconds from the rrcTimerSetA={10.0, 4.65, 2.16, 1.01} as the target value of the timing duration of the RRC connection release timer (because the current duration of the RRC connection release timer is 10 seconds, the maximum value in all duration values less than 10 seconds is selected from the set), and sends an AT command to the modem, to instruct the modem to set the timing duration of the RRC connection release timer to be equal to the target value of 4.65 seconds. After the timing duration of the RRC connection release timer is set, the timer starts timing based on the set timing duration. Optionally, after determining the target value of the timing duration of the RRC connection release timer, the application processor may also send, to the modem after the RRC connection is reestablished, an AT command used to set the timing duration of the RRC connection release timer. Further, the application processor resets the counter, so as to count the received data packets after the RRC connection is reestablished.

After that (that is, after the RRC connection is released), in a fourth time period, the user taps the play control key in the player window to resume normal playing from paused playing. The long video application A sends an HTTP get request to the application processor based on the user operation event to request to obtain video data. The application processor sends an AT command to the modem to enable the modem to reestablish an RRC connection to the base station. After the RRC connection is established, because the application processor does not detect that a foreground-background switching action of an application occurs, and does not detect that a new application is started, the duration of the RRC connection release timer does not need to be adjusted, and the duration of the RRC connection release timer is still 4.65 seconds. The mobile phone receives the video data that is sent by the network side to the mobile phone based on the download request sent by the mobile phone. However, because the current network performance is poor, the mobile phone does not receive a data packet in a time period. When the duration length reaches 4.65 seconds, the RRC connection release timer expires, and the mobile phone sends a request to the base station to request to release the RRC connection. The base station does not accept the request, and maintains the RRC connection to the mobile phone. The application processor reads the count value of the counter, determines that the count value is less than ThLowA in the threshold group A corresponding to the long video application, and therefore determines that the timing duration of the RRC connection release timer needs to be reduced. Therefore, the application processor selects 2.16 seconds from the rrcTimerSetA={10.0, 4.65, 2.16, 1.01} as the target value of the timing duration of the RRC connection release timer (because the current timing duration of the RRC connection release timer is 4.65 seconds, the maximum value in all duration values less than 4.65 seconds is selected from the set), and sends an AT command to the modem, to instruct the modem to set the timing duration of the RRC connection release timer to be equal to the target value of 2.16 seconds. After the timing duration of the RRC connection release timer is set, the timer starts timing based on the set timing duration. Optionally, after determining the target value of the timing duration of the RRC connection release timer, the application processor may also send, to the modem after the RRC connection is reestablished, an AT command used to set the timing duration of the RRC connection release timer. Further, the application processor resets the counter, so as to count the received data packets after the RRC connection is reestablished.

After that (that is, after the RRC connection release timer expires), in a fifth time period, the timing duration of the RRC connection release timer is reduced to 2.16 seconds, the user taps a control key for increasing the playing rate, the long video application A sends a download request to the network side based on the user operation event, and the network side sends video data to the mobile phone based on the download request sent by the mobile phone. In this case, the network performance is restored to be relatively good. Because the user taps the control key for increasing the playing rate, the data volume of the video data that the mobile phone requests to download from the network side is relatively large, so that the mobile phone receives a large quantity of video data packets in a relatively short time. When the count value of the counter reaches ThHighA in the threshold group A corresponding to the long video application, the application processor determines that the timing duration of the RRC connection release timer needs to be increased. Therefore, the application processor selects 4.65 seconds from the rrcTimerSetA={10.0, 4.65, 2.16, 1.01} as the target value of the timing duration of the RRC connection release timer (because the current timing duration of the RRC connection release timer is 2.16 seconds, the minimum value in all duration values greater than 2.16 seconds is selected from the set), and an AT command is sent to the modem, to instruct the modem to set the timing duration of the RRC connection release timer to be equal to the target value of 4.65 seconds. After the timing duration of the RRC connection release timer is set, the timer starts timing based on the set timing duration. Further, the application processor resets the counter, so as to count the received data packets after the duration of the RRC connection release timer is adjusted.

After that (that is, after the RRC connection release timer is increased to 4.65 seconds), in a sixth time period, the user returns to the home screen (that is, the desktop of the mobile phone) by performing a touch operation, so as to switch the long video application A from the foreground to the background. In this case, no foreground application is running on the mobile phone. After the application processor detects the event that the long video application A is switched from the foreground to the background, because the application processor does not detect that an application is switched to the foreground, and does not detect that an application is started, the application processor determines to keep the current timing duration of the RRC connection release timer unchanged at 4.65 seconds, and does not need to send, to the modem, an AT command used to set the timing duration of the RRC connection release timer. Further, the application processor may keep the counter counting the quantity of data packets received by the mobile phone.

After that (that is, after the long video application A is switched to the background), in a seventh time period, the user switches the application A to the foreground by performing a touch control operation. After detecting the event that the long video application A is switched from the background to the foreground, the application processor searches the lookup table shown in Table 3 based on the application type to obtain the threshold group A and an RRC connection release timer duration set rrcTimerSetA={10.0, 4.65, 2.16, 1.01} that are corresponding to the application type, and determines that the timing duration of the RRC connection release timer needs to be set, and therefore sends an AT command to the modem, to instruct the modem to set the timing duration of the RRC connection release timer to the maximum duration of 10 seconds in the set rrcTimerSetA. After the timing duration of the RRC connection release timer is set, the timer starts timing based on the set timing duration. The application processor resets the counter, so as to restart counting the quantity of received data packets after the timing duration of the RRC connection release timer is adjusted.

During running of the long video application A as a foreground application, in the RRC connected state, the user starts a short video application B (for example, a TikTok application), and in this case, the long video application A is switched to a background application, and the short video application B is a foreground application. When detecting that the short video application B is started and is currently running as a foreground application, the application processor determines that an application type of the application B is an Internet short video application, searches the lookup table shown in Table 3 based on the application type to obtain a threshold group B and an RRC connection release timer duration set rrcTimerSetB={9.01, 3.0, 1.0} that are corresponding to the application type, and sends an AT command to the modem, to instruct the modem to set the timing duration of the RRC connection release timer to the maximum duration 9.01 seconds in the set rrcTimerSetB. After the timing duration of the RRC connection release timer is set, the timer starts timing based on the set timing duration. Further, the application processor resets the counter, so as to restart counting the quantity of received data packets after the timing duration of the RRC connection release timer is adjusted.

During running of the long video application A as a background application and running of the short video application B as a foreground application, in the RRC connected state, the user starts a social application C (for example, a WECHAT application), so that on a current mobile phone, the social application C runs as a foreground application, and the application A and the application B run as background applications. After detecting that the social application C is started and is running as a foreground application, the application processor determines an application type of the social application C, and searches the lookup table shown in Table 3 based on the application type, but does not find a threshold group or an RRC connection release timer duration set that is corresponding to the application type (that is, neither a corresponding threshold group nor a corresponding RRC connection release timer duration set is configured for the application type). In this case, the application processor obtains the universal threshold group UN and the universal RRC connection release timer duration set rrcTimerSetUN={6.51, 2.0}, and sends an AT command to the modem, to instruct the modem to set the duration of the RRC connection release timer to a maximum duration 6.51 seconds in the set rrcTimerSetUN. After the timing duration of the RRC connection release timer is set, the timer starts timing based on the set timing duration. Further, the application processor resets the counter, so as to restart counting the quantity of received data packets after the duration of the RRC connection release timer is adjusted.

After the social application C is started, the user uses the application to browse content displayed on a web page of an official account. Because a data volume of a web page may be relatively small, and the user browses the web page for a relatively long time, it is possible that no data is transmitted in a time period. When the duration reaches 6.51 seconds, the RRC connection release timer expires, and the mobile phone requests the base station to release the RRC connection. The base station accepts the request, and releases the RRC connection between the mobile phone and the base station. The application processor compares the current count value of the counter with ThLowUN in the threshold group UN, determines that the current count value of the counter is less than ThLowUN, and therefore determines that the timing duration of the RRC connection release timer needs to be reduced. Therefore, the application processor selects 2.0 seconds from the rrcTimerSetUN={6.51, 2.0} as the target value of the timing duration of the RRC connection release timer (because the current timing duration of the RRC connection release timer is 6.51 seconds, 2.0 seconds less than 6.51 seconds is selected from the set), and sends an AT command to the modem, to instruct the modem to set the timing duration of the RRC connection release timer to be equal to the target value of 2.0 seconds. After the timing duration of the RRC connection release timer is set, the timer starts timing based on the set timing duration. Optionally, after determining the target value of the timing duration of the RRC connection release timer, the application processor may also send, to the modem after the RRC connection is reestablished, an AT command used to set the timing duration of the RRC connection release timer. Further, the application processor resets the counter, so as to count the received data packets after the RRC connection is reestablished.

After the RRC connection is released, the user selects, by performing a screen touch operation, a video in the social application C for watching. After obtaining the event, the social application C sends connection information to the application processor, the application processor sends an AT command to the modem based on the connection information, and the modem establishes an RRC connection to the base station based on the AT command. Because the application processor currently does not detect that foreground-background switching of an application occurs, and does not detect that a new application is started, the application determines that the timing duration of the RRC connection release timer does not need to be adjusted. Therefore, the timing duration of the RRC connection release timer is still 2.0 seconds. Because the video selected by the user has a large data volume and the current network performance is relatively good, the mobile phone receives a relatively large quantity of video data packets in a relatively short time. When determining that the count value of the counter reaches ThHighUN in the threshold group UN, the application processor determines that the timing duration of the RRC connection release timer needs to be increased. Therefore, the application processor selects 6.51 seconds from the rrcTimerSetUN={6.51, 2.0} as a target value of the timing duration of the RRC connection release timer (because the current timing duration of the RRC connection release timer is 2.0 seconds, 6.51 seconds greater than 2.0 seconds is selected from the set), and sends an AT command to the modem, to instruct the modem to set the timing duration of the RRC connection release timer to be equal to the target value of 6.51 seconds. After the timing duration of the RRC connection release timer is set, the timer starts timing based on the set timing duration. Further, the application processor resets the counter, so as to restart counting the quantity of received data packets after the duration of the RRC connection release timer is adjusted.

Then, the user closes the social application C, and the short video application B is switched to the foreground. The application processor detects the foreground-background switching event of the application, determines that the current foreground application is the short video application B, determines that an application type of the application B is an Internet short video application, and searches the lookup table shown in Table 3 based on the application type to obtain a threshold group B and an RRC connection release timer duration set rrcTimerSetB={9.01, 3.0, 1.0} that are corresponding to the application type, and sends an AT command to the modem, to instruct the modem to set the duration of the RRC connection release timer to the maximum duration 9.01 seconds in the set rrcTimerSetB, so that the timing duration of the RRC connection release timer is adjusted from 6.51 seconds to 9.01 seconds. After the timing duration of the RRC connection release timer is set, the timer starts timing based on the set timing duration. Further, the application processor resets the counter, so as to restart counting the quantity of received data packets after the duration of the RRC connection release timer is adjusted.

Then, the user closes the social application B, the long video application A is switched to the foreground, and playing of the video of the movie in the playing window of the long video application A is resumed. The application processor detects a foreground-background switching event of the application, determines that a current foreground application is the long video application A, determines that an application type of the application A is an Internet long video application, searches the lookup table shown in Table 3 based on the application type to obtain a threshold group A and an RRC connection release timer duration set rrcTimerSetA={10.0, 4.65, 2.16, 1.01} that are corresponding to the application type, and sends an AT command to the modem, to instruct the modem to set the timing duration of the RRC connection release timer to the maximum duration of 10.0 seconds in the set rrcTimerSetA, so that the timing duration of the RRC connection release timer is adjusted from 9.01 seconds to 10.0 seconds. After the timing duration of the RRC connection release timer is set, the timer starts timing based on the set timing duration. Further, the application processor resets the counter, so as to restart counting the quantity of received data packets after the duration of the RRC connection release timer is adjusted.

Then (that is, after the application C and the application B are closed in sequence, the application A is switched to the foreground), the user enables the split-screen mode of the mobile phone (for example, the split-screen mode of the mobile phone may be enabled by using a set gesture), so that the screen of the mobile phone is divided into two split-screen windows (a first split-screen window and a second split-screen window), where the long video application A runs in the first split-screen window, the home screen (that is, the desktop of the mobile phone) is displayed, and an application icon is displayed on the home screen. No application is currently started in the second split-screen window. Because the application processor does not detect a foreground-background switching event of the application, and does not detect that a new application is started, it is determined that the timing duration of the RRC connection release timer does not need to be adjusted, and the timing duration of the RRC connection release timer is still 10.0 seconds.

Then, the user taps the icon of the short video application B in the second split-screen window to start the short video application B in the second split-screen window. The application processor detects an event that an application is started, and determines that the current mode is a split-screen mode (the application processor may obtain the screen splitting event to learn that the mobile phone is currently in the split-screen mode). Therefore, the application processor obtains, based on priorities of a long video application type of the long video application A and a short video application type of the short video application B, a threshold group B and an RRC connection release timer duration set rrcTimerSetB={9.01, 3.0, 1.0} that are corresponding to the short video application type with a high priority, and sends an AT command to the modem, to instruct the modem to set the timing duration of the RRC connection release timer to a maximum value of 9.01 in the set, so that the timing duration of the RRC connection release timer is adjusted from 10.0 seconds to 9.01 seconds. After the timing duration of the RRC connection release timer is set, the timer starts timing based on the set timing duration. Further, the application processor resets the counter, so as to restart counting the quantity of received data packets after the duration of the RRC connection release timer is adjusted.

Priorities of different application types may be set based on factors such as whether the application types are delay-sensitive. For example, a priority of an application type of a delay-sensitive application may be set to be relatively high, and a priority of an application type of a delay-insensitive application may be set to be relatively low.

Optionally, as an alternative solution for selecting a threshold group and an RRC connection release timer duration set that are corresponding to an application type with a high priority, the application processor may select, from an RRC connection release timer duration set rrcTimerSetA={10.0, 4.65, 2.16, 1.01} corresponding to a long video application type of the long video application A and an RRC connection release timer duration set rrcTimerSetB={9.01, 3.0, 1.0} corresponding to a short video application type of the short video application B, a set rrcTimerSetA with a larger duration value and a threshold group A that is corresponding to the set are selected, and send an AT command to the modem, to instruct the modem to set the timing duration of the RRC connection release timer to a maximum value of 10.0 in the set. After the timing duration of the RRC connection release timer is set, the timer starts timing based on the set timing duration.

After the short video application B is started in the second split-screen window, the short video application B needs to play a short video that is recommended by the system or that has been followed by the user. Therefore, the short video application B sends a download request to the network side to request to download corresponding video data. The network side sends a video data packet to the mobile phone based on the download request. After receiving the video data packet, the mobile phone plays video data packets in a playing window of the application. After the user pauses playing of a video in the playing window of the short video application B by performing a touch operation, because the video of the movie in the playing window of the long video application A is being played, the mobile phone continuously obtains video data from the network side, so that the count value of the counter continuously increases. When the count value reaches ThHighB in the threshold group B (in this embodiment, an example in which a threshold group B corresponding to a short video application type with a high priority and rrcTimerSetB={9.01, 3.0, 1.0} is for description), the application processor determines that the timing duration of the RRC connection release timer needs to be adjusted. Because the current duration of the RRC connection release timer is already a maximum value in the rrcTimerSetB={9.01, 3.0, 1.0}, the application processor may not send an AT command used to set the timing duration of the RRC connection release timer to the modem, and certainly may also send an AT command used to set the timing duration of the RRC connection release timer to the modem, so that the modem sets the timing duration of the RRC connection release timer to 9.01 seconds. Further, the application processor resets the counter, so as to count a quantity of subsequently received data packets.

After the user cancels the split-screen mode of the mobile phone by performing a screen touch operation, so that the short video application B is closed and the long video application A is still a foreground application, the application processor detects the foregoing event, determines that the foreground application is switched to only the long video application A, determines that an application type of the long video application A is an Internet long video application, searches the lookup table shown in Table 3 based on the application type to obtain a threshold group A and an RRC connection release timer duration set rrcTimerSetA={10.0, 4.65, 2.16, 1.01} that are corresponding to the application type, and sends an AT command to the modem, to instruct the modem to set the timing duration of the RRC connection release timer to a maximum duration of 10.0 seconds in the set rrcTimerSetA, so that the timing duration of the RRC connection release timer is adjusted from 9.01 seconds to 10.0 seconds. After the timing duration of the RRC connection release timer is set, the timer starts timing based on the set timing duration. Further, the application processor resets the counter, so as to restart counting the quantity of received data packets after the duration of the RRC connection release timer is adjusted.

After the user closes the long video application A, no foreground application is currently running on the mobile phone. After detecting the event that the long video application A is closed, the application processor determines no foreground application is running currently. Therefore, the current duration of the RRC connection release timer may be kept unchanged, and the application processor does not need to send, to the modem, an AT command used to set the duration of the RRC connection release timer. As an alternative solution in this case (that is, the application processor detects that no foreground application is currently running after the application is closed), the application processor may also send an AT command to the modem, so that the modem sets the RRC connection release timer to an invalid state or an inactive state based on the AT command. When the RRC connection release timer is in the invalid state or the inactive state, the base station controls release of an RRC connection between the mobile phone and the base station (for example, when no data is transmitted with the mobile phone for 10 seconds, the base station releases the RRC connection between the mobile phone and the base station). When an application is started, the application processor sends, to the modem, an AT command used to set the duration of the RRC connection release timer, where the AT command may be used to enable the RRC connection release timer to be activated or valid, and may be used to set the timing duration of the RRC connection release timer to the target duration.

Scenario 4:

When a mobile phone is in use, a data packet receiving status when the long video application A is used as a foreground application in the statistical duration (for example, one hour) is used. For example, statistics about packet intervals of data packets received in a statistical duration are collected to obtain a data packet interval distribution feature, and an RRC connection release timer duration set and a threshold group are obtained through learning in a manner shown in FIG. 8 based on the data packet interval distribution feature. The newly learned RRC connection release timer duration set and threshold group are configured as an RRC connection release timer duration set and a threshold group that are corresponding to an application type of the long video application A.

The newly learned RRC connection release timer duration set and threshold group may be enabled after the mobile phone is powered on again, or the newly learned RRC connection release timer duration set and threshold group may be enabled after the long video application A and applications of a same type are closed, or after all applications running in the foreground are closed.

For an application type of the long video application A, a currently used RRC connection release timer duration set is rrcTimerSetA1={10.0, 4.65, 2.16, 1.01}, a currently used threshold group is A1 (ThHighA1, ThLowA1), a newly learned RRC connection release timer duration set is rrcTimerSetA2={10, 5, 2.5, 1.25}, and a currently used threshold group is A2 (ThHighA2, ThLowA2). Therefore, after all foreground applications on the mobile phone are closed, the newly learned rrcTimerSetA2={10, 5, 2.5, 1.25} and the threshold group A2 are enabled.

In this case, if the user taps an icon of the Internet long video application A on a user interface displayed on a screen of the mobile phone to start the long video application A, and triggers an option of a movie on the user interface of the long video application A (for example, the user taps a control in a form of a movie thumbnail to request to obtain video data of the movie), the long video application A sends TCP connection information to the application processor after obtaining the event, the application processor sends an AT command to the modem based on the TCP connection information, and the modem establishes an RRC connection to the base station based on the AT command.

The application processor determines that a current foreground application is the application A, determines that an application type of the application A is the Internet long video application, searches the lookup table shown in Table 3 based on the application type to obtain the threshold group A2 and an RRC connection release timer duration set rrcTimerSetA2={10, 5, 2.5, 1.25} that are corresponding to the application type, and determines that the timing duration of the RRC connection release timer needs to be set, and therefore sends an AT command to the modem, to instruct the modem to set the duration of the RRC connection release timer to the maximum duration of 10 seconds in the set rrcTimerSetA. After the timing duration of the RRC connection release timer is set, the timer starts timing based on the set timing duration.

The AP further starts a counter to count the quantity of received data packets in the RRC connected state. During running of the long video application A, data sent by the network side arrives at a modem of the mobile phone, and is demodulated by the modem and then sent to the AP. The AP plays the data in a video playing window of the application A. In this process, the counter counts the quantity of data packets received by the mobile phone.

After receiving video data of a movie that is sent by the network side, the mobile phone buffers the video data of the movie into a buffer of the player, and plays the video data buffered in the buffer in a video window of the video application A. In the first time period after the RRC connection is established, because the network performance is relatively good, the data volume in the buffer of the player reaches a relatively high capacity proportion (for example, 90%) in a relatively short time, and the long video application A pauses sending of a video data download request to the network side, so that the network side does not send video data to the mobile phone. When the mobile phone does not receive data from the network side within 10 seconds, the RRC connection release timer expires, and the mobile phone sends a request to the base station to release an RRC connection, the base station accepts the request, and releases the RRC connection to the mobile phone. The application processor reads the count value of the counter, determines that the count value is greater than ThLowA2 in the threshold group A2 corresponding to the long video application, and therefore determines that the timing duration of the RRC connection release timer does not need to be adjusted. The application processor does not need to send, to the terminal, an AT command used to set the timing duration of the RRC connection release timer. In this case, the duration of the RRC connection release timer is still 10 seconds. The application processor resets the counter, so as to count the received data packets after the RRC connection is reestablished.

In a second time period after this (that is, after the RRC connection is released), the data volume in the buffer of the player decreases to a relatively low threshold (for example, 40%), the long video application A sends a data transmission and reception request to the application processor, and the application processor sends an AT command to the modem, to trigger the modem to reestablish an RRC connection to the base station. Because the application processor does not detect that a foreground-background switching action of an application occurs, and does not detect that a new application is started, the application processor does not need to send, to the modem, an AT command used to set the timing duration of an RRC connection release timer. Therefore, after the RRC connection is reestablished, duration of the RRC connection release timer on the mobile phone is still 10 seconds.

In the third time period after (that is, after the RRC connection is reestablished), the user taps a pause play control key in a player window in the process of watching the movie. The long video application A pauses sending of a download request to the network side based on the user operation event. Because the long video application A pauses sending of the download request, the network side no longer sends video data to the mobile phone. The mobile phone does not receive a data packet in a time period. When the duration reaches 10 seconds, the RRC connection release timer expires, the mobile phone sends a request to the base station to request to release an RRC connection, and the base station accepts the request and releases the RRC connection between the base station and the mobile phone. The application processor reads the count value of the counter, determines that the count value is less than ThLowA2 in the threshold group A2 corresponding to the long video application, and therefore determines that the timing duration of the RRC connection release timer needs to be reduced. Therefore, the application processor selects 5 seconds from the rrcTimerSetA2={10, 5, 2.5, 1.25} as the target value of the timing duration of the RRC connection release timer (because the current duration of the RRC connection release timer is 10 seconds, the maximum value in all duration values less than 10 seconds is selected from the set), and sends an AT command to the modem, to instruct the modem to set the timing duration of the RRC connection release timer to be equal to the target value of 5 seconds. After the timing duration of the RRC connection release timer is set, the timer starts timing based on the set timing duration. Optionally, after determining the target value of the timing duration of the RRC connection release timer, the application processor may also send, to the modem after the RRC connection is reestablished, an AT command used to set the timing duration of the RRC connection release timer. Further, the application processor resets the counter, so as to count the received data packets after the RRC connection is reestablished.

After that (that is, after the RRC connection is released), in a fourth time period, the user taps the play control key in the player window to resume normal playing from paused playing. The long video application A sends an HTTP get request to the application processor based on the user operation event to request to obtain video data. The application processor sends an AT command to the modem to enable the modem to reestablish an RRC connection to the base station. After the RRC connection is established, because the application processor does not detect that a foreground-background switching action of an application occurs, and does not detect that a new application is started, the duration of the RRC connection release timer does not need to be adjusted, and the duration of the RRC connection release timer is still 5 seconds. The mobile phone receives the video data that is sent by the network side to the mobile phone based on the download request sent by the mobile phone. However, because the current network performance is poor, the mobile phone does not receive a data packet in a time period. When the duration length reaches 5 seconds, the RRC connection release timer expires, and the mobile phone sends a request to the base station to request to release the RRC connection. The base station does not accept the request, and maintains the RRC connection to the mobile phone. The application processor reads the count value of the counter, determines that the count value is less than ThLowA2 in the threshold group A2 corresponding to the long video application, and therefore determines that the timing duration of the RRC connection release timer needs to be reduced. Therefore, the application processor selects 2.5 seconds from the rrcTimerSetA2={10, 5, 2.5, 1.25} as the target value of the timing duration of the RRC connection release timer (because the current timing duration of the RRC connection release timer is 5 seconds, the maximum value in all duration values less than 5 seconds is selected from the set), and sends an AT command to the modem, to instruct the modem to set the timing duration of the RRC connection release timer to be equal to the target value of 2.5 seconds. After the timing duration of the RRC connection release timer is set, the timer starts timing based on the set timing duration. Optionally, after determining the target value of the timing duration of the RRC connection release timer, the application processor may also send, to the modem after the RRC connection is reestablished, an AT command used to set the timing duration of the RRC connection release timer. Further, the application processor resets the counter, so as to count the received data packets after the RRC connection is reestablished.

After that (that is, after the RRC connection release timer expires), in a fifth time period, the timing duration of the RRC connection release timer is reduced to 2.5 seconds, the user taps a control key for increasing the playing rate, the long video application A sends a download request to the network side based on the user operation event, and the network side sends video data to the mobile phone based on the download request sent by the mobile phone. In this case, the network performance is restored to be relatively good. Because the user taps the control key for increasing the playing rate, the data volume of the video data that the mobile phone requests to download from the network side is relatively large, so that the mobile phone receives a large quantity of video data packets in a relatively short time. When the count value of the counter reaches ThHighA2 in the threshold group A2 corresponding to the long video application, the application processor determines that the timing duration of the RRC connection release timer needs to be increased. Therefore, the application processor selects 5 seconds from the rrcTimerSetA2={10, 5, 2.5, 1.25} as the target value of the timing duration of the RRC connection release timer (because the current timing duration of the RRC connection release timer is 2.5 seconds, the minimum value in all duration values greater than 2.5 seconds is selected from the set), and an AT command is sent to the modem, to instruct the modem to set the timing duration of the RRC connection release timer to be equal to the target value of 5 seconds. After the timing duration of the RRC connection release timer is set, the timer starts timing based on the set timing duration. Further, the application processor resets the counter, so as to count the received data packets after the duration of the RRC connection release timer is adjusted.

After that (that is, after the RRC connection release timer is increased to 5 seconds), in a sixth time period, the user returns to the home screen (that is, the desktop of the mobile phone) by performing a touch operation, so as to switch the long video application A from the foreground to the background. In this case, no foreground application is running on the mobile phone. After the application processor detects the event that the long video application A is switched from the foreground to the background, because the application processor does not detect that an application is switched to the foreground, and does not detect that an application is started, the application processor determines to keep the current timing duration of the RRC connection release timer unchanged at 5 seconds, and does not need to send, to the modem, an AT command used to set the timing duration of the RRC connection release timer. Further, the application processor may keep the counter counting the quantity of data packets received by the mobile phone.

After that (that is, after the long video application A is switched to the background), in a seventh time period, the user switches the application A to the foreground by performing a touch control operation. After detecting the event that the long video application A is switched from the background to the foreground, the application processor searches the lookup table shown in Table 3 based on the application type to obtain the threshold group A2 and an RRC connection release timer duration set rrcTimerSetA2={10, 5, 2.5, 1.25} that are corresponding to the application type, and determines that the timing duration of the RRC connection release timer needs to be set, and therefore sends an AT command to the modem, to instruct the modem to set the timing duration of the RRC connection release timer to the maximum duration of 10 seconds in the set rrcTimerSetA2. After the timing duration of the RRC connection release timer is set, the timer starts timing based on the set timing duration. The application processor resets the counter, so as to restart counting the quantity of received data packets after the timing duration of the RRC connection release timer is adjusted.

In some embodiments of this disclosure, the timing duration of the RRC connection release timer may be adjusted by using the foregoing method provided in the embodiments of this disclosure when the mobile phone is in a screen-on state and a screen-off state. Further, after the screen of the mobile phone is turned off, the application processor does not need to send, to the modem, an AT command used to set the RRC connection release timer, so that the timing duration of the RRC connection release timer is kept unchanged. After the screen of the mobile phone is turned on, the application processor does not need to send, to the modem, an AT command used to set the timing duration of the RRC connection release timer, so that the timing duration of the RRC connection release timer is kept unchanged.

In some other embodiments of this disclosure, in an alternative solution, after the screen of the mobile phone is turned off, the application processor sends an AT command to the modem, so that the modem sets the timing duration of the RRC connection release timer to a fixed value (for example, 2 seconds), and keeps the timing duration of the RRC connection release timer unchanged when the mobile phone is in the screen-off state. When the mobile phone is in the screen-off state and the RRC connection release timer expires, the mobile phone sends a request to the base station to request to release an RRC connection between the base station and the mobile phone. The base station may determine, based on a data transmission requirement, whether to accept the request. For example, when the base station determines that data needs to be subsequently sent to the mobile phone, the base station rejects the request of the mobile phone, and maintains the RRC connection to the mobile phone. After the screen of the mobile phone is turned on (or after the screen is turned on and unlocked if a screen lock is set), the application processor determines that the timing duration of the RRC connection release timer needs to be adjusted, determines a name of a current foreground application by calling a topActivity.getPackageName( ) function or in another manner, queries a corresponding RRC connection release timer duration set based on an application type of the foreground application, and sends an AT command to the modem, so that the modem sets the timing duration of the RRC connection release timer to a maximum value in the set. After the timing duration of the RRC connection release timer is set, the timer starts timing based on the set timing duration. Further, the application processor resets the counter to restart counting the quantity of received data packets, so that the timing duration of the RRC connection release timer is dynamically adjusted by using the method provided in the embodiments of this disclosure when the mobile phone is in the screen-on state.

Terms used in the foregoing embodiments are merely for a purpose of describing specific embodiments, but are not intended to limit this disclosure. The terms "one", "a" and "this" of singular forms used in this specification and the amended claims of this disclosure are also intended to include expressions such as "one or more", unless otherwise specified in the context clearly. It should be further understood that, in embodiments of this disclosure, "one or more" refers to one, two, or more, and the term "and/or" describes an association between associated objects, and indicates that three relationships may exist. For example, A and/or B may indicate the following cases: only A exists, both A and B exist, and only B exists, where A and B may be singular or plural. The character "/" generally indicates an "or" relationship between the associated objects.

Reference to "an embodiment", "some embodiments", or the like described in this specification indicates that one or more embodiments of this disclosure include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise emphasized in another manner. The terms "include", "have", and their variants all mean "include but are not limited to", unless otherwise emphasized in another manner.

In the embodiments provided in this disclosure, the method provided in the embodiments of this disclosure is described from the perspective in which the mobile device (for example, the mobile phone) is used as an execution body. To implement functions in the method provided in the foregoing embodiments of this disclosure, the terminal may include a hardware structure and/or a software module, to implement the functions in a form of the hardware structure, the software module, or a combination of the hardware structure and the software module. Whether a function in the foregoing functions is performed by using a hardware structure, a software module, or a combination of a hardware structure and a software module depends on a specific application and a design constraint condition of the technical solutions.

According to context, the term "when . . . " or "after . . . " used in the foregoing embodiments may be interpreted as a meaning of "if . . . ", "after . . . ", "in response to determining . . . ", or "in response to detecting . . . ". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)". In addition, in the foregoing embodiments, relationship terms such as first and second are used to distinguish one entity from another entity, but do not limit any actual relationship and sequence between these entities.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, DIGITAL VERSATILE DISC (DVD)), a semiconductor medium (for example, a solid-state drive (SSD)), or the like.

It should be noted that a part of this patent application document includes copyright-protected content. The copyright owner reserves the copyright except copies are made for the patent documents or the recorded content of the patent documents in a patent office.

What is claimed is:

1. A Radio Resource Control (RRC) connection release control method implemented by a terminal, wherein the RRC connection release control method comprises:

storing, for a first application type, a duration set of a first timer, wherein the duration set comprises at least two duration values, and wherein the first timer starts timing when the terminal is in an RRC connected state and is reset when the terminal receives data from a network device;

determining a second application type of a first application of the terminal when the first application runs in a foreground;

determining whether the second application type is the first application type;

setting a first duration value from the at least two duration values as a timing duration of the first timer when the second application type is the first application type;

establishing an RRC connection to the network device in response to detecting a user-initiated data request operation of the first application running in the foreground;

starting the first timer when establishing the RRC connection to the network device; and requesting the network device to release the RRC connection when a timing value of the first timer exceeds the first duration value.

2. The method of claim 1, wherein storing the duration set comprises storing, in a lookup table in the terminal, a correspondence between the first application type, the duration set, and a threshold group used to determine whether to adjust the timing duration of the first timer.

3. A method implemented by a terminal, wherein the method comprises:

determining a first timing duration of a first timer corresponding to a first application of the terminal when the first application runs in a foreground, wherein the first timer starts timing when the terminal is in a Radio Resource Control (RRC) connected state and is reset when an information exchange is performed between the terminal and a network device;

establishing an RRC connection to the network device in response to detecting a user-initiated data request operation of the first application running in the foreground;

starting the first timer when establishing the RRC connection; and requesting the network device to release the RRC connection when a timing value of the first timer exceeds the first timing duration.

4. The method of claim 3, wherein the information exchange comprises at least one of:

receiving downlink data from the network device; or receiving downlink signaling from the network device.

5. The method of claim 3, wherein determining the first timing duration comprises determining the first timing duration corresponding to a first application type of the first application.

6. The method of claim 5, further comprising:

setting, when the first application type is a second application type, the first timing duration as a second timing duration corresponding to the second application type; and setting, when the first application type is a third application type different from the second application type, the first timing duration as a third timing duration corresponding to the third application type.

7. The method of claim 3, further comprising:

collecting statistics about a data transmission volume of the terminal in the RRC connected state to obtain a statistical result; and adjusting the first timing duration based on the statistical result.

8. The method of claim 7, wherein the first application corresponds to at least two duration values, and wherein the method further comprises:

determining that the first timing duration is a first duration value in the at least two duration values;

increasing the first timing duration from the first duration value to a second duration value when the statistical result is greater than a first threshold; and reducing the first timing duration from the first duration value to a third duration value when the information exchange is not performed within the first timing duration and when the statistical result is less than a second threshold, wherein the second threshold is less than or equal to the first threshold.

9. The method of claim 3, wherein after determining the first timing duration, the method further comprises:

sending, by a first system of the terminal, a first instruction to a second system of the terminal, wherein the first instruction carries indication information indicating the first timing duration; and setting, by the second system based on the indication information, the first timing duration.

10. The method of claim 3, further comprising continuously running the first application in the foreground.

11. The method of claim 3, wherein the method further comprises:

running the first application in the foreground;

determining that the first timing duration is a first duration value when the first application runs for a first time period; and determining that the first timing duration is a second duration value when the first application runs for a second time period, wherein the first duration value is different from the second duration value.

12. The method of claim 3, wherein the first application comprises an application type, wherein the application type corresponds to at least two duration values, and wherein the method further comprises setting a maximum value in the at least two duration values as the first timing duration.

13. A method implemented by a terminal, wherein the method comprises:

determining a first timing duration of a first timer corresponding to a first application of the terminal when the first application runs in a foreground, wherein the first timer starts timing when the terminal is in a Radio Resource Control (RRC) connected state and is reset when an information exchange is performed between the terminal and a network device;

establishing an RRC connection to the network device when detecting a preset operation for the first application;

starting the first timer when establishing the RRC connection;

requesting the network device to release the RRC connection when a timing value of the first timer exceeds the first timing duration;

collecting statistics about a data transmission volume of the terminal in the RRC connected state to obtain a statistical result; and adjusting the first timing duration based on the statistical result, wherein the first application corresponds to at least two duration values, and wherein the method further comprises:

determining that the first timing duration is a first duration value in the at least two duration values;

increasing the first timing duration from the first duration value to a second duration value when the statistical result is greater than a first threshold; and reducing the first timing duration from the first duration value to a third duration value when the information exchange is not performed within the first timing duration and when the statistical result is less than a second threshold, wherein the second threshold is less than or equal to the first threshold.

14. The method of claim 13, wherein the information exchange comprises at least one of:

sending uplink data to the network device; or sending uplink signaling to the network device.

15. The method of claim 13, wherein determining the first timing duration comprises determining the first timing duration corresponding to a first application type of the first application.

16. The method of claim 15, further comprising:

setting, when the first application type is a second application type, the first timing duration as a second timing duration corresponding to the second application type; and setting, when the first application type is a third application type different from the second application type, the first timing duration as a third timing duration corresponding to the third application type.

17. The method of claim 13, wherein after determining the first timing duration, the method further comprises:

sending, by a first system of the terminal, a first instruction to a second system of the terminal, wherein the first instruction carries indication information indicating the first timing duration; and setting, by the second system based on the indication information, the first timing duration.

18. The method of claim 13, further comprising continuously running the first application in the foreground.

19. The method of claim 13, wherein the method further comprises:

running the first application in the foreground;

determining that the first timing duration is a fourth duration value when the first application runs for a first time period; and determining that the first timing duration is a fifth duration value when the first application runs for a second time period, wherein the fourth duration value is different from the fifth duration value.

20. The method of claim 13, wherein the first application comprises an application type, wherein the application type corresponds to the at least two duration values, and wherein the method further comprises setting the first duration value as the first timing duration, wherein the first duration value is less than or equal to a timing duration of an inactive timer that is configured on the network device.

* * * * *